United States Patent
Recker et al.

(10) Patent No.: US 10,780,753 B2
(45) Date of Patent: Sep. 22, 2020

(54) TRAILER HITCH

(71) Applicant: ACPS Automotive GmbH, Markgroeningen (DE)

(72) Inventors: Dirk Recker, Moeglingen (DE); Wolfgang Gentner, Steinheim (DE)

(73) Assignee: ACPS Automotive GmbH, Markgroeningen (DE)

( * ) Notice: Subject to any disclaimer, the term of this patent is extended or adjusted under 35 U.S.C. 154(b) by 180 days.

(21) Appl. No.: 15/890,727

(22) Filed: Feb. 7, 2018

(65) Prior Publication Data
US 2018/0222265 A1    Aug. 9, 2018

(30) Foreign Application Priority Data
Feb. 8, 2017    (DE) .......................... 10 2017 102 505

(51) Int. Cl.
| | | |
|---|---|---|
| *B60D 1/54* | (2006.01) | |
| *B60D 1/06* | (2006.01) | |
| *B60D 1/62* | (2006.01) | |

(52) U.S. Cl.
CPC .................. *B60D 1/54* (2013.01); *B60D 1/06* (2013.01); *B60D 1/065* (2013.01); *B60D 1/62* (2013.01); *B60D 2001/544* (2013.01)

(58) Field of Classification Search
None
See application file for complete search history.

(56) References Cited

U.S. PATENT DOCUMENTS

| | | | | |
|---|---|---|---|---|
| 6,547,271 | B2 * | 4/2003 | Kleb | B60D 1/06 |
| | | | | 280/491.3 |
| 9,150,061 | B2 * | 10/2015 | Riehle | B60D 1/01 |
| 9,774,822 | B2 * | 9/2017 | Rhoads | H04N 5/40 |
| 9,834,049 | B2 * | 12/2017 | Strand | B60D 1/246 |
| 2002/0020988 | A1 | 2/2002 | Kleb et al. | |

FOREIGN PATENT DOCUMENTS

| | | |
|---|---|---|
| DE | 199 44 100 A1 | 3/2001 |
| DE | 20 2011 103 345 U1 | 8/2012 |

(Continued)

OTHER PUBLICATIONS

English Translation of DE102015204900 (Year: 2016).*

*Primary Examiner* — Jacob D Knutson
*Assistant Examiner* — Harold Eric Pahlck, III
(74) *Attorney, Agent, or Firm* — Reinhart Boerner Van Deuren P.C.

(57) ABSTRACT

In order for a trailer hitch, comprising a pivot bearing unit mountable on a rear end portion of a vehicle body, in fixed relation to the vehicle, and a pivot element supported on the pivot bearing unit for pivotal movement about at least one pivot axis, said pivot element having fixedly connected thereto a ball neck carrying a hitch ball, said ball neck being pivotable, by pivoting the pivot element about the at least one pivot axis relative to the pivot bearing unit, between two final positions, one of which is an operating position and another one of which is a rest position, to be improved such that the location of the pivot element can be detected as simply and unambiguously as possible, it is proposed that a sensor system be provided for detecting at least one location of the pivot element relative to the pivot bearing unit with respect to the at least one pivot axis, which sensor system detects the locations of the pivot element relative to the pivot bearing unit mounted in fixed relation to the vehicle and generates position information representative of the respective location of the pivot element.

44 Claims, 34 Drawing Sheets

(56) References Cited

FOREIGN PATENT DOCUMENTS

| | | |
|---|---|---|
| DE | 10 2012 216 798 A1 | 3/2014 |
| DE | 10 2013 007 726 A1 | 11/2014 |
| DE | 10 2015 219 151 A1 | 3/2016 |
| DE | 10 2015 204 900 A1 | 9/2016 |
| DE | 102015204900 A1 * | 9/2016 ............... B60D 1/06 |
| EP | 1 916 127 A1 | 4/2008 |
| EP | 2 801 487 A1 | 11/2014 |

* cited by examiner

TRAILER HITCH

CROSS-REFERENCE TO RELATED PATENT APPLICATION

This patent application claims the benefit of German application No. 10 2017 102 505.7 filed Feb. 8, 2017, the teachings and disclosure of which are hereby incorporated in their entirety by reference thereto.

BACKGROUND OF THE INVENTION

The invention relates to a trailer hitch, comprising a pivot bearing unit mountable on a rear end portion of a vehicle body, in fixed relation to the vehicle, and a pivot element supported on the pivot bearing unit for pivotal movement about at least one pivot axis, said pivot element having fixedly connected thereto a ball neck carrying a hitch ball, said ball neck being pivotable, by pivoting the pivot element about the at least one pivot axis relative to the pivot bearing unit, between two final positions, one of which is an operating position in which the ball neck extends substantially in a vertical longitudinal center plane of the trailer hitch which, particularly in the state of being mounted to the vehicle body, is coincident with the vertical longitudinal center plane of the vehicle body, and another one of which is a rest position in which the ball neck extends transversely with respect to the vertical longitudinal center plane.

Such trailer hitches are known in the art.

In such trailer hitches, the final position is conventionally detected by use of a push button that is associated with the final position or associated with a pivotally blocking device which is effective in the final position.

These solutions have the drawback that, in some operating states, it is not possible to unambiguously detect the location of the pivot element together with the ball neck.

Therefore, it is an object of the invention to improve a trailer hitch of the kind described at the outset such that the location of the pivot element can be detected as simply and unambiguously as possible.

SUMMARY OF THE INVENTION

In accordance with the invention, this object is achieved in a trailer hitch of the type described at the outset in that a sensor system is provided for detecting at least one location of the pivot element relative to the pivot bearing unit with respect to the at least one pivot axis, which sensor system detects the locations of the pivot element relative to the pivot bearing unit mounted in fixed relation to the vehicle and generates position information representative of the respective location of the pivot element.

The advantage of the solution in accordance with the invention is seen in that it is now possible for the locations to be detected unambiguously and directly with the sensor system, without need for indirect detection of the location.

The solution in accordance with the invention is not limited to the detection of a pivotal movement about a single pivot axis but also allows pivotal movements about a plurality of pivot axes to be detected by the sensor system.

Thus, in the simplest case, the expression "location of the pivot element" is understood to mean a rotary location about a pivot axis.

In more complex cases, pivotal movements are performed about a plurality of pivot axes—one after another and/or simultaneously—and hence, the expression "location of the pivot element" is understood to refer to the sum or superposition of a plurality of rotary locations about the respective pivot axes.

In the trailer hitch in accordance with the invention, it is in particular provided for the sensor system to detect at least one location range of the pivot element which encompasses the operating position and the rest position.

With this solution in accordance with the invention, it is at least possible to detect the location of the pivot element not only in the operating position directly or in the rest position directly but also in a location range that encompasses the operating position and the rest position and hence in a pivot angle range that also enables deviations from the respective final position to be detected.

For example, this solution makes it possible to recognize whether the respective final position has actually been reached or whether the pivot element is short of the final position owing to a disturbance, or also to detect whether a pivot element has moved out of and away from the respective final position by a slight pivotal movement thereof.

Preferably, the solution in accordance with the invention provides for the location range encompassing the respective final position to comprise the final location position and a pivot angle range reaching as far as this final position, which pivot angle range encompasses an angular extent of a maximum of 10°, preferably an angular extent from a minimum value of 10° to a maximum value of 20°, more preferably an angular extent from a minimum value of 15° to a maximum value of 30°.

However, the solution in accordance with the invention may be used to particular advantage if the sensor system detects the locations of intermediate positions of the pivot element that lie between the operating position and the rest position so that it is also possible to check the movement through such intermediate positions between the operating position and the rest position.

The solution in accordance with the invention is particularly optimal if the sensor system detects the locations of the pivot element during the pivoting from the operating position to the rest position and vice versa.

For the detection of the locations, within the framework of the solution in accordance with the invention, it would in principle be sufficient for the locations to be detected in a certain location raster and not constantly or continuously.

Preferably, the sensor system detects the locations with an angular resolution of better than 0.5° (angular degree), even better 0.2° (angular degree) and preferably 0.1° (angular degree).

In regard to the determination of the position information which provides information as to which of the final positions has been reached or which intermediate position has been reached relative to the final positions, for example which angular distance exists from one or both of the final positions, it is preferably provided for the sensor system to comprise an evaluation unit which compares the locations of the pivot element detected by the sensor unit with reference values, in particular with reference values that are determined by learning processes and subsequently stored, and determines therefrom the position information for the pivot element.

For example, in this connection, the reference values comprise angular information relating to the locations of the final positions and hence, starting from the final positions, information relating to the angular distances of the intermediate positions, detected in each case, from the final positions.

The evaluation unit is thus capable of generating the position information that provides unambiguous indication of the operating position and the rest position.

The play in one of the final positions can be recognized via a comparison of the position information with reference values.

In a particularly advantageous solution it is provided that—particularly when in travel mode—the play is recognized via a variation pattern analysis in which variations of the position information are evaluated, wherein an evaluation of a variation bandwidth and/or a location of the variations relative to an exact value is analyzed relative to an exact value for the final position.

In particular for purposes of checking for potential play in the final positions, it is preferably provided for the evaluation unit to detect a deviation from a final position by way of a variation pattern analysis, particularly in which a variation pattern stored as a reference is compared with a variation pattern obtained from the position information.

Furthermore, the evaluation unit is thus also capable of generating the position information that provides unambiguous indication of the intermediate positions lying between the final positions.

In a particularly advantageous solution, it is provided that the trailer hitch comprises at least one motorized drive unit for performing the pivotal movement and comprises a pivot controller which cooperates with the evaluation unit and makes use of the position information for controlling the at least one drive unit and that the pivot controller controls the drive unit taking into account the position information.

The advantage of this solution is seen in that, on the one hand, it is rendered possible, by virtue of the at least one motorized drive unit, to provide for motorized driving of the pivotal movement and for this motorized driving to be controlled via the pivot controller which, on the basis of the position information made available to it by the evaluation unit, is able to identify the individual pivoting positions and to control, in a manner corresponding to the pivoting positions reached, the further pivotal movement in a manner corresponding to the pivotal movement already performed or yet to be performed, and/or to detect pivoting speeds, in particular so that the safety requirements demanded for a motor vehicle can thereby be performed automatically by the pivot controller.

For example, the solution in accordance with the invention provides for the pivot controller to comprise a pivot mode of operation in which the pivot element together with the ball neck is pivoted from one of the final positions to the other final position.

In particular, the pivot controller works in such a way that it recognizes when the ball neck strikes an extraneous object and, in this pivoting position, halts the drive for pivoting the ball neck or, by the drive, returns the ball neck to the final position from which the pivotal movement originated.

Preferably, in such a pivot mode of operation, provision is made for the pivot controller to switch off a drive motor, driving the pivotal movement, of the at least one drive unit when the respective final position is reached as the conclusion of a process of entry into this final position.

The advantage of this solution is seen in that, as contrasted to the prior solutions, where the drive motor that drives the pivotal movement is switched off based on motor current, it is now possible for the actual reaching of the respective final position to be ascertained and utilized to switch off the drive motor.

As contrasted to the use of motor current monitoring for switching off the drive motor, this results in that the reaching of the final position can definitely be detected and, thus, disturbances which for example cause blocking before the final position is reached are precluded from causing switching-off of the drive motor.

A further advantageous solution provides for the pivot controller in the pivot mode of operation, in the course of pivoting of the pivot element from one final position to the other final position, controls the drive unit in such a manner that same pivots the pivot element at a predetermined constant speed or at speeds predetermined in a manner corresponding to a movement profile, for example a stored movement profile.

The position information can thus be made use of by the pivot controller to control the drive controller in such a manner that, in the simplest case, the drive controller rotates the pivot element at the predetermined constant speed, which speed can be controlled by the position information on the actual location of the pivot element being available.

Even more advantageous is the solution in which the pivot controller controls the drive unit in such a way that same moves the pivot element and the ball neck in the different pivoting positions at corresponding optimized speeds.

In this case, it is for example possible for the speed to be increased to maximum speed when moving out of a final position and for the speed to be reduced again before reaching the other final position such that the pivot element and the ball neck will no reach the other final position, which is usually defined by stop, at too high a speed but instead at a speed that is reduced to such level that striking the respective stop for the final position with too much impact is precluded.

A further advantageous embodiment of the solution in accordance with the invention provides for the pivot controller to monitor the pivotal movement and/or blocking or unblocking of the pivotal movement by comparing the position information of the pivot element with a rotary movement signal of the drive motor of the at least one drive unit.

The advantage of this solution is seen in that it provides a way of establishing a correlation between the drive motor and the function actually performed.

In particular, it is provided for the pivot controller, by comparing the position information of the pivot element with the rotary movement signal of the drive motor, to determine a movement relationship and compare this with stored reference values for the movement relationship.

For example, it is possible for the pivot controller to generate a fault signal if the determined movement relationship deviates from the predetermined movement relationship.

Furthermore, another advantageous solution provides for the pivot controller to be operable in a holding mode of operation in which the respective final position, in particular the operating position or the rest position of the pivot element, is maintained by way of the pivot controller.

The advantage of this solution is seen in that, for example, it affords the possibility of checking whether the pivot element and the ball neck stay, for example, in the operating position or whether they have a tendency to exit the operating position owing to play or other processes.

This information is extremely relevant in terms of safety and hence, advantageously available through the solution in accordance with the invention.

In particular, it is provided that, in particular if blocking has not yet occurred, upon receipt of the position information indicating that the respective final position has been exited, the pivot controller drives the drive unit in the sense of pivoting into the respective final position that has just been exited.

It is thereby rendered possible to securely retain the respective final position, in particular the operating position, and thus reliably preclude an unsafe operating state.

In connection with the previous description of the trailer hitch in accordance with the invention, no details have been provided yet about whether and how a final position of the pivot element and the ball neck, in particular the operating position and the rest position, is to be blocked.

Therefore, in a particularly advantageous solution, it is provided that the trailer hitch comprises a pivotally blocking device, that the pivotally blocking device is movable from a blocking position to a freewheeling position and vice versa by way of a drive unit and that the pivot controller which cooperates with the evaluation unit and makes use of the position information is provided for controlling the drive unit taking into account the position information.

Thus, the pivot controller in accordance with the invention at the same time provides the possibility of controlling the drive unit of the pivotally blocking device in order to transfer same between its blocking position, in which the pivotal movement of the pivot element and the ball neck is blocked, and a freewheeling position in which the pivot element and the ball neck are enabled to rotate freely about the pivot axis, and vice versa.

Preferably, it is provided that the pivot controller in a pivot mode of operation controls the drive unit in such a manner that the pivotally blocking device transitions from the freewheeling position to the blocking position when the respective final position is reached as the conclusion of a process of entry into this final position.

This means that, by way of the pivot controller, the pivotally blocking device is thereby automatically transferred from the freewheeling position to the blocking position and vice versa and thus, via the position information, the reaching of the respective final position is detected so that the pivotal movement is then blocked.

This solution has an advantage over the solution in which detection of current input is used for switching off the respective drive motor for performing the pivotal movement in that, by virtue of the position information, the information indicating reaching the respective final position is definitely present so that it is thereby also possible to control the drive unit for the pivotally blocking device for transitioning from the freewheeling position to the blocking position and hence reliably achieve a safe operating state in the final position by blocking the pivotal movement.

Furthermore, the pivot controller preferably works in such a manner that, in a pivot mode of operation, it retains the pivotally blocking device in the freewheeling position until the pivot element has reached one of the final positions.

A further advantageous solution provides for the pivot controller, in a holding mode of operation, upon receipt of the position information indicating the presence of play in the respective final position, controls the drive unit for the pivotally blocking device in such a manner that the pivotally blocking device is driven in a direction of its blocking position in the respective final position.

With this solution, it is thus possible, for example upon the occurrence of play or slack in the blocking of the pivot element and the ball neck, particularly when in the operating position, for such play or slack in the blocking to be recognized and, by repeated driving of the pivotally blocking device, to again transfer same to a blocking state in which the play is eliminated.

A further advantageous solution provides that the trailer hitch comprises a pivotally blocking device for fixing the ball neck in the final positions and that the pivotally blocking device is transferable, by a drive unit, from a blocking position to a release position and from the release position to a blocking standby position and that the pivot controller which cooperates with the evaluation unit and makes use of the position information is provided for controlling the drive unit taking into account the position information.

In particular, such a solution is provided for all those cases in which the actuating body is acted upon in a direction from the release position towards a direction of the blocking position by way of an elastic force storage device and remains in the blocking position under the continuous action of the elastic force storage device.

In this case, the drive unit serves to move the actuating body from the blocking position, against the action of force of the elastic force storage device, to the release position. As soon as the action of the pivotally blocking device ceases, the ball neck can be moved and, when the final position is reached, the actuating body of the pivotally blocking device is moved by the elastic force storage device, wherein the drive unit transitions to a standby position in which it allows transition from the release position to the blocking position by moving the actuating body by way of the elastic force storage device.

A particularly preferred solution is one in which the pivot controller in a movement mode of operation, during the movement of the ball neck between the final positions, moves the pivotally blocking device into the blocking standby position from which the pivotally blocking device transitions to the blocking position automatically, in particular by the elastic force storage device acting upon the actuating body.

A further advantageous solution provides for the pivot controller to control a restraining device of the pivotally blocking device.

Such a restraining device serves to maintain individual pivoting states of the pivotally blocking device, particularly when the pivotal movement and the pivotally blocking device are driven via a planetary gear mechanism that is driven via a drive unit and has two outputs, wherein one output of the planetary gear mechanism is used to drive the pivotally blocking device and the other output of the planetary gear mechanism is used to drive the pivotal movement.

In this case the restraining device serves to initiate a changeover between driving the pivotal movement and driving the pivotally blocking device or vice versa by imposing a restraint on one of the outputs, for example by imposing a restraint on the pivotal movement.

No details of the configuration of the sensor systems have been given in conjunction with the previously described individual exemplary embodiments.

Thus, an advantageous solution provides for the sensor system to comprise a sensor head held to the pivot bearing unit or co-pivotable with the pivot element or the ball neck, which sensor head senses a position structure that is co-pivotable with the pivot element or the ball neck or is fixedly arranged at the pivot bearing unit respectively.

Preferably, the position structure is configured such that it extends along a circular arc segment extending about the at least one pivot axis, which circular arc segment is then movable relative to the sensor head when the pivot element and the ball neck are pivoted.

By way of example, the position structure may be a localized structure, i.e., a structure that extends over only a defined location range, for example a location range that is associated with a final position.

However, it is particularly advantageous for the position structure to be a continuous structure, i.e., in particular a structure that spans the entire location range from one final position to the other final position.

Preferably, provision is also made for the continuous structure to be detected by the sensor head when the pivot element moves from the one final position to the other final position so that, by virtue of the position structure, the possibility exists for detecting the final positions as well as intermediate positions.

The sensor head and the position structure or the measuring principle upon which they rely can conceivably be configured in a wide variety of ways.

In principle, one conceivable possibility would be for the position structure to be an optical structure which is optically sensed by the sensor head in order to detect the locations.

However, such an optical structure is associated with the drawback that it is sensitive to dirt.

Therefore, an advantageous solution provides for the position structure to be configured as a magnetic field influencing structure and for the sensor head to detect changes in a magnetic field which occur by the sensor head sensing the magnetic field influencing structure that varies in a direction of the relative movement.

In this case, for example, the sensor head is a magnetically biased sensor head, i.e., a sensor head which itself generates a magnet field, whose magnetic field then experiences variations by the relative movements with respect to the magnetic field influencing structure and these variations of the magnetic field are then detected by a magnetic field sensor of the sensor head.

However, as an alternative thereto, it is also conceivable to provide a magnetically varying position structure which is sensed by a sensor head configured as a magnetic field sensor.

Alternatively or in addition to providing a sensor head and a position structure, a further embodiment of a sensor system in accordance with the invention provides for the sensor system to comprise a first sensor arranged for co-pivotal movement with the pivot element or the ball neck and to comprise an evaluation unit connected to the first sensor, which evaluation unit, for determining the location of the pivot element or the ball neck, compares sensor signals of the first sensor with reference values associated with the respective location and thereby generates the position information for the pivot element.

A further advantageous solution provides for the sensor system to comprise a first sensor arranged for co-pivotal movement with the pivot element or the ball neck and to comprise a second sensor fixedly arranged at the pivot bearing unit and for the sensor system to comprise an evaluation unit connected to the first sensor and the second sensor, which evaluation unit detects difference values of the sensors and, for determining the location of the pivot element, compares these with stored reference values for the difference values associated with the respective location and thereby generates position information for the pivot element.

In particular, such a first sensor and, where applicable, such a second sensor are configured as sensors that detect their orientations and/or movements in space and which, in particular, do not require a reference element to be provided on the trailer hitch for detecting the orientations and/or movements in space.

The use of such sensors is advantageous in that it provides a simple way of detecting complicated movements such as, in particular, multi-axis movements which are executed simultaneously or one after the other.

By way of example, such sensors could be sensors that orient themselves to the Earth's magnetic field.

The first sensor and the second sensor for the above-described solutions are preferably configured as inclination sensors so that, for a rough detection of the rotary position, it would already suffice for the first sensor to co-pivot with the pivot element and/or the ball neck and to thus detect a pivotal movement between the operating position and the rest position on the basis of the varying inclination.

However, because such inclination sensors detect inclinations relative to the direction of gravity, it is particularly advantageous if the first sensor and a second sensor are provided and difference values are formed between the sensor signals because in this case, the inclination of the pivot bearing unit can be detected by the second sensor and hence the relative change in the inclination of the first sensor with respect to the pivot bearing unit can be detected which provides a relatively precise measure of the respective location of the pivot element together with the ball neck relative to the pivot bearing unit.

It is particularly advantageous for the first sensor and the second sensor to be sensors operable as inclination sensors detecting movements in space, for example acceleration sensors.

Preferably, the sensors are configured such that they detect inclinations about at least one inclination axis.

It is particularly advantageous for the sensors to detect inclination values with respect to a direction of gravity for reference.

Here, the evaluation unit detects inclination difference values which are formed from inclination values as measuring values of the sensors, in particular for determining the position information of the pivot element.

For calculating the inclination difference, it is preferably provided for the evaluation unit to detect an inclination difference between an inclination of the first sensor and an inclination of the second sensor in at least one of the final positions.

Furthermore, it is also possible that, for determining the position information of the pivot element on the basis of the determined inclination difference, a course of the inclination values of the first sensor in a pivotal movement from one final position to the other final position is determined, wherein in this case, however, the arrangement of the first sensor relative to the pivot axis and the arrangement of the second sensor relative to the pivot axis are to be taken into account in order for the movement of the Cartesian coordinate system of the first sensor about the pivot axis relative to the second sensor to be taken into account geometrically in determining the location difference.

A particularly advantageous solution provides for the first sensor to have its Z axis, which is relevant for inclination detection, and a further axis of its Cartesian coordinate system lying in a pivoting plane which runs perpendicularly to the pivoting axis so that the pivotal movement only results in a change in inclination in the plane spanned by the Z axis and the further axis.

Furthermore, it is preferably provided for the second sensor to have its Z axis, which is relevant for inclination detection, and a further axis of its Cartesian coordinate system oriented in parallel relation to the pivoting plane so that inclination differences values can be determined in a simple way.

Moreover, a further advantageous solution provides for the evaluation unit to detect accelerations with at least one of the sensors, in particular the first sensor.

Such a detection of accelerations also serves to determine the kinematics of the pivotal movement, wherein the accelerations can be determined in addition to the inclinations or as sole measure of the movement.

It is particularly advantageous in this case for the evaluation unit to detect accelerations with both sensors.

By way of example, an advantageous solution provides for the evaluation unit to detect accelerations in a pivoting plane perpendicular to the pivot axis with the first sensor in order to detect the dynamics of the pivotal movement about the pivot axis in a simple way.

For example, it is conceivable for the evaluation unit to detect accelerations in a direction transverse to a vertical longitudinal center plane and/or to detect accelerations in a direction parallel to the vertical longitudinal center plane.

Furthermore, it is preferably provided for the evaluation unit to detect accelerations in a horizontal direction and/or in a vertical direction.

For completing and/or improving the information relating to the inclinations, the accelerations can be evaluated in particular by way of a time-course pattern analysis, i.e., an analysis of the acceleration values over the time axis, in order to obtain information about the course of the pivotal movement.

Furthermore, it is particularly advantageous for the pivot controller to have associated therewith a visualization unit for indicating operating modes and/or operating states and/or disturbances so that an operator can then easily view the different modes and states.

Further features and advantages of the invention are the subject matter of the following description and the drawings illustrating some exemplary embodiments thereof.

DETAILED DESCRIPTION OF THE INVENTION

Figure 1:
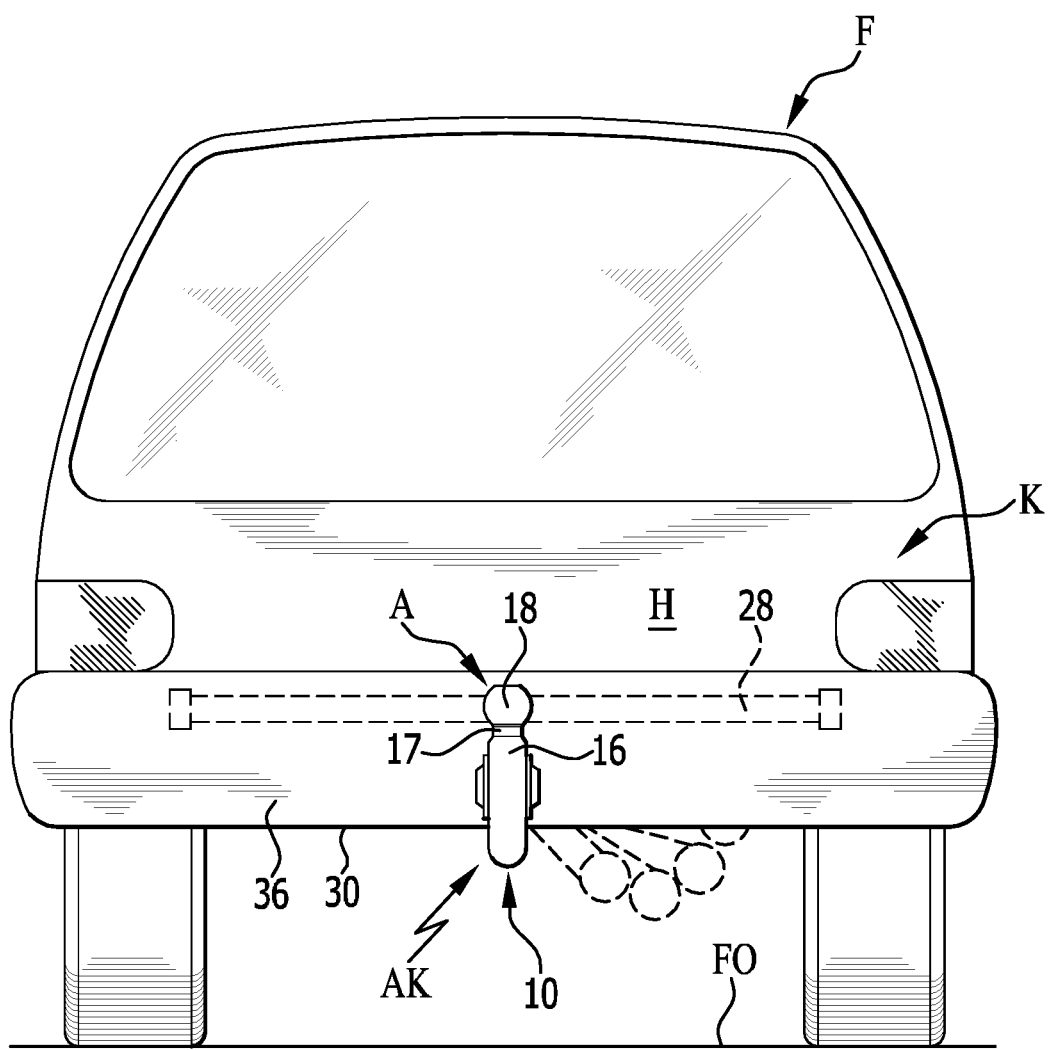
FIG. 1 shows a rear view of a motor vehicle comprising a trailer hitch in accordance with the invention.

A motor vehicle F shown in FIG. 1, in particular an automotive passenger vehicle, comprises a vehicle body K which has, at the rear end portion H thereof, a trailer hitch AK mounted thereto.

Figure 2:
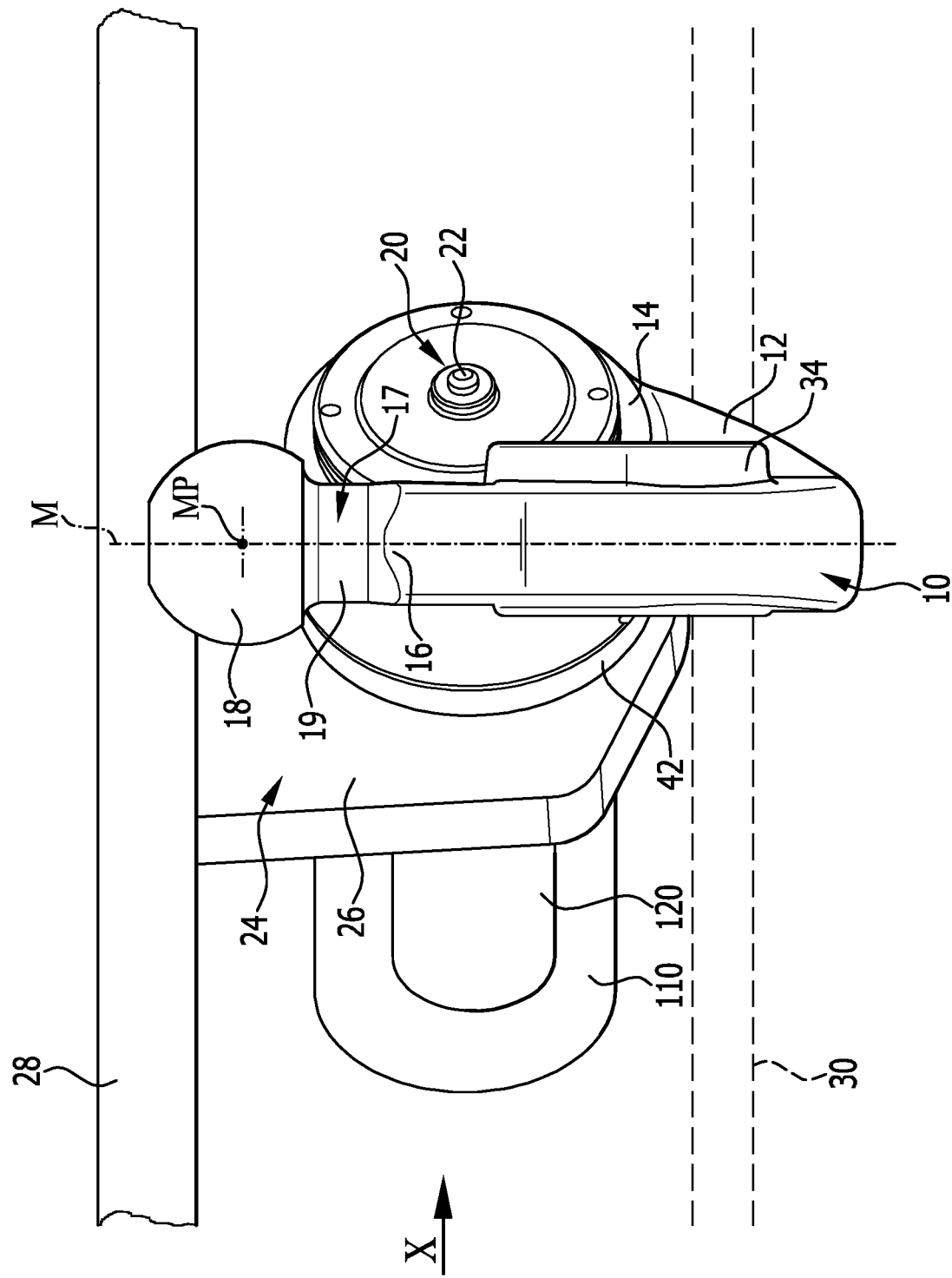
FIG. 2 shows a top view of a first exemplary embodiment of a trailer hitch in accordance with the invention with a view onto the trailer hitch mounted to a rear end of a vehicle, looking in the direction of travel, wherein the trailer hitch is in its operating position.
Figure 3:
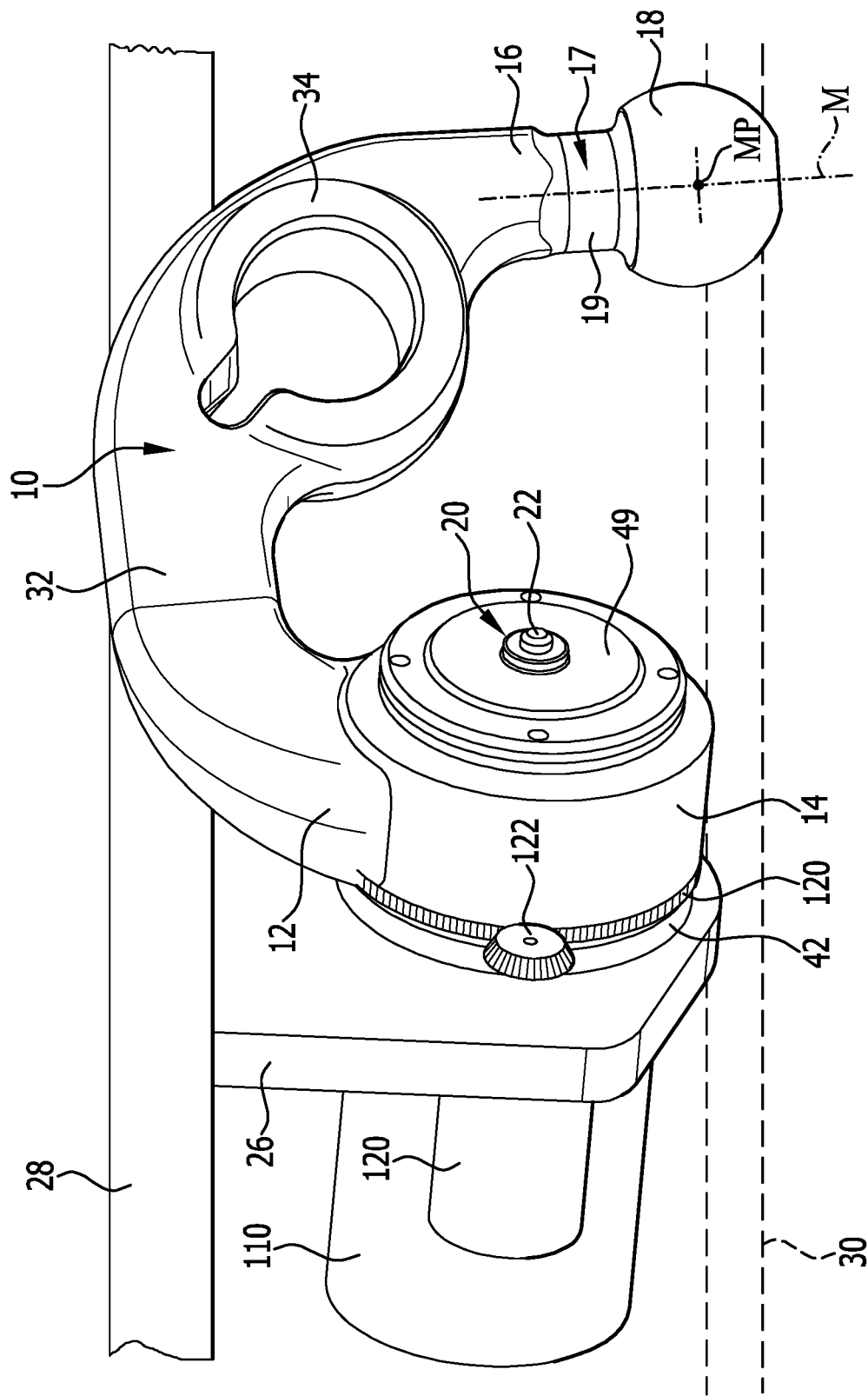
FIG. 3 shows a view, corresponding to FIG. 2, of the trailer hitch located in the rest position.
Figure 4:
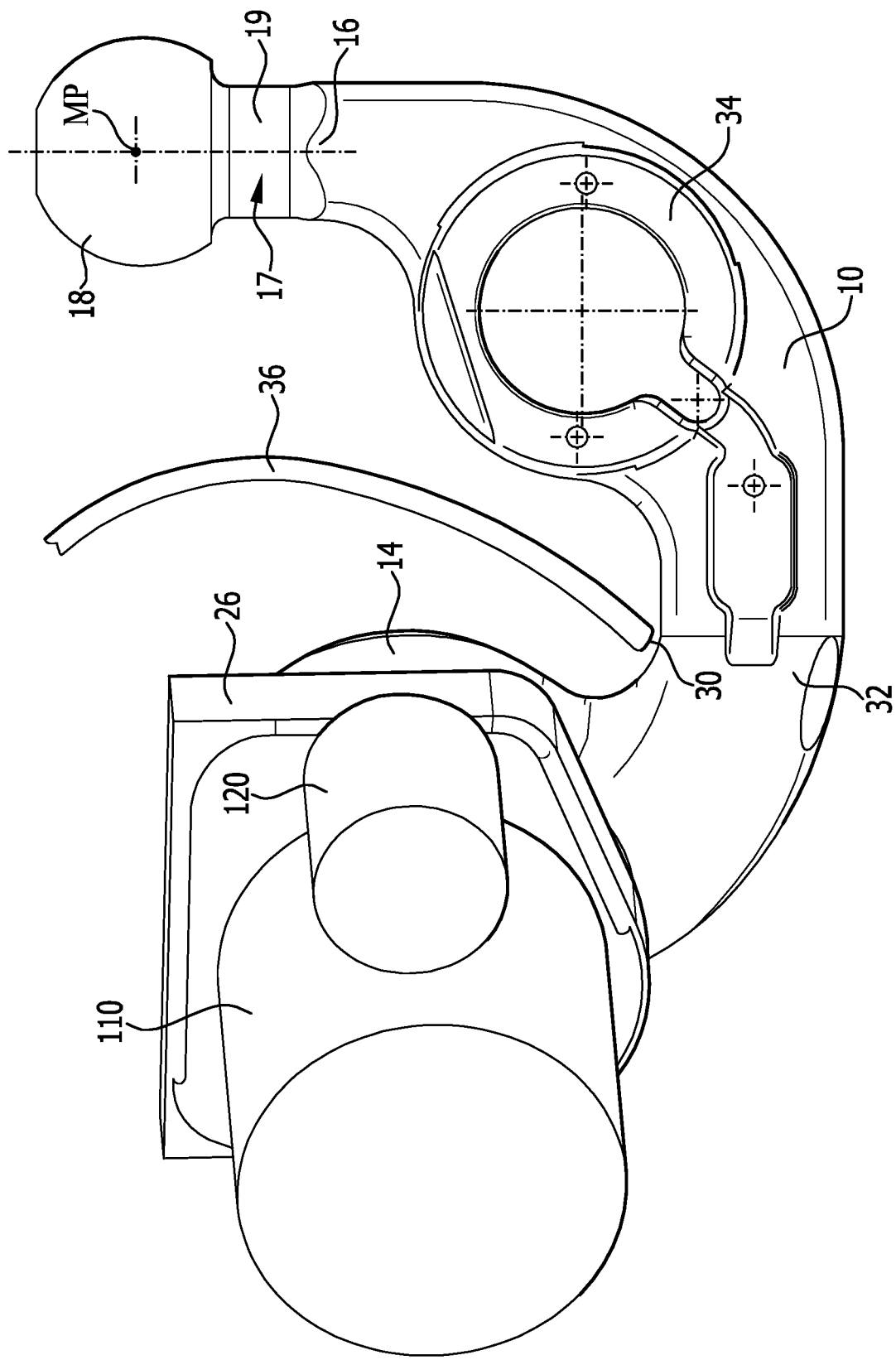
FIG. 4 shows a view taken in the direction of arrow A in FIG. 2.

A first exemplary embodiment of a trailer hitch in accordance with the invention, which is shown in an operating position A in FIGS. 1 and 2 and in a rest position R FIG. 3, comprises a ball neck, designated generally at 10, which at a first end 12 thereof is held to a pivot element 14 and at a second end 16 thereof carries a hitch ball, indicated generally at 18, to which can be fixed a tow ball coupler of a trailer, wherein between the end 16 of the ball neck 10 and the hitch ball 18 a ball attachment formation 17 is provided whose curved surfaces 19 which are cylindrical with respect to a central axis M running through the center point MP of the hitch ball 18 have a smaller radius with respect to the central axis M than do the ball neck 10 at the end 16 thereof and the hitch ball 18.

In particular, the central axis M in the operating position A is located in a vertical longitudinal center plane LM of the motor vehicle F and the trailer hitch 10.

The pivot element 14 is pivotably supported by a pivot bearing unit, designated generally at 20, for pivotal movement about a pivot axis 22 relative to a carrier 24 mounted to the vehicle in fixed relation therewith, wherein the carrier 24 preferably comprises a carrier plate 26 which holds the pivot bearing unit 20 and preferably extends in plane perpendicular to the pivot axis 22, and a transverse member 28 mounted to the vehicle in fixed relation therewith, which transverse member 28 can be fixed in a known manner to the rear end portion H of the vehicle body K, namely in such a manner that the pivot bearing unit 20 and the carrier 24 are located on a side of a lower edge 30 of a bumper unit 36 facing away from a roadway surface FO and are covered by the bumper unit 36 (FIGS. 1 and 3).

In the operating position A as illustrated in FIGS. 1 and 2, the ball neck 10, at a section 32 thereof adjoining the first end 12, engages underneath the lower edge 30 of the bumper unit 36 so that the second end 16 and the hitch ball 18 together with a power socket receptacle 34 are located on a side of the rear bumper unit 36 facing away from the vehicle body, while when in the rest position R, both the pivot bearing unit 20 and the entire ball neck 10 together with the hitch ball 18 are concealed from view from the rear by the rear bumper unit 36.

Figure 5:
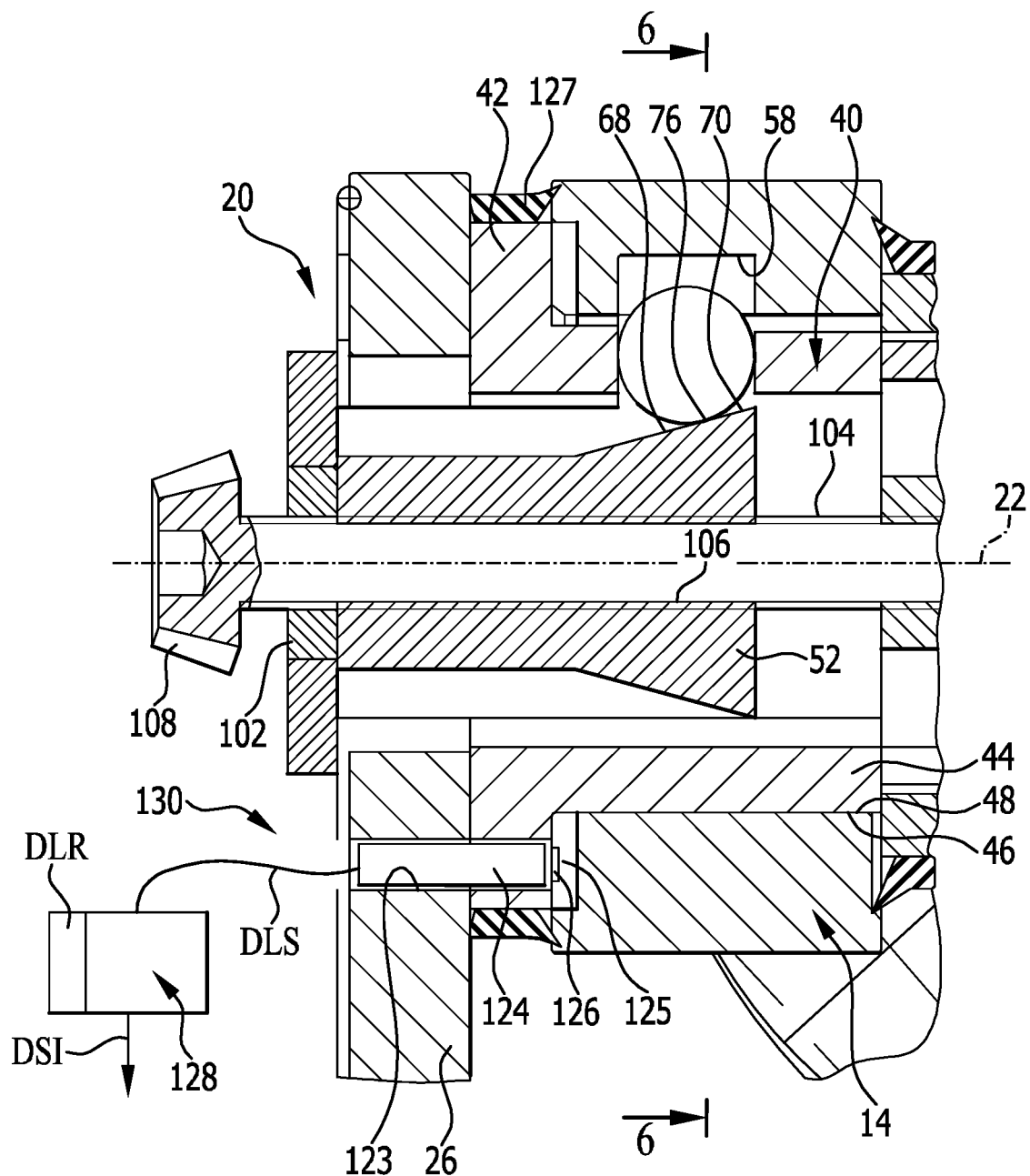
FIG. 5 shows a partial section taken along a sectional plane running through the pivot axis and one of the rotationally blocking bodies, with the rotationally blocking elements in a blocking position and an actuating body in an active position.
Figure 6:
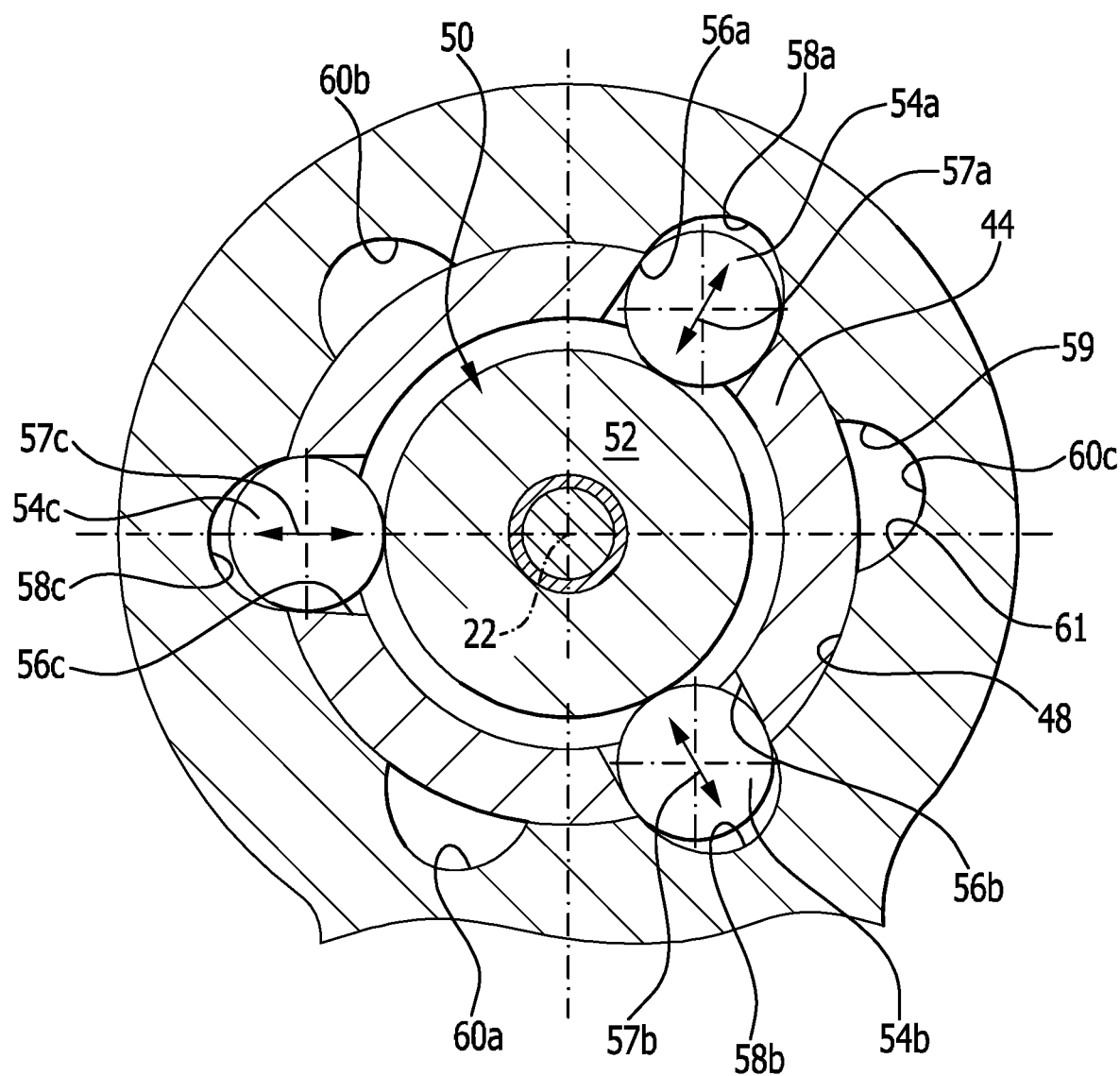
FIG. 6 shows a section taken along line 5-5 of FIG. 5.

As depicted in FIGS. 5 and 6, the pivot bearing unit 20 comprises a guide body 40 which is fixedly connected to the carrier plate 26 by way of a flange 42, a guide sleeve 44 which, starting from the flange 42, extends away from the carrier plate 26 and on which the pivot element 14 is rotatably supported, and a terminating cover 49 fixedly connected to the guide sleeve 44 and arranged on a side of the guide sleeve 44 opposite to the flange 42. To this end, the guide sleeve 44 comprises a cylindrical curved outer surface 46 on which the pivot element 14 rests via a cylindrical inner surface 48 thereof, thereby being provided with rotary guidance about the pivot axis 22 so that the pivot element 14 can be rotated in relation to the guide body 40 in such a way that the ball neck 10 can be pivoted from the operating position A to the rest position R and vice versa.

By being fixedly connected to the carrier plate 26 and the carrier 24, the guide body 40 thus forms the rotary support coupled in fixed relation to the vehicle for the pivot element 14.

For fixing the pivot element 14 in the operating position A and in the rest position R, the pivot bearing unit 20 is provided with a pivotally blocking device, generally designated at 50, which comprises an actuating body 52, a plurality of rotationally blocking bodies 54 capable of being acted upon by the actuating body 52, these being guided in guide receptacles 56 of the guide sleeve 44 for movement in a guide direction 57 extending substantially radially with respect to the pivot axis 22, and comprises first receptacles 58 and second receptacles 60 which, starting from the inner surface 48 of the pivot element 14, extend into the pivot element 14 and with which the rotationally blocking bodies 54 can be brought in engagement when in the operating position A or in the rest position R, wherein the receptacles 58, 60 have wall surfaces 59, 61 spaced at increasingly smaller distances from one another in a radial direction with respect to the pivot axis 22.

If for example, as it is shown in conjunction with FIG. 5 and FIG. 6 for the first exemplary embodiment, the pivotally blocking device 50 comprises a set of three rotationally blocking bodies 54a, 54b and 54c, then the guide sleeve 44 has a set of three guide receptacles 56a, 56b and 56c in which the rotationally blocking bodies 54a, 54b and 54c are guided for displacement in the guide direction 57 which extends substantially radially with respect to the pivot axis 22, and the pivot element 14 is provided with a set of first receptacles 58a, 58b and 58c with which the rotationally blocking bodies 54a, 54b and 54c can be brought into engagement when in the operating position A, and is provided with a set of second receptacles 60a, 60b and 60c with which the rotationally blocking bodies 54a, 54b and 54c can be brought into engagement when in the rest position R.

For appropriately moving and positioning the rotationally blocking bodies 54 in the guide direction 57, the actuating body 52 is provided with retreat receptacles 62 which, in the simplest case, are formed by a cylindrical surface 63 of the actuating body set back from the guide body 40 in a radial direction with respect to the pivot axis 22, and with pressure surfaces 66 adjoining the retreat receptacles 62 in an axial direction 64, which pressure surfaces 66, in the simplest case, are formed as a conical surface 67 which, starting from the cylindrical surface 63, widens conically in a radial direction with respect to the pivot axis 22. The rotationally blocking bodies 54, when in their freewheeling position, rest in the area of the retreat receptacles 62, i.e., on the cylindrical surface 63 of the actuating body 52, and are therefore moved far enough into the guide body 40 in a radial direction with respect to the pivot axis 22 to no longer project beyond the outer curved surface 46 of the guide sleeve 44.

By way of the pressure surfaces 66, with increasing displacement of the actuating body 52 in an axial direction 64, the rotationally blocking bodies 54 can be moved radially outwardly in relation to the guide sleeve 44 until they are located in a first rotationally blocking position in which the rotationally blocking bodies 54 have been pushed outward in their guide direction 57 far enough for them to engage either in the receptacles 58 or the receptacles 60 of the pivot element and thus fix same relative to the guide sleeve 44.

In the exemplary embodiments described, the pressure surfaces 66 are illustrated as conical surfaces 67 for the sake of simplicity. However, it is possible to utilize any body that widens increasingly and continuously in a radial direction with respect to the pivot axis 22 and is capable of moving the rotationally blocking bodies 54 in their guide direction 57 when the actuating body 52 is displaced in the axial direction 64.

Figure 7:
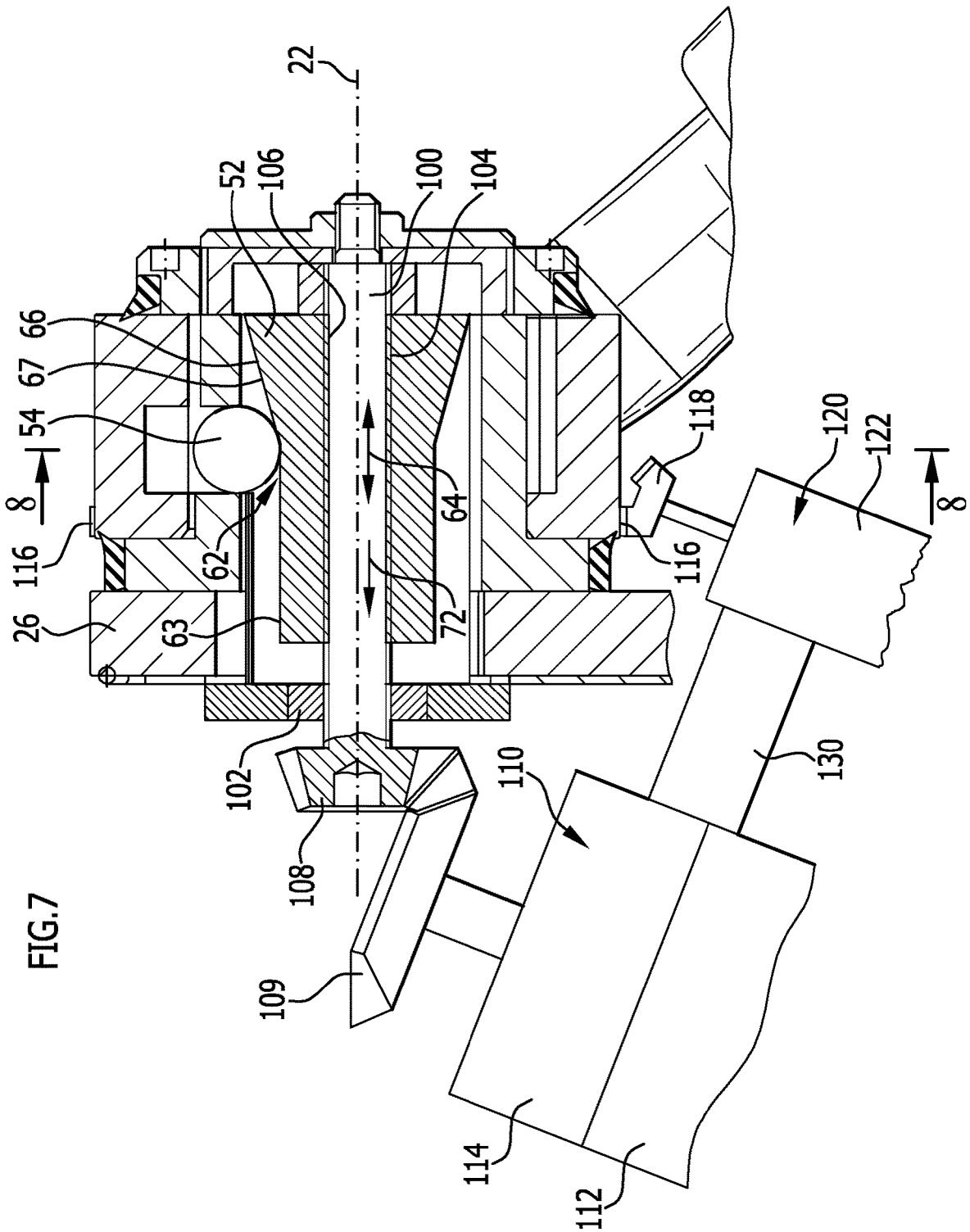
FIG. 7 shows a representation, similar to FIG. 5, with the rotationally blocking body in a freewheeling position and the actuating body in an inactive position.
Figure 8:
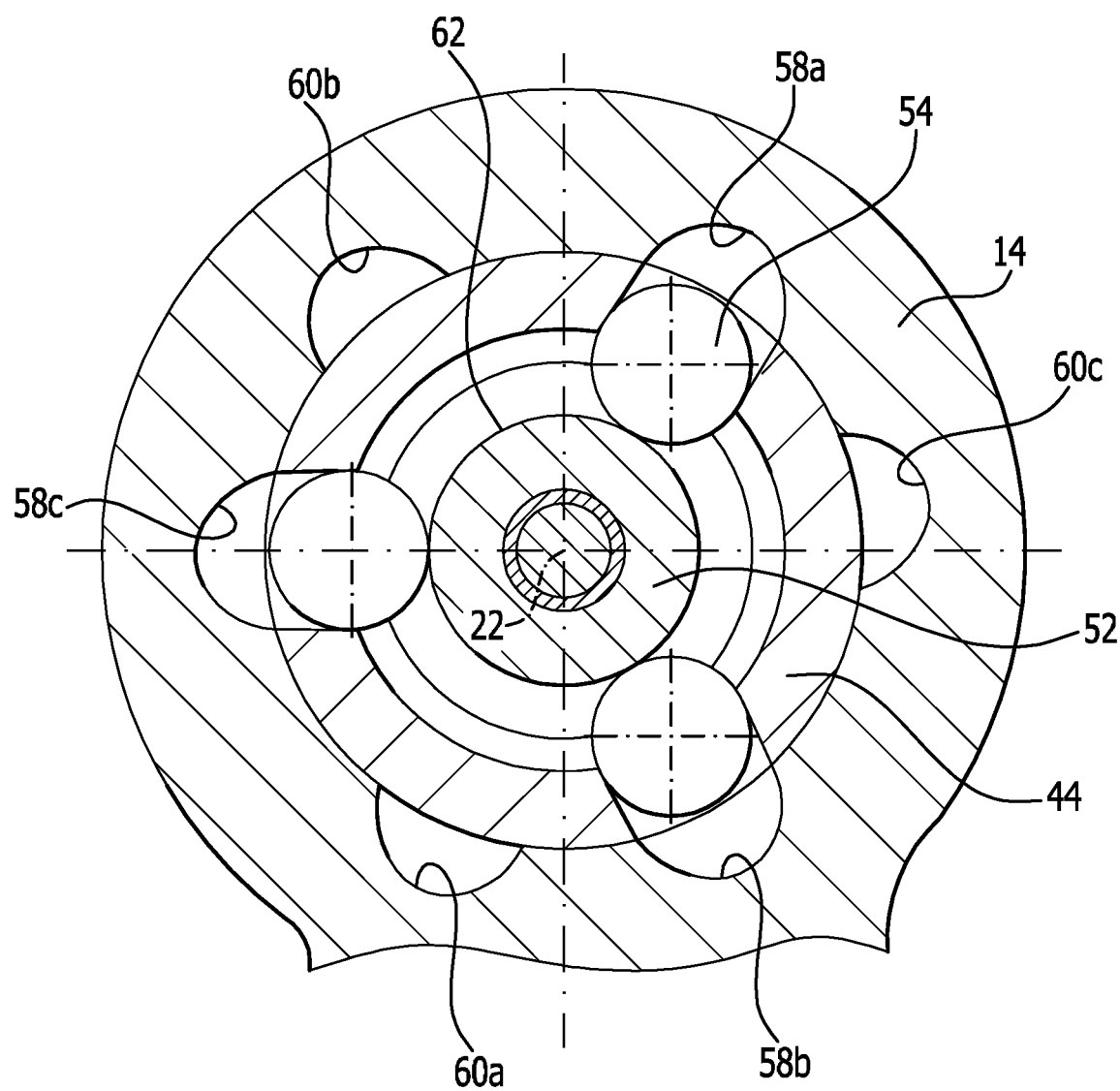
FIG. 8 shows a section corresponding to FIG. 6, with the rotationally blocking bodies and the actuating body positioned as in FIG. 7.

In order either to retain the rotationally blocking bodies 54 in their rotationally blocking position by subjecting them to the action of the pressure surfaces 66 or to allow them to rest on the retreat receptacle 62 when in the freewheeling position, the actuating body 52 is displaceable in the axial direction 64 parallel to the pivot axis 22, in particular coaxially with the latter, namely such that either the retreat receptacle 62 faces towards the respective rotationally blocking body 54 and enables the latter, in the active position thereof, as illustrated in FIGS. 7 and 8, to extend into the guide sleeve 44 in a direction of the retreat receptacle 62, radially towards the pivot axis 22, and enables the respective rotationally blocking bodies 54 to release the first receptacles 58 or the second receptacles 60 in respect of rotation, together with the pivot element 14, about the pivot axis 22 so that the pivot element 14 together with the ball neck 10 can rotate unhindered and freely relative to the guide sleeve 44, as is illustrated in FIGS. 7 and 8, wherein in this case the rotationally blocking bodies 54 do not extend beyond the outer curved surface 46 of the guide sleeve 44.

Displacement of the actuating body 52 in a direction 72, towards the carrier plate 26, with the rotationally blocking body 54 resting on the respective retreat receptacle 62, causes the respective rotationally blocking body 54 to be moved out of the retreat receptacle 62 and to be moved, by the pressure surface 66, in its guide direction 57 radially outwardly with respect to the pivot axis 22, whereby it reaches its first rotationally blocking position and extends either into the respective first receptacle 58 or into the respective second receptacle 60 and thus inhibits the free rotatability of the pivot element 14.

The actuating body 52 can be moved along the axial direction 64 in the direction 72 in such a manner that, first the rotationally blocking bodies 54 are acted upon by starting regions 68 of the pressure surfaces 66 and, then, the rotationally blocking bodies 54 are acted upon by regions of the respective pressure surfaces 66 that are spaced increasingly radially outwardly from the pivot axis 22 and thus, for example in the operating position A of the ball neck 10, increasingly urge the rotationally blocking bodies 54 into the first receptacles 58a, 58b and 58c, as is illustrated in FIGS. 5 and 6, in order to thus achieve fixing of the pivot element 14 with substantially no play relative to the guide body 40, in this case relative to the guide sleeve 44.

In this rotationally blocking position of the rotationally blocking bodies 54, the actuating body 52 is located in its active position in respect of blocking such that, as is illustrated in FIGS. 5 and 6, the rotationally blocking bodies 54 rest approximately on intermediate regions 76 located between the starting regions 68 and the end regions 70, having the largest radial distance from the pivot axis 22, of the pressure surfaces 66.

Play-free locking of the pivot element 14 by the rotationally blocking bodies 54 in their rotationally blocking position can be achieved particularly advantageously if the rotationally blocking bodies 54 and the receptacles 58 and 60 are configured such that, as one of the rotationally blocking bodies 54 extends increasingly into one of the receptacles 58 or 60 and the rotationally blocking bodies 54 are in contact against one side of the receptacles 58 and 60, each of the rotationally blocking bodies 54 together with the receptacle 58 or 60 interacting therewith causes the pivot element 14 to rotate, wherein the set of rotationally blocking bodies 54a to 54c as a whole acts on the receptacles 58 or 60 as a whole with torques 90, 92 that act in opposing directions, for fixing the pivot element 14 without play.

By way of example, as illustrated in FIGS. 9 to 12, the rotationally blocking body 54b has its curved surface 84b in contact against only a side 86b of the guide receptacle 56b, for example the side located in a direction of revolution 65, and has an opposite region of its curved surface 84b supported on a side 88b of the receptacle 58b which is located in opposite direction to the direction of revolution 65, wherein, as the rotationally blocking body 54 increasingly moves in a radial direction with respect to the pivot axis 22, a torque 90 acting in opposite direction to the direction of revolution 65 results, which torque 90 acts on the pivot element 14.

Furthermore, the rotationally blocking body 54c has its curved surface 84c in contact against a side 86c of the guide receptacle 56c which is located in opposite direction to the direction of revolution 65, and has an opposite region of the curved surface 84c thereof acting on a side 89c of the first receptacle 58c, whereby a torque 92 acting in the direction of revolution 65 is created which acts on the pivot element 14.

Figure 11:
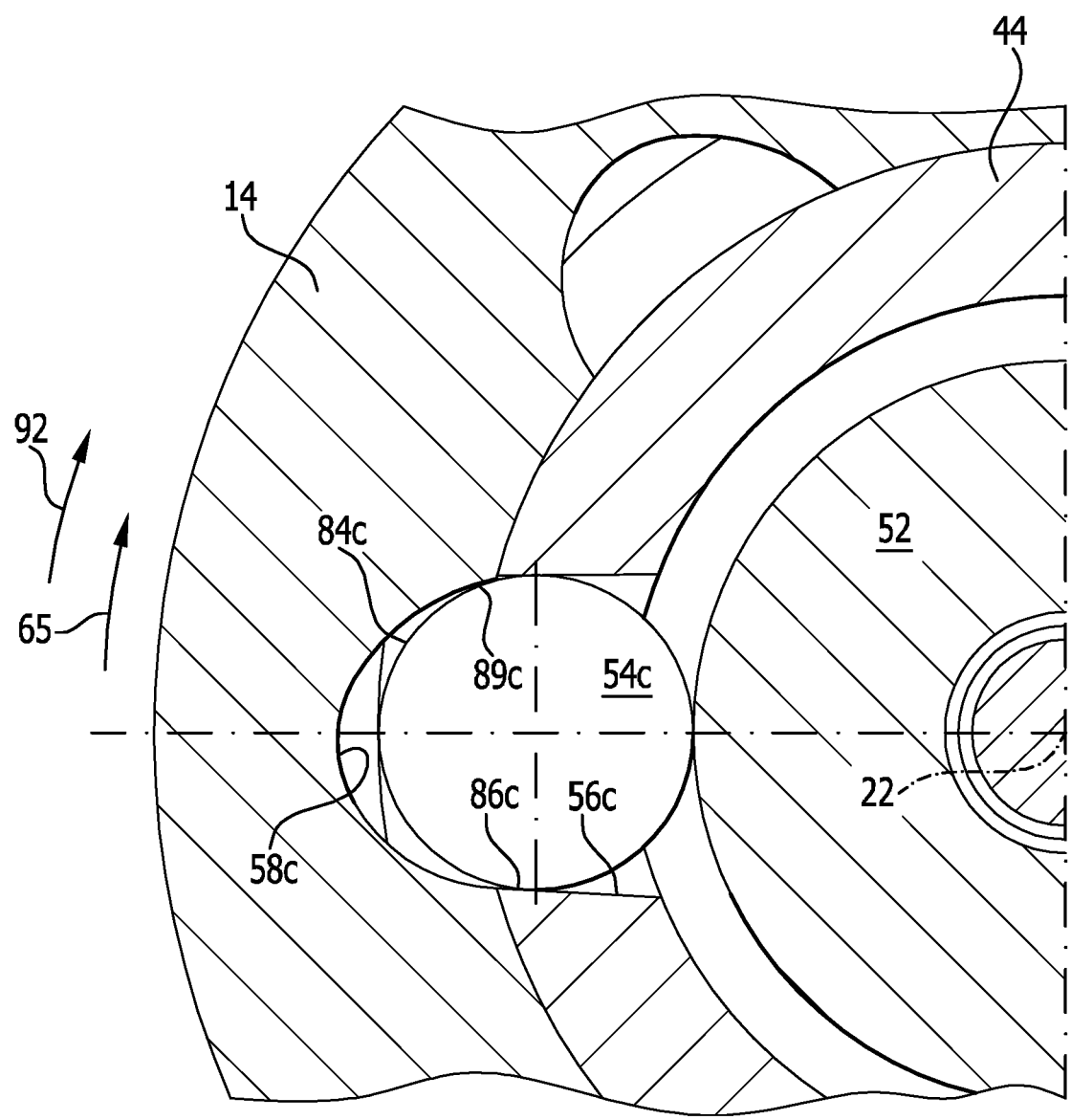
FIG. 11 shows a representation of the rotationally blocking element 54c in an enlarged detail view.

As illustrated in FIG. 11, the torques 90 and 92 generated by the rotationally blocking bodies 54b and 54c thus act in opposite directions to one another and allow the pivot element 14 to be fixed without play relative to the guide body 40, in particular to the guide sleeve 44 thereof, because by virtue of the one-sided contact of the rotationally blocking bodies 54 on the one hand against the guide receptacle 56 and on the other hand against the first receptacle 58 in each case, the play between the guide receptacle 56 and the rotationally blocking body 54 and the first receptacle 58 in the area of the two rotationally blocking bodies 54b and 54c is eliminated.

Figure 12:
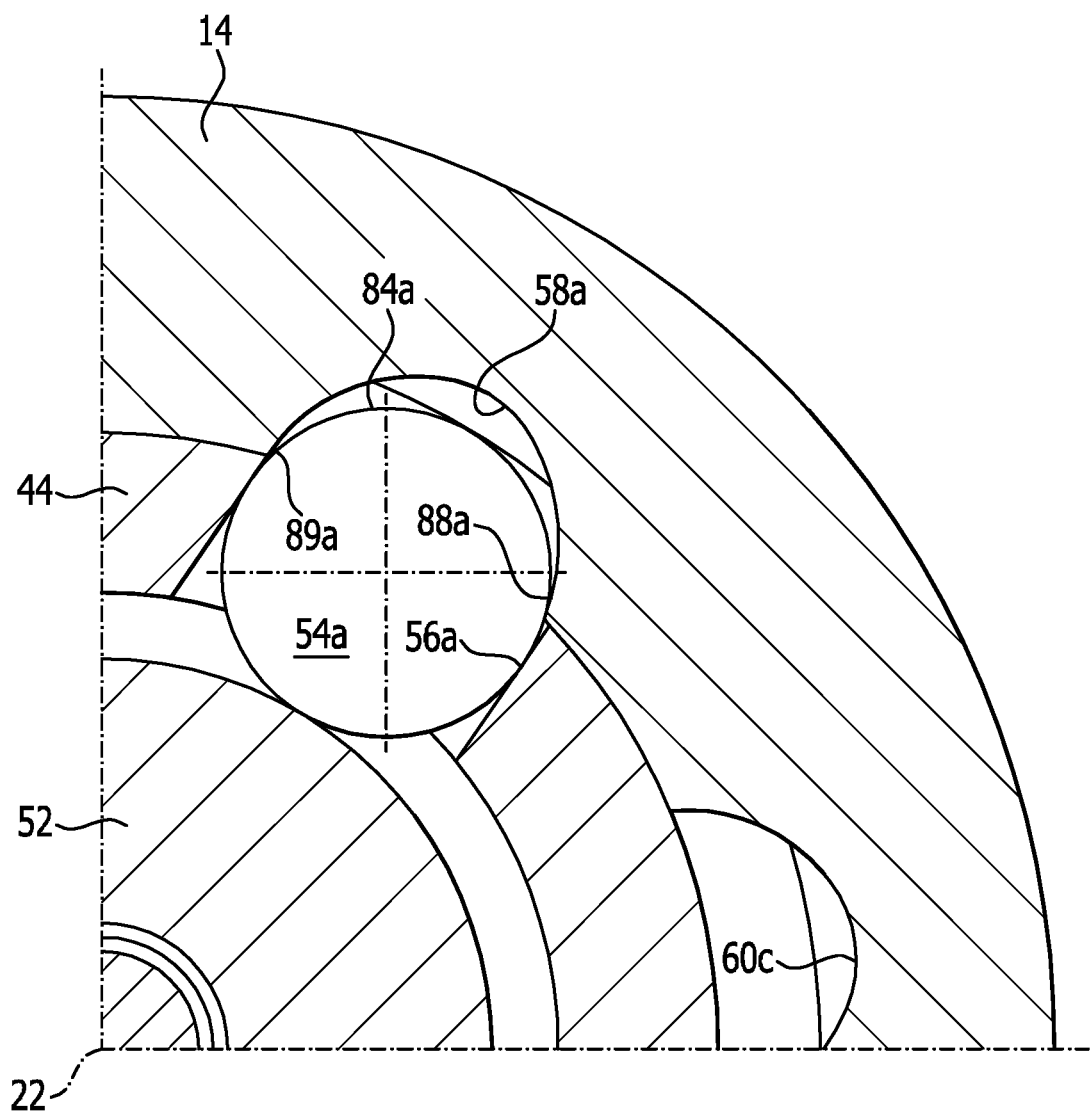
FIG. 12 shows a representation of the rotationally blocking element 54a in an enlarged detail view.

Furthermore, as is illustrated in FIG. 12 for the case of the rotationally blocking body 54a, it is provided that the rotationally blocking body 54a has its curved surface 84a in contact both against the side 88a of the first receptacle 58 which is located in the direction of revolution 65 and against the side 89a of the first receptacle 58a which is located opposite to this side 88a, and that thus, depending on the manufacturing tolerances in the area of the guide receptacle 56a and the corresponding receptacle 58a and depending on the load imposed on the ball neck 10 in trailer operation, the rotationally blocking body 54a usually contributes to one of the two torques 90 and 92 and thus usually also serves to absorb load in addition to the rotationally blocking body 54b or 54c, which is loaded on the basis of the load imposed on the ball neck 10; however, a condition can occur where the rotationally blocking body 54a cannot contribute to either of the two torques 90 and 92.

In order to enable the actuating body 52 to act optimally on each of the three rotationally blocking bodies 54 in each case, it is provided that, in the active position, the actuating body 52 is centered in a manner corresponding to the location of the rotationally blocking bodies 54 so that the actuating body 52 can move relative to the pivot axis 22 and can center itself within the guide body 40 in a manner corresponding to the location, depending on the manufacturing tolerances, of the rotationally blocking bodies 54, wherein the self-centering of the actuating body 52 may differ slightly from a coaxial arrangement relative to the geometric pivot axis 22.

Because of the self-centering, the rotationally blocking bodies 54a, 54b and 54c act on the receptacles 58a, 58b and 58c or 60a, 60b and 60c with forces Ka, Kb and Kc of approximately equal size in the respective guide direction 57a, 57b and 57c so that the reaction forces RKa, RKb and RKc acting on the actuating body 52 are likewise approximately the same size.

In the illustrated exemplary embodiment of the solution in accordance with the invention, the rotationally blocking bodies 54 are arranged in the guide receptacles 56 at equal angular distances from each other around the pivot axis 22 so that the reaction forces RKa, RKb, RKc, which are of approximately the same size as a result of the self-centering, on one of the rotationally blocking bodies 54a, 54b, 54c act equally on the other rotationally blocking bodies 54b and 54c, 54a and 54c and 54a and 54b and thus cancel each other out overall so that the forces on the actuating body 52 are at equilibrium and it is not necessary to provide additional support to the actuating body 52.

Figure 9:
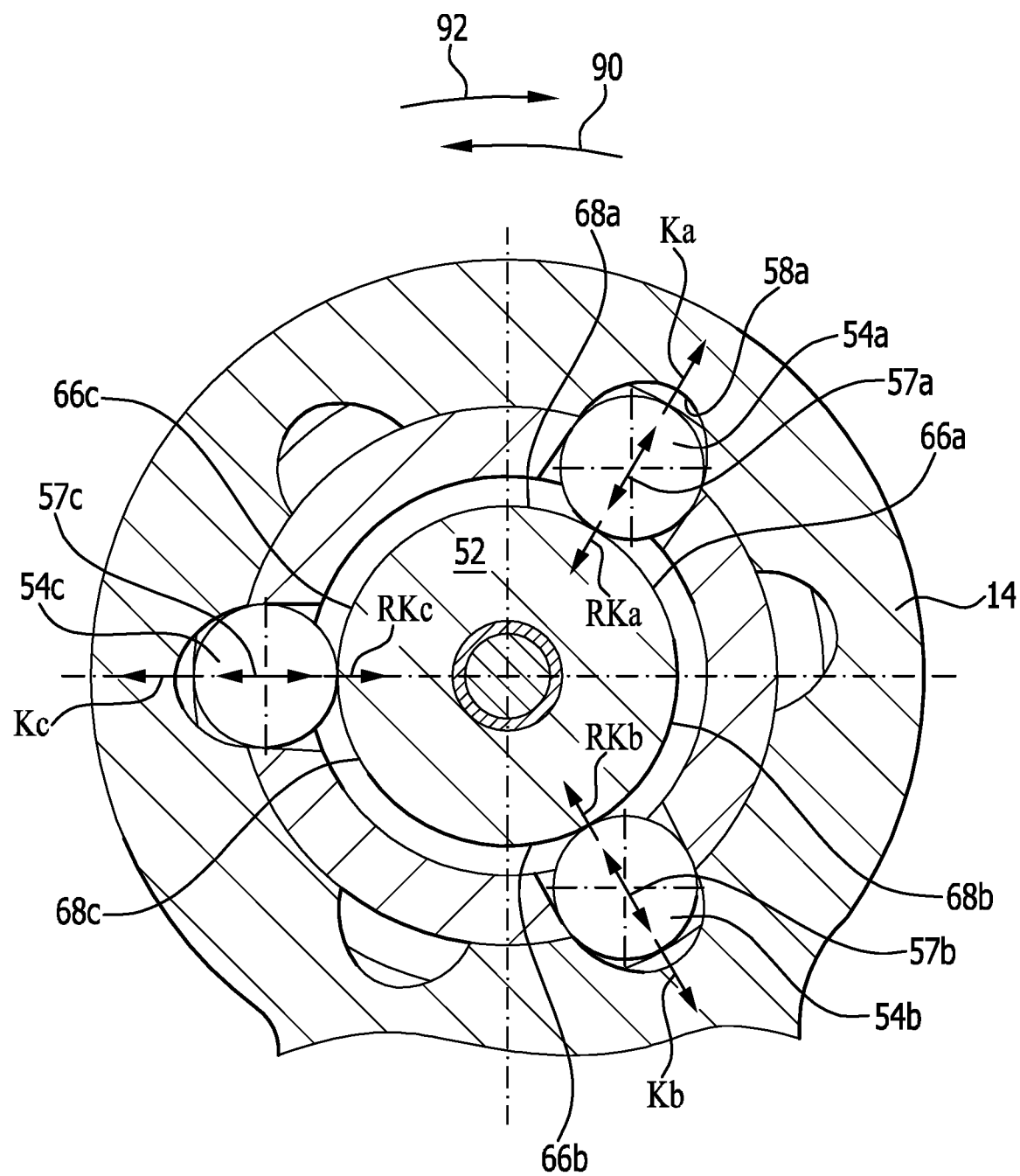
FIG. 9 shows an enlarged section corresponding to FIG. 6, with the pivot element blocked in a rotationally fixed manner by way of the rotationally blocking bodies.
Figure 10:
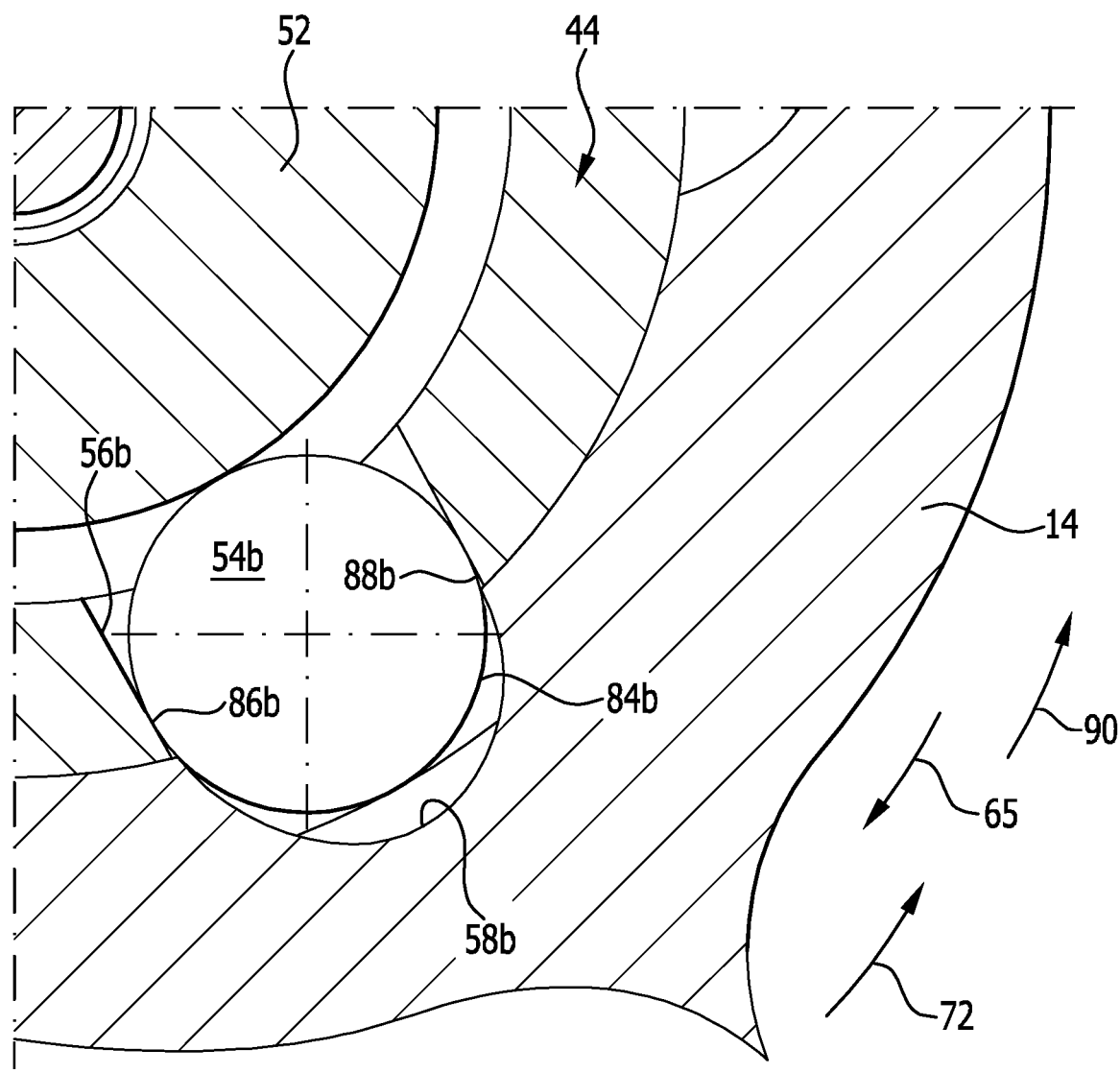
FIG. 10 shows a representation of the rotationally blocking element 54b in an enlarged detail view.

In the exemplary embodiment shown, the rotationally blocking bodies 54 as shown in FIGS. 5, 7 and 9 are configured in the form of balls. However, it is also possible for the rotationally blocking bodies to be configured in the form of rollers.

For movement of the actuating body 52 in the axial direction 64, the actuating body 52 is mounted on a threaded spindle, generally indicated at 100, which is supported on the carrier plate 26, for example via an axial/radial bearing 102, for non-displacement in the axial direction 64.

Said threaded spindle 100 engages, by way of an external thread 104, in an internal thread 106 of the actuating body 52, which thus constitutes, at the same time, a spindle nut for the threaded spindle 100. It is possible for the self-centering of the actuating body 52 to be achieved by a sufficiently large amount of play between the external thread 104 and the internal thread 106.

Thus, rotation of the threaded spindle 100 allows the actuating body 52 to be displaced in the axial direction 64.

The axial/radial bearing 102 is preferably formed such that it does not guide the threaded spindle 100 strictly coaxially in relation to the pivot axis 22 but instead allows the threaded spindle 100 to perform a yield motion transversely to the pivot axis 22, in order to enable the previously described self-centering of the actuating body 52 in the guide sleeve 44.

The threaded spindle 100 is driven via a drive wheel 108 mounted on a side of the carrier plate 26 located opposite to the actuating body 52, which drive wheel 108 is in engagement with a drive wheel 109 of a blocking drive unit 110, wherein the blocking drive unit 110 comprises, for example, an electric motor 112 with a reduction gear.

For pivoting the pivot element 14, the latter is provided, for example, with external teeth 116 in which engages a drive wheel 118 of a pivoting drive unit which likewise comprises an electric motor.

Figure 13:
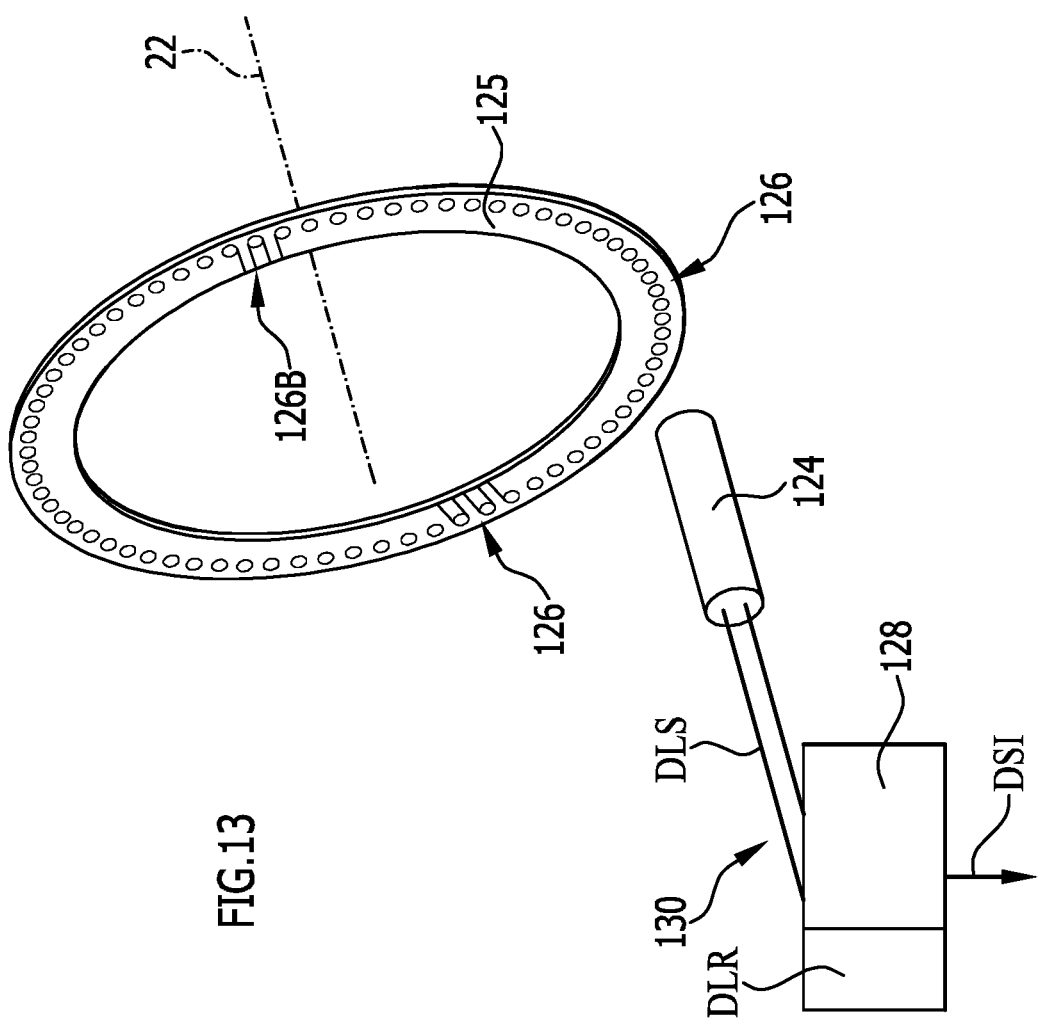
FIG. 13 shows a perspective view of a sensor system provided in the first exemplary embodiment.

For detecting the individual rotary locations of the pivot element 14 relative to the pivot axis 22, as shown in FIG. 5, a sensor head 124 is arranged in rotationally fixed relation with respect to the pivot bearing unit 20 in a bore 123 which extends through the carrier plate 26 and the flange 42, said sensor head 124 detecting rotary locations of a position structure 126 which is connected in rotationally fixed relation to the pivot element 14 and is formed, for example, in an annular body 125 that is connected in rotationally fixed relation to the pivot element 14 and is arranged on a side of the pivot element 14 facing towards the sensor head 124 (FIG. 13).

The position structure 126 is in particular configured such that the sensor head 124 is capable of unambiguously detecting the individual relative positions, this being realized, for example, with a position structure 126 having, at least in portions thereof, for example in the area of the final location positions, multiple periodicity structures, as indicated schematically in FIG. 13 by way of the position structures 126A in the area of the operating position and 126B in the area of the rest position.

It is preferred that the sensor head 124 and the position structure 126 and hence the annular body 125 extend radially inwardly of an outer seal 127 with respect to the pivot axis 22, the outer seal 127 providing for sealing engagement between the pivot element 14 and the pivot bearing unit 20 so that in particular the sensor head 124 and the position structure 126 arranged on the annular body 125 are arranged in a manner such that they are protected against external influences, such as water and dirt (FIG. 5).

Preferably, the sensor head 124 is a magnetic field detecting sensor head, in particular a magnetic field detecting sensor head biased by a permanent magnet, said sensor head 124 sensing the position structure 126 which comprises, for example, alternating regions that exercise influence of varying degree on the magnetic field.

By way of example, the sensor head 124 together with the position structure 126 has an angular resolution of less than 2° with respect to rotation about the pivot axis 22.

Thus, in cooperation with the position structure 126, the sensor head 124 generates rotary location signals DLS that are delivered to an evaluation unit 128 (FIG. 13).

The evaluation unit 128 generates position information DSI from the rotary location signals DLS generated by the sensor head 124, namely by comparing the rotary location signals DLS with stored rotary location reference values DLR taking into account the absolute location of the operating position and the rest position R.

Thus, the sensor head 124, arranged on the pivot bearing unit 20 in non-pivoting relation therewith, together with the position structure 126, which co-rotates with the pivot element 14 about the pivot axis 22, and the evaluation unit 128 form a sensor system, generally designated at 130, which makes available position information DSI indicative of the rotary locations of the pivot element 14 together with the ball neck 10 relative to the pivot axis 22.

Preferably, the position structure 126 together with the annular body 125 extends as an all-round structure about the pivot axis 22 over at least such an angular range that the sensor head 124 can sense the position structure 126 during the entire pivoting operation from the one final position to the other final position, i.e., from the operating position A to the rest position R or from the rest position to the operating position A, so that the position structure 126 provides rotary location signals DLS in the two final positions, i.e., the rest position R and the operating position A, as well as in all intermediate positions lying therebetween.

Figure 14:
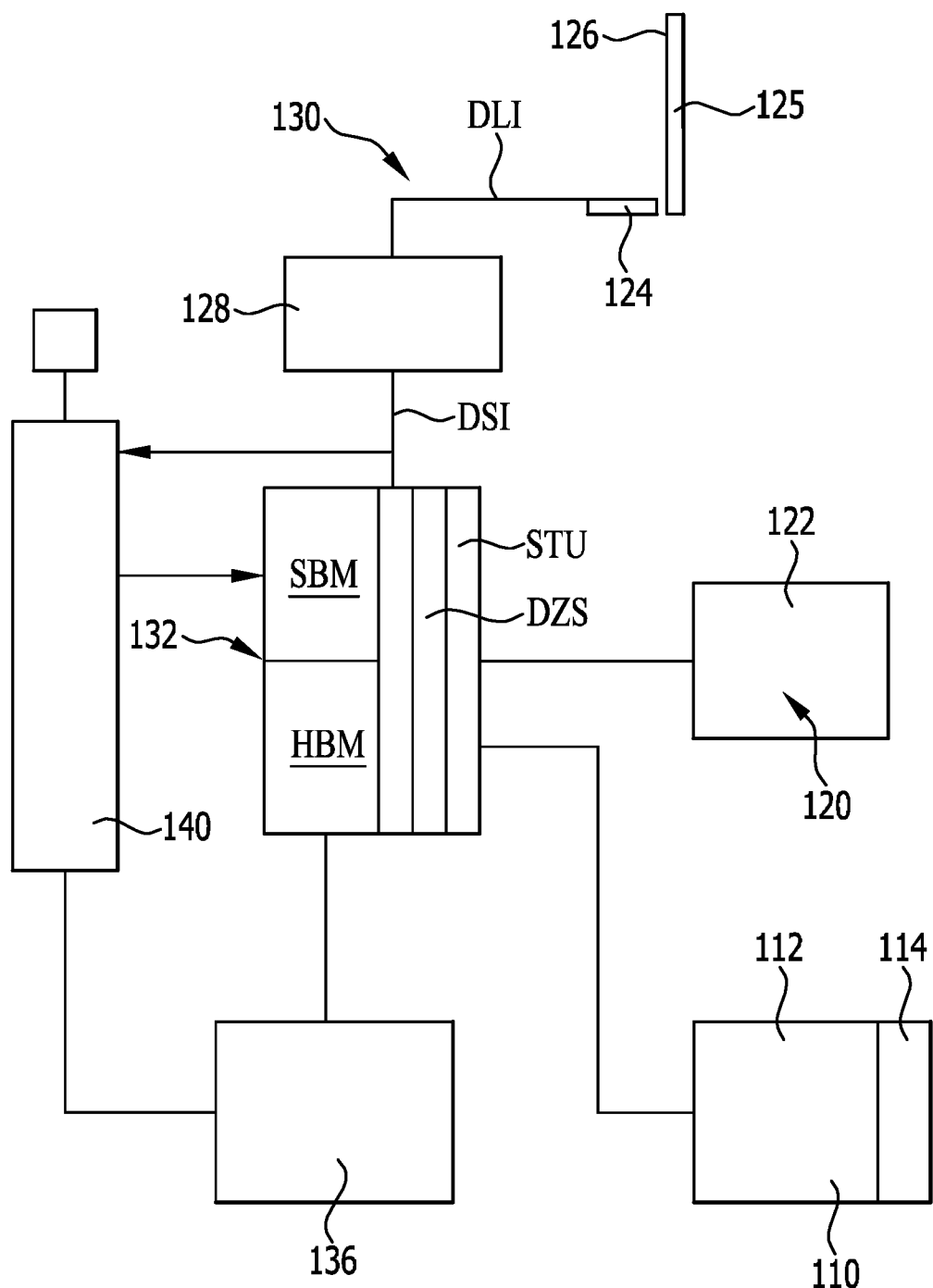
FIG. 14 shows a schematic representation of how the sensor system interacts with a pivot controller and a sequence controller.

Preferably, the sensor system 130 cooperates with a pivot controller, generally designated at 132, which controls the pivoting drive unit 120, in particular the electric motor 122 of the pivoting drive unit 120 (FIG. 14).

For example, the pivot controller 132 is operable in a pivoting mode of operation SBM in which the pivot element 14 and hence the ball neck 10 are pivoted between the final positions, i.e., between for example the operating position A and the rest position R, or vice versa.

In this pivoting mode of operation SBM, the electric motor 122 is controlled in such a way that, starting from the instantaneous final position in which the pivot element 14 or the ball neck 10 is located, the electric motor 122 pivots the pivot element 14 or the ball neck 10 into the respective other final position and in so doing, the position information, which in the present exemplary embodiment is the rotary position information DSI, of the sensor system 130 is detected in order to determine whether the pivot element 14 together with the ball neck 10 exits the one final position, for example the operating position A or the rest position R, and, after moving through the known angular distance between the final positions, reaches the other final position, i.e., for example, the rest position R or the operating position A.

Because the pivot controller 132 is capable of obtaining, from the position information DSI, the information as to how the pivot element 14 together with the ball neck 10 moves about the pivot axis 22, it is also possible to obtain, from the position information DSI, the information that the pivot element 14 together with the ball neck 10 enters the provided other final position, and thus the pivot controller 132 is capable of switching off the electric motor 122 of the pivoting drive unit 120 once the other final position is reached, without the need to use current monitoring of the electric motor 122 for detecting that the final position has been reached.

In particular, the pivot controller 132 can also recognize, from the course of the complete pivotal movement from the one final position to the other final position, that the pivot element 14 together with the ball neck 10 has proceeded through the provided pivot angle from the one final position to the other final position and has thus reached the other final position without disturbance, for example without having been blocked by an extraneous object, for example an obstacle, on its way from the one final position to the other final position.

Even in a setting where the pivot controller 132 is additionally provided with a current monitor STU for protecting the electric motor 122, if the ball neck 10 is ascertained to have impacted against an obstacle, on the basis of the resultant rising current that is detected by the current monitor STU, the pivot controller 132 is capable of reversing the polarity of the electric motor 122 and return same to the final position from which the pivot element together with the ball neck 10 has come, wherein also in this case, the pivot angle between the particular location where the blocking has occurred and the final position from which the pivot element 14 and the ball neck 10 have come can be monitored and thus the return movement can likewise be monitored in order to ascertain that the final position representing the starting position of the pivot element 14 together with the ball neck 10 has been reached without disturbance.

Thus, the pivot controller 132 in the pivot mode of operation SBM, on the basis of the position information DSI, on the one hand is capable of reliably detecting and checking the disturbance-free pivotal movement from one final position to the other final position, while on the other hand, in the event of a disturbance such as a blocking of the pivotal movement of the pivot element 14 and the ball neck 10, is also capable of detecting this blocking and, thus, of returning the pivot element 14 together with the ball neck 10 back again to a final position that is essential for operational safety.

Furthermore, the pivot controller 132 is preferably provided with a speed controller DZS for controlling the electric motor 122, wherein the speed controller DZS in connection with the position information DSI of the sensor system 130 permits the pivoting operation from the one final position to the other final position to be optimized or adapted to external requirements.

For example, the speed controller DZS of the pivot controller 132 affords the possibility of optimizing the speed of the pivotal movement, in particular by operating the electric motor 122 with a pulse width modulated current.

Here, one possibility is that the speed of the pivotal movement is kept constant by adapting the pulse modulated current taking into account the position information DSI so that the situation is precluded whereby, for example, the movement of the ball neck 10 accelerated by gravity when exiting one of the final positions leads to a relatively fast pivotal movement while entry into the respective next following final position occurs at a lower speed owing to the required raising of the ball neck up to this respective final position.

Another possibility of controlling the electric motor 122 provides, for example, that the pivotal movement when exiting one final position is realized at as high a speed as possible until just short of reaching the next final position while entry into the next following final position is realized at a lower speed in order for this final position to be reached with as low a mechanical impact as possible.

Furthermore, the pivot controller 132 is operable in a holding mode of operation HBM in which it controls the pivoting drive unit 120 in such a manner that the pivoting drive unit 120 preserves the respective final position.

In the holding mode of operation HBM, the position information DSI made available by the sensor system 130 is continuously monitored so that the pivot controller 132, in the holding mode of operation HBM, is capable of recognizing whether the pivot element 14 together with the ball neck 10 starts to exit the respective final position, for example the operating position.

Thus, if, for example when the pivotally blocking device 50 has not yet become effective, it is ascertained that the pivot element 14 together with the ball neck 10 has already slightly exited the respective final position, the pivoting drive unit 120 is for example controlled such that the pivot element 14 together with the ball neck 10 is pivoted back to this final position, wherein the electric motor 122 is switched off again only when this final position is reached.

However, the pivot controller 132 is also capable of controlling the blocking drive unit 110 with which the pivotally blocking device 50 is transferred from the blocking position to the freewheeling position or vice versa (FIG. 14).

The blocking drive unit 110 is controlled by the pivot controller 132 in the pivoting mode of operation SBM of the pivot controller in such a way that for a pivoting operation from one final position to the other final position, the blocking drive unit 110 is first controlled such that the pivotally blocking device 50 transitions to the freewheeling position.

In this freewheeling position—as has already been described—the pivot element 14 together with the ball neck 10 is pivoted under the control of the pivot controller 132 and during this pivoting operation, the pivot controller 132 retains the pivotally blocking device 50 in its freewheeling position.

The pivotal movement of the pivot element 14 together with the ball neck 10 is monitored by checking the position information DSI provided by the sensor system 130.

When the next following final position is then reached, the pivot controller 132 recognizes this on the basis of the position information DSI corresponding to this final position and causes the pivotally blocking device 50 to be transferred to the blocking position so that, when in this blocking position, the pivot element 14 and the ball neck 10 are then blocked with respect to their pivotal movement.

In the holding mode of operation HBM, the pivot controller 132 monitors, by way of the position information DSI, the respective final position and, when it is recognizable by the position information DSI that the pivot element 14 together with the ball neck 10 has exited the final position, the pivot controller 132 controls the blocking drive unit 110 in the sense of a movement of the pivotally blocking device 50 into the blocking position in order to reduce potential play of the pivotally blocking device 50, which may have occurred and could be responsible for the exit from the final position, down to a value that is as close as possible to zero and thus again keep the pivotally blocking device 50 as free of play as possible in its blocking position.

In the simplest case, the final position can be monitored in respect of potential play in the pivotally blocking device 50 by way of a fixed limit value for the deviation of the determined rotary position information DSI from the rotary position information DSI for the respective final position.

The accuracy of detecting the play can be improved even further if the variations of the determined rotary position information which occur over the time axis particularly when in travel mode are detected and evaluated via a variation pattern analysis.

For example, to this end, a variation bandwidth is determined on the basis of these variations and compared with a reference value for the variation bandwidth because the variation bandwidth in the final position is smaller in the play-free state than in a play-laden state.

The operation of the pivot controller 132 is preferably controlled by a superordinate sequence controller 140 which operates the pivot controller 132 in the respective modes and is likewise capable of determining at any time the rotary position of the pivot element 14 together with the ball neck 10 via the position information DSI of the sensor system 130.

As exemplified in FIG. 14, the present exemplary embodiment advantageously permits the position information to be evaluated to the effect that the location of the ball neck 10 relative to the pivot bearing unit 20 can be visualized with the aid of a visualization unit 136 so that an operator can track the movement of the ball neck from the operating position A to the rest position R and vice versa.

Furthermore, the visualization unit can be advantageously used to indicate operating modes and/or operating states and/or disturbances associated with the sequence controller 140 and/or the controller 132 and/or the pivoting drive unit and/or the blocking drive unit 110 and the pivotally blocking device 50.

This is particularly advantageous when disturbances occur in the course of movements because it enables an operator to view what type of disturbance has occurred.

Figure 15:
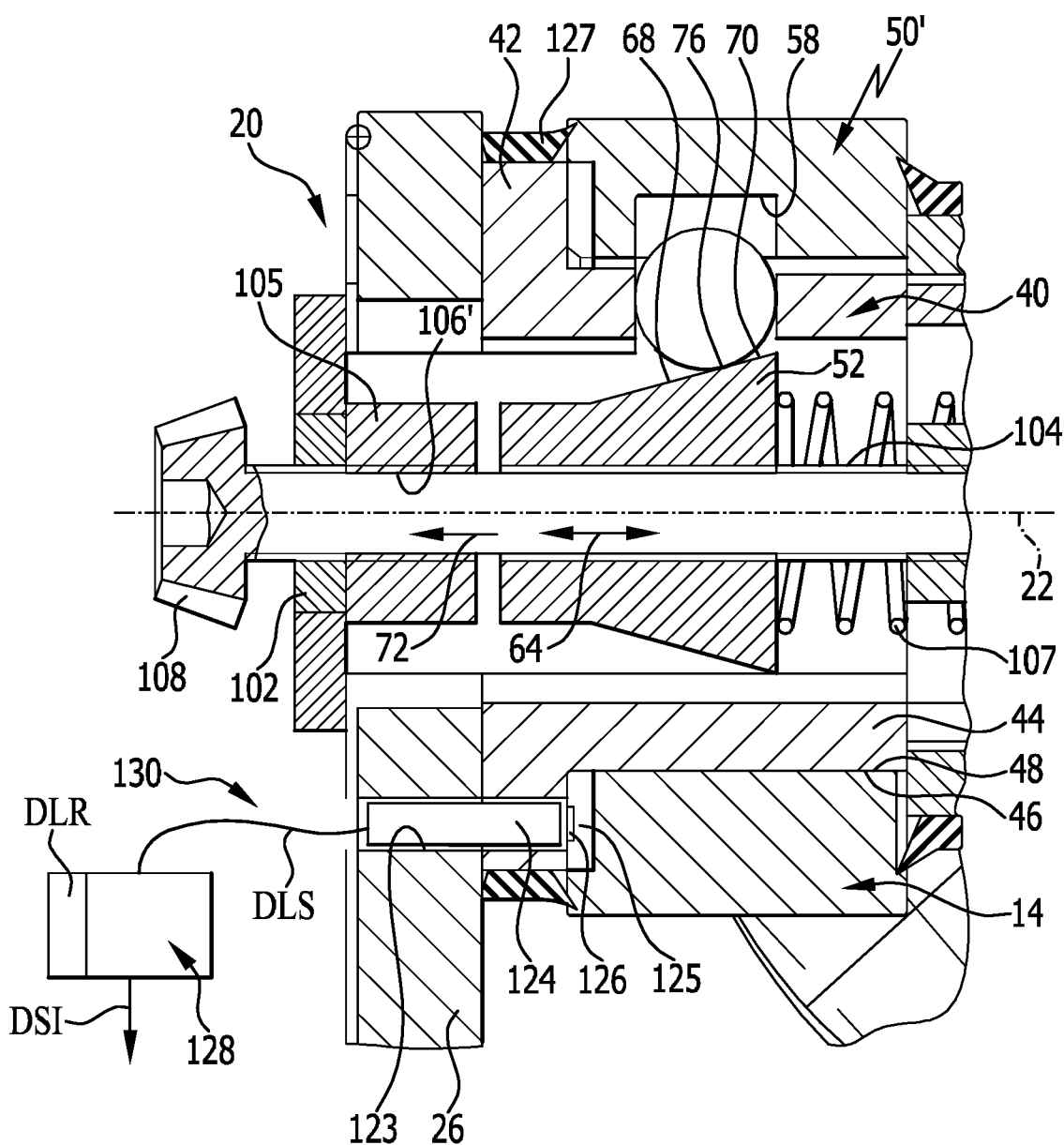
FIG. 15 shows a partial section, similar to FIG. 5, through a second exemplary embodiment of a trailer hitch in accordance with the invention.
Figure 16:
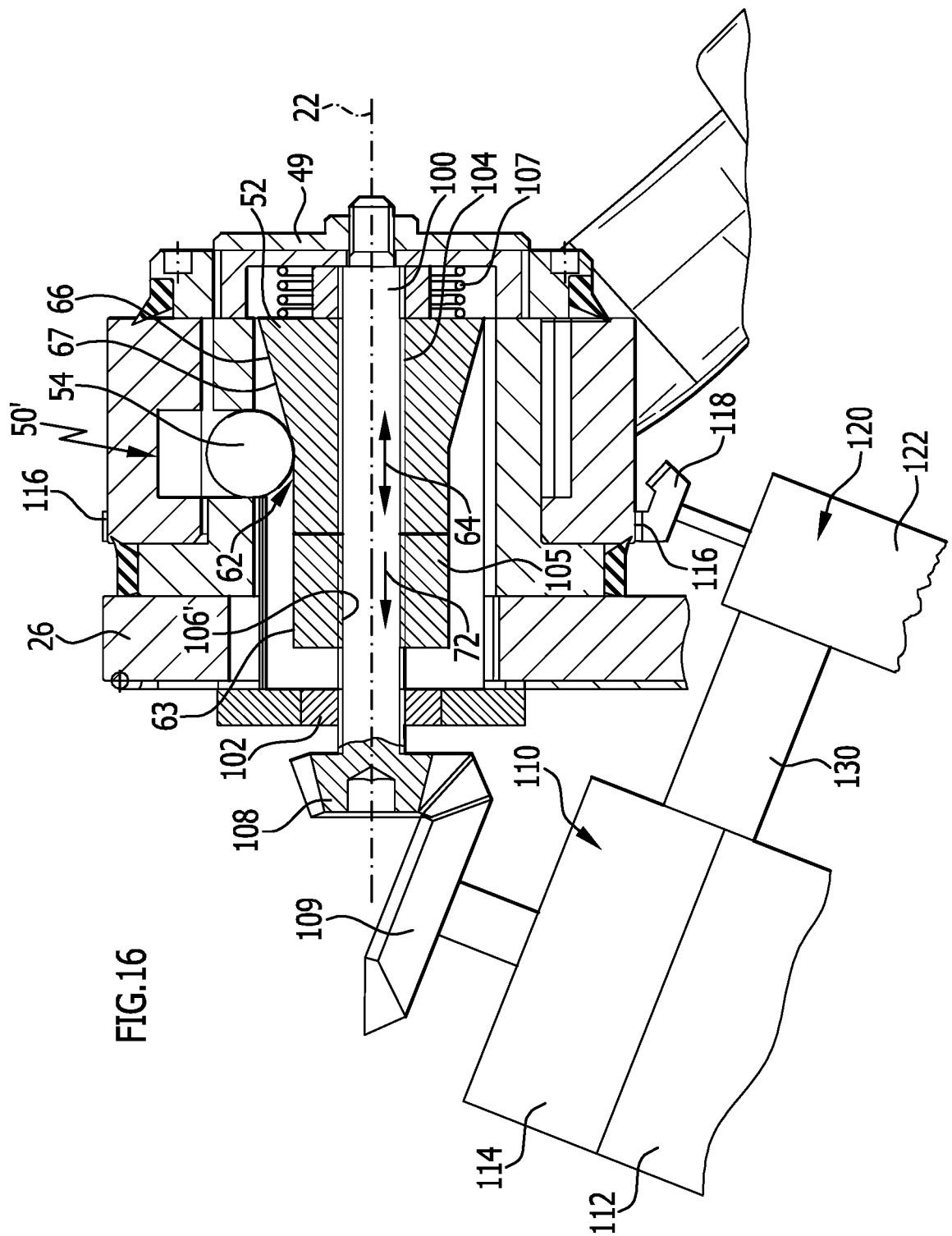
FIG. 16 shows a partial section, similar to FIG. 7, through the second exemplary embodiment.
Figure 17:
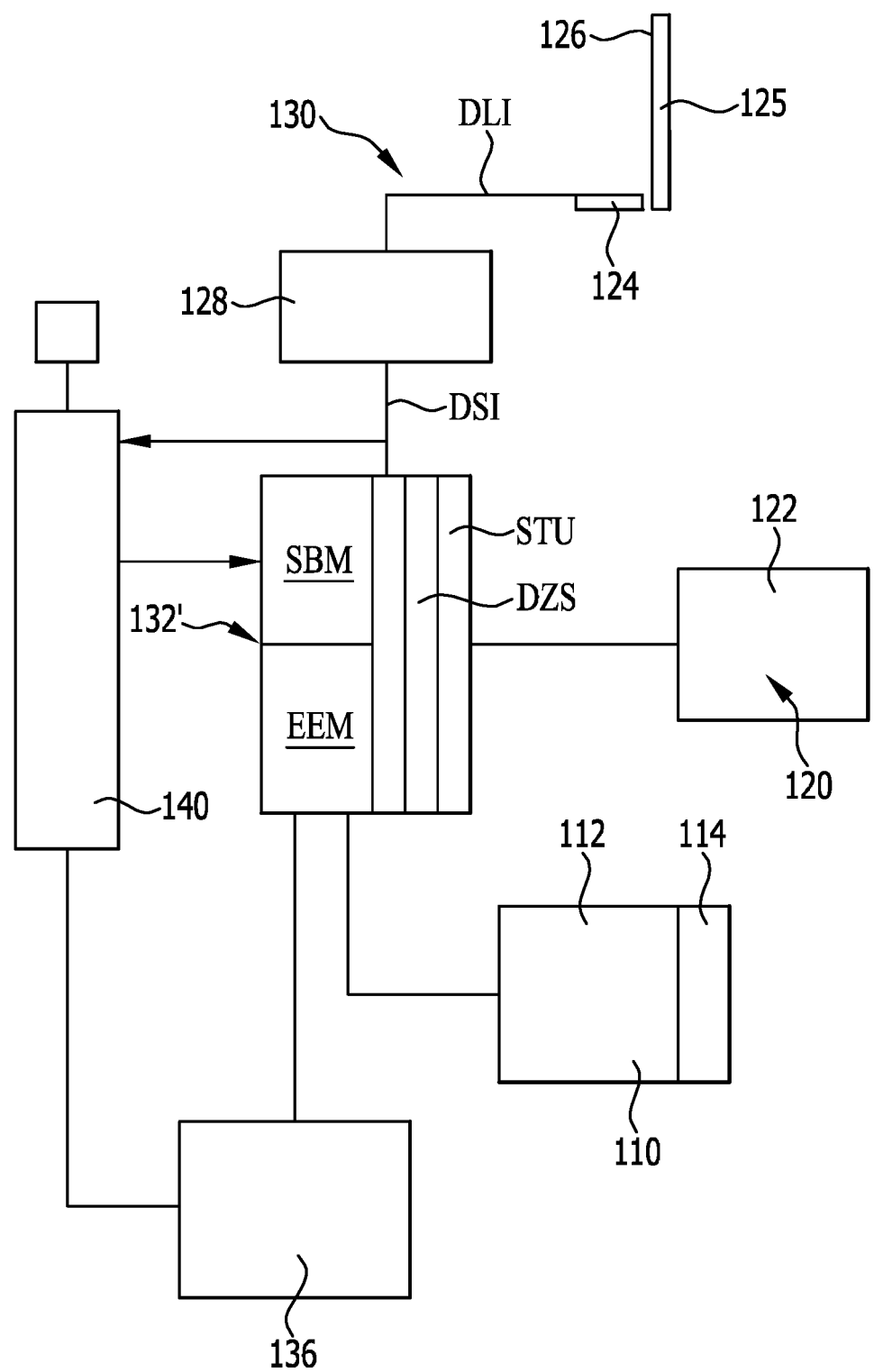
FIG. 17 shows a schematic representation, similar to FIG. 14, of how the sensor system interacts with a pivot controller and a sequence controller in the second exemplary embodiment.

A second exemplary embodiment of a trailer hitch in accordance with the invention, illustrated in FIGS. 15 to 17, represents a variant of the first exemplary embodiment; therefore, like reference designations have been used to indicate like elements of the first exemplary embodiment and reference can be made in full to what has been described with respect to such elements of the first exemplary embodiment.

As contrasted to the first exemplary embodiment, the actuating body 52 is not provided with the internal thread 106 but is guided relative to the threaded spindle 100 for free movement thereon.

However, mounted to the threaded spindle 100 is an unblocking element 105, which is for example a spindle nut 105 that is rotationally secured relative to the guide sleeve 44 yet adjustable in the direction 64, which spindle nut 105 is provided with the internal thread 106' and hence movable by rotating the threaded spindle 100 and serves to move the actuating body 52, against the force exerted by a compression spring 107, from its active position with respect to blocking, shown in FIG. 15, to its inactive position with respect to blocking, shown in FIG. 16, which compression spring 107 is for example supported via the terminating cover 49 relative to the guide sleeve 44 and acts upon the actuating body 52 in order to move same towards the active position with respect to blocking and, with the actuating body 52 in its active position with respect to blocking, i.e., in the blocking position of the pivotally blocking device 50', acts upon the actuating body 52 with a pressure force which causes the rotationally blocking bodies 54a, 54b and 54c to have a force applied thereto and to be urged with a clamping force into the receptacles 58a, 58b, 58c in order to achieve play-free blocking of the pivot element 14 in the blocking position of the pivotally blocking device 50'.

In order not to counteract the application of force on the actuating body 52 by the compression spring 107 in the active position with respect to blocking of the actuating body 52, when the active position with respect to blocking of the actuating body 52, i.e., the blocking position of the pivotally blocking device 50', is to be present, the spindle nut 105 is located in a starting position, shown in FIG. 15, in which it does not interact with the actuating body 52 so that the actuating body 52 is exclusively subjected to the force of the compression spring 107 acting in the direction 72 and is retained in the active position with respect to blocking by the force applied by the compression spring 107.

Only when the actuating body 52 is to be moved to its inactive position with respect to blocking, is the spindle nut 105 moved out of the starting position by driving the threaded spindle 100 by way of the blocking drive unit 110 in the direction opposite to the direction 72 to then act on the actuating body 52 and move same against the force exerted by the compression spring 107 to its inactive position with respect to blocking, in which the freewheeling position of the pivotally blocking device 50' exists.

The spindle nut 105 then retains the actuating body 52 in its inactive position with respect to blocking until the pivot element 14 has exited the operating position or the rest position and is pivoted in the direction of the respective other position.

Before the respective other position is reached, the spindle nut 105 is moved to its starting position by way of the threaded spindle 100 and the blocking drive unit 110, and the pivotally blocking device 50' stays in a blocking standby position until this is completed.

With the rotationally blocking bodies 54a, 54b and 54c being able to engage in the receptacles 58a, 58b, 58c only when the respective other final position is reached, the actuating body 52, despite being acted upon by the compression spring 107, remains in its inactive position with respect to blocking and thus the pivotally blocking device 50' remains in the blocking standby position until such time as the respective other final position is reached, whereupon, on the basis of the action of the compression spring 107, the actuating body 52 transitions to its active position with respect to blocking and thus the pivotally blocking device 50' transitions to its blocking position and continues to be retained in said position by the compression spring 107.

As contrasted to the first exemplary embodiment, there is no need for a holding mode of operation HBM of the pivot controller 132' to be provided, because the compression spring 107 always exerts force on the actuating body 52 in the blocking position of the pivotally blocking device 50'.

However, the pivot controller 132' depicted in FIG. 17 is configured such that it recognizes, in a final position detecting mode of operation EEM thereof, on the basis of the position information DSI, that the respective other final position is near to being reached, whereupon it already controls the blocking drive unit 110 in the sense of a movement of the spindle nut 105 to the starting position thereof so that the spindle nut 105 assumes its starting position before the respective other final position is reached and consequently, when the final position is reached, the actuating body 52, by the action of the compression spring 107 alone, transitions to the active position with respect to blocking and is retained therein until such time as the pivotally blocking device 50' is to be released again by transition thereof to the freewheeling position.

As exemplified in FIG. 17, it is advantageously possible in the present exemplary embodiment for the position information DSI to be evaluated to the effect that the location of the ball neck 10 relative to the pivot bearing unit 20 can be visualized by way of a visualization unit 136 so that an operator is able to track the movements of the ball neck from the operating position A to the rest position R or vice versa.

Furthermore, the visualization unit 136 can be advantageously used to indicate operating modes and/or operating states and/or disturbances associated with the sequence controller 140 and/or the pivot controller 132' and/or the pivoting drive unit 120 and/or the blocking drive unit 110 and the pivotally blocking device 50.

This is particularly advantageous when disturbances occur in the course of movements because it enables an operator to view, on the visualization unit 136, what type of disturbance has occurred.

Figure 18:
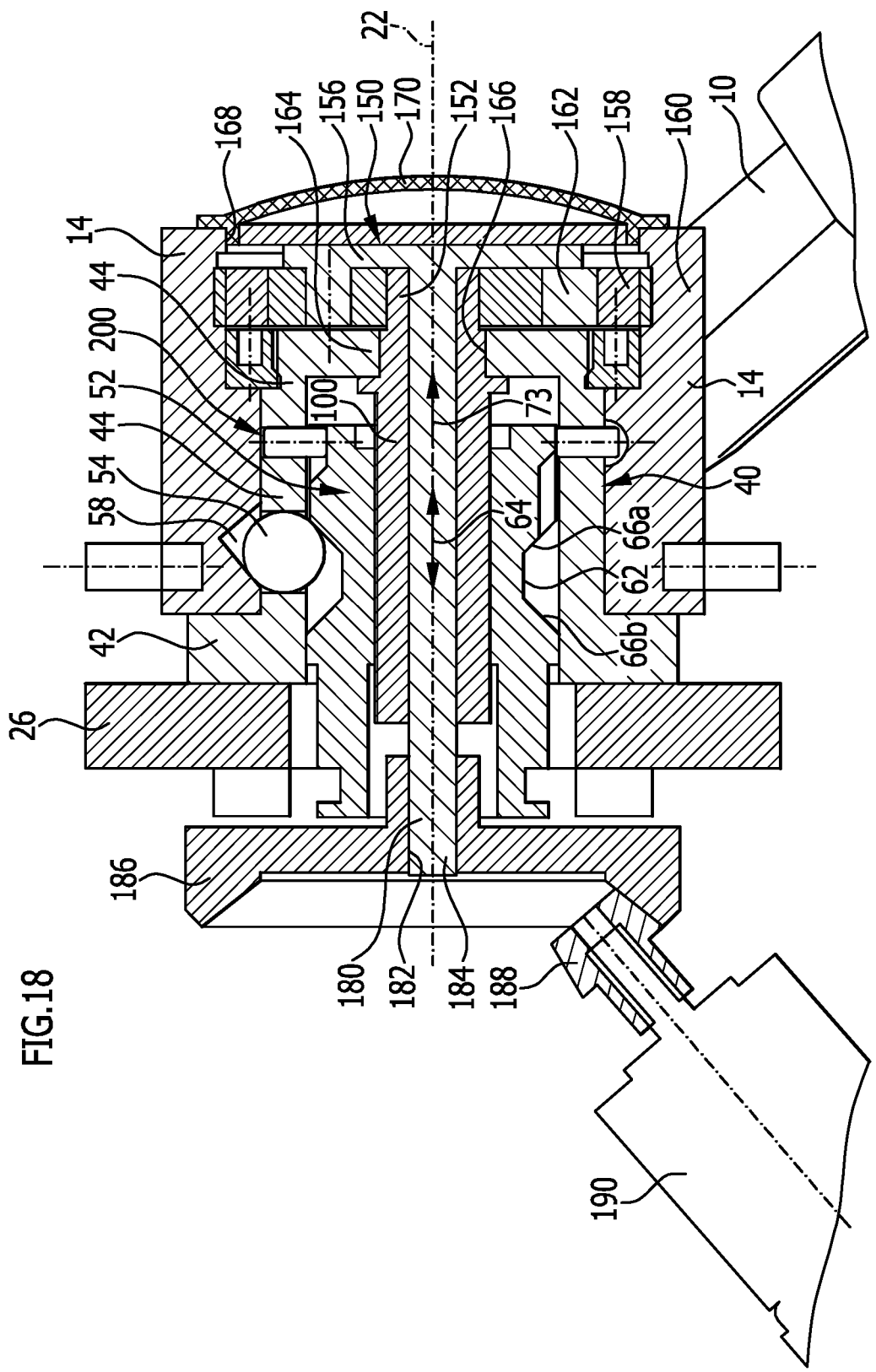
FIG. 18 shows a partial section, similar to FIG. 5, through a third exemplary embodiment of a trailer hitch in accordance with the invention, with the actuating body and the rotationally blocking body in a first rotationally blocking position.

In a third exemplary embodiment of a trailer hitch in accordance with the invention, illustrated in FIG. 18, like reference designations have been used to indicate like features of the first and second exemplary embodiments and reference is made in full to what has been described with respect to such features.

As contrasted to the first and second exemplary embodiments, in the third exemplary embodiment, the actuating body 52 is, on either side of the retreat receptacle 62, provided with pressure surfaces 66a and 66b that widen radially with respect to the pivot axis 22, for example conically outwardly therefrom, and by way of which the rotationally blocking bodies 54 can be moved radially outwardly. It is thus possible for a freewheeling position to be implemented by the retreat receptacle 62, for a first rotationally blocking position to be implemented by the pressure surfaces 66a and for a second rotationally blocking position to be implemented by the pressure surfaces 66b.

Figure 19:
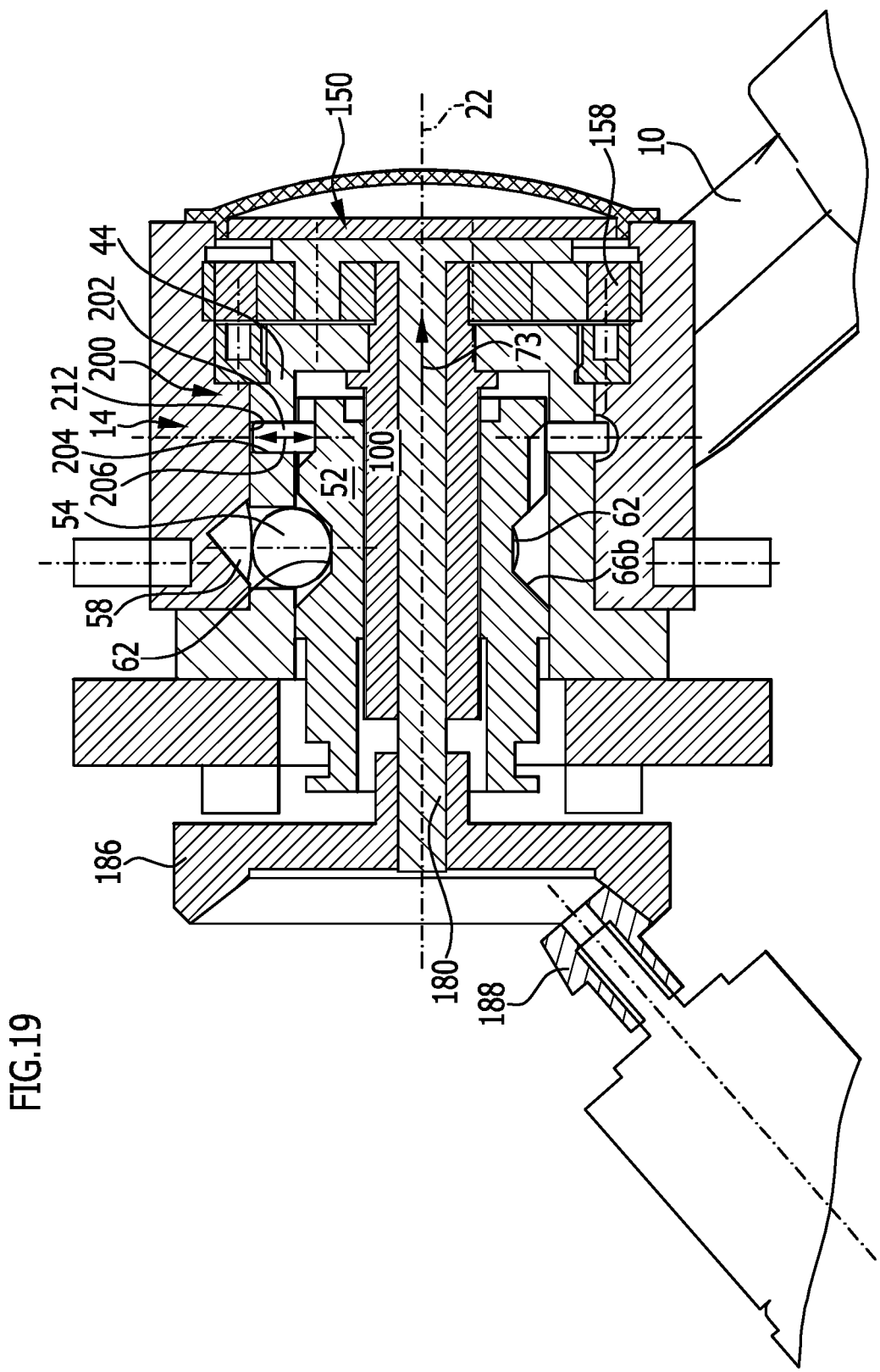
FIG. 19 shows a partial section, similar to FIG. 7, through the third exemplary embodiment of the trailer hitch in accordance with the invention, with the actuating body and the rotationally blocking body in a freewheeling position, prior to a pivotal movement of the pivot element.

Starting from the first rotationally blocking position, shown in FIG. 18, in which the rotationally blocking bodies 54 are urged radially outwardly into the receptacles 58 by the pressure surfaces 66, it is possible, by displacing the actuating body 52 in the axial direction 64, namely in a direction 73, away from the carrier plate 26, for the state in which the pivot element 14 is locked in place by the first rotationally blocking position to be released, namely, as is illustrated in FIG. 19, by the rotationally blocking bodies 54 being enabled to transition into the retreat receptacles 62 and hence to the freewheeling position, in which they move into the guide sleeve 44 far enough for the pivot element 14 to be freely rotatable on the guide sleeve 44.

Figure 20:
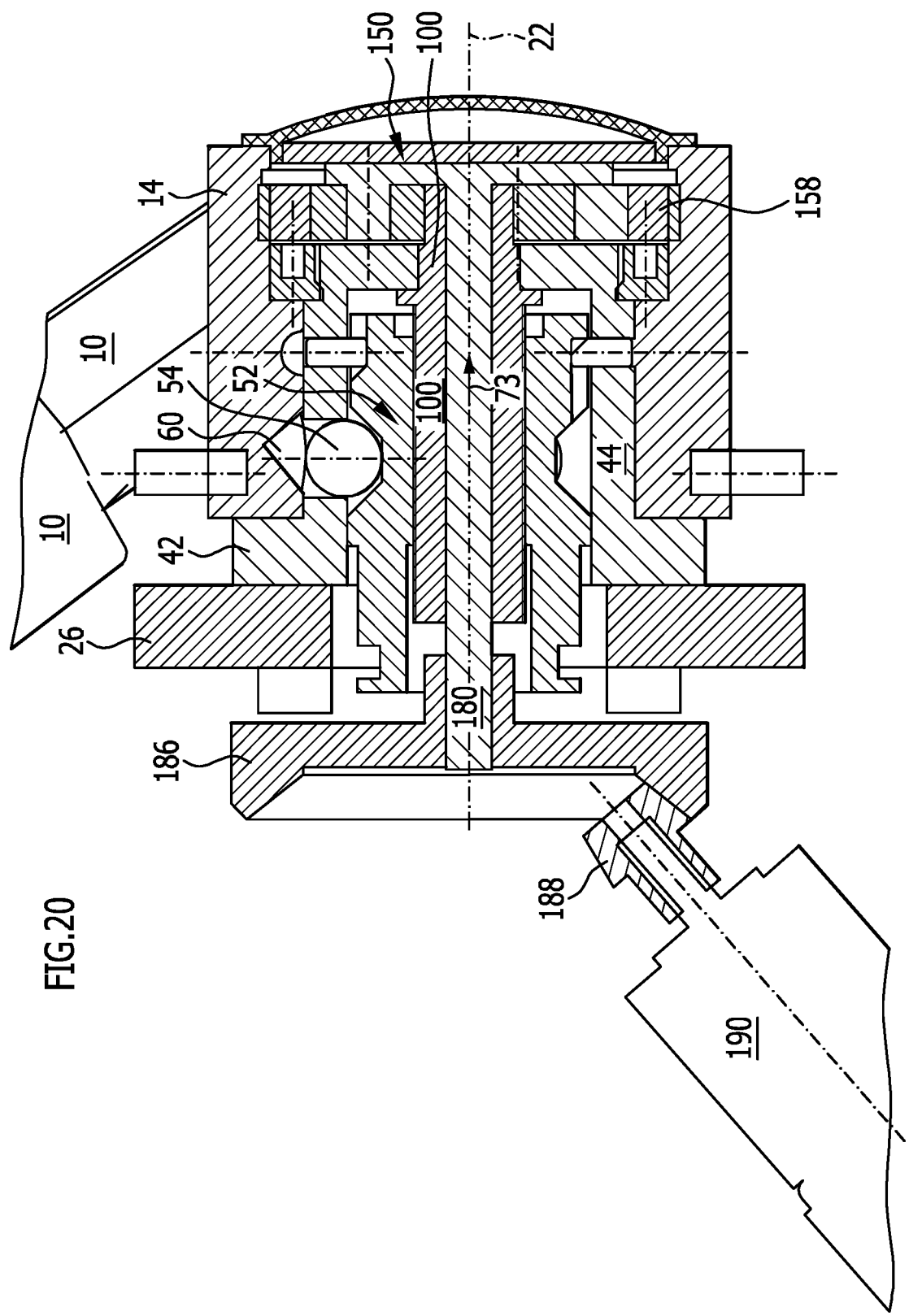
FIG. 20 shows a partial section, similar to FIG. 19, through the third exemplary embodiment of the trailer hitch in accordance with the invention, after a pivotal movement of the pivot element from an operating position to a rest position.
Figure 21:
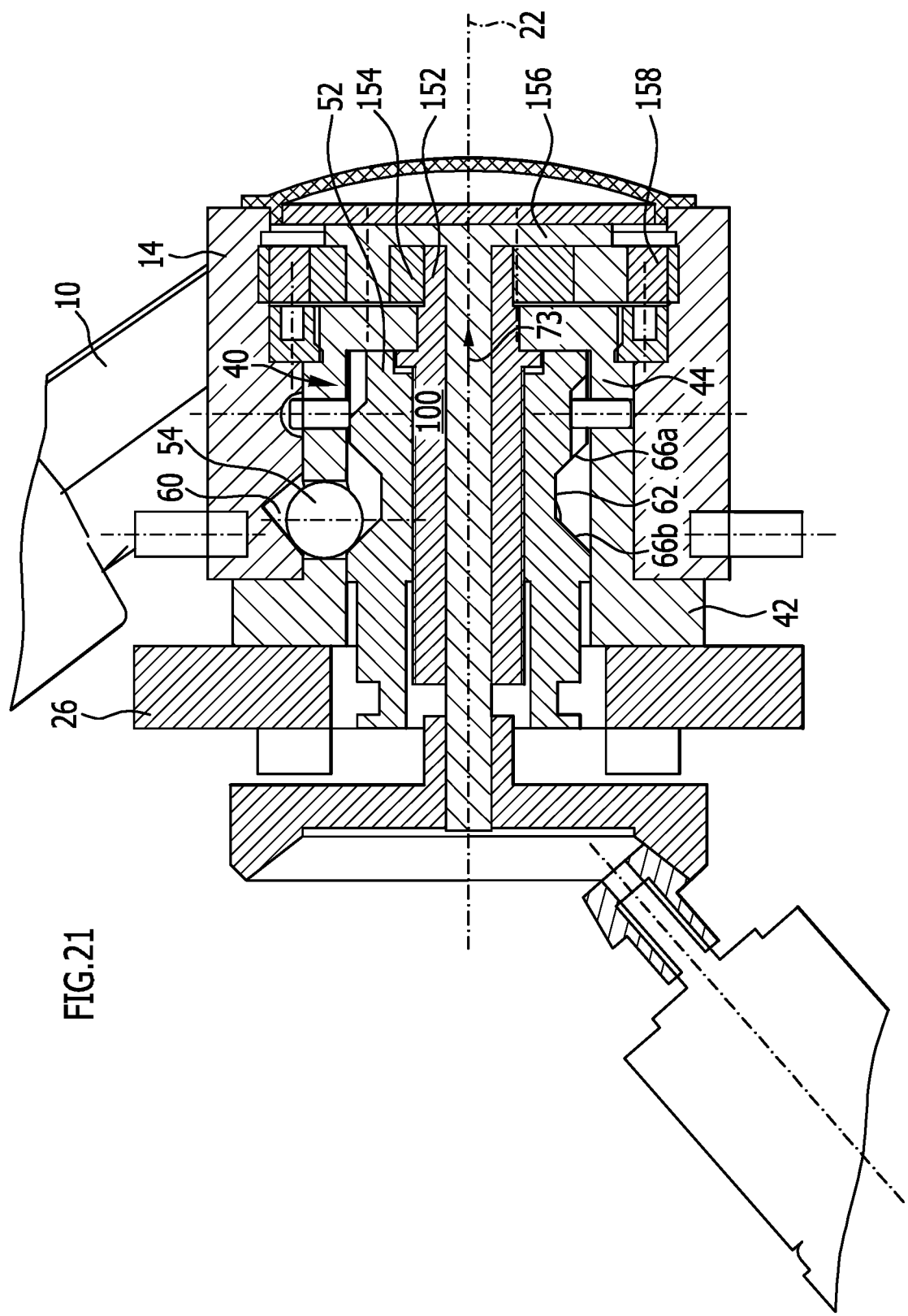
FIG. 21 shows a partial section, similar to FIG. 5, through the third exemplary embodiment of the trailer hitch in accordance with the invention, with the actuating body and the rotationally blocking body in a second rotationally blocking position.

In this unlocking position of the pivot element 14, the latter can be pivoted freely about the pivot axis 22 and it is possible, for example, to transfer the ball neck 10 from the operating position A, illustrated in FIG. 18, to the rest position R in which the ball neck 10 extends approximately on a side of the pivot axis 22 which is opposite to that for the operating position A, as is illustrated in FIG. 20.

In this rest position R, the receptacles 60 are located opposite the rotationally blocking bodies 54 and it is possible, by virtue of the actuating body 52 being displaced further in the direction 73, to move the rotationally blocking bodies 54, by way of the pressure surfaces 66b, radially outwardly and into the receptacles 60 in order thus to achieve the above-described form-locking locking of the pivot element 14 to the guide sleeve 40 as a result of the second rotation-blocking position being reached.

As contrasted to the first and second exemplary embodiments, the threaded spindle 100 is not driven directly via the blocking drive unit 110 but is driven via a planetary gear mechanism 150 which is arranged on a side of the actuating body 52 facing away from the carrier plate 26.

The planetary gear mechanism 150 comprises a sun gear 152 which is connected to the threaded spindle 100 in rotationally fixed relation therewith and is preferably formed integrally in one piece thereon.

The sun gear 152 is driven by planet gears 154 which are rotatably supported on a planetary gear carrier 156.

The planet gears 154 mesh, on their radially inner side, with the sun gear 152 and, on their radially outer side, with a ring gear 158 which is connected to the pivot element 14 in rotationally fixed relation therewith.

To this end the pivot element 14, on a side thereof facing away from the carrier plate 26, preferably extends beyond the guide sleeve 44 by way of a sleeve-like section 160 which encloses an inner space 162 in which the planet gear mechanism 150 is arranged.

The ring gear 158 of the planetary gear mechanism 150 is mounted directly on an inner side of the sleeve-like section 160 of the pivot element 14 and is connected thereto in rotationally fixed relation therewith.

Furthermore, the inner space 162 is bounded in a direction of the carrier plate 26 by a terminating wall 164 of the guide body 44, which terminating wall 164 carries an axial and radial bearing 166 for supporting the threaded spindle 100, and is bounded on the other hand by a cover 170 which closes off an outer opening 168 of the sleeve-like section 160 of the pivot element 14 and terminates the inner space 162 on a side of the planetary gear mechanism 150 opposite to the terminating wall 164.

The planetary gear mechanism 150 is driven by driving the planetary gear carrier 156, which is connected in one piece to a drive shaft 180 which extends from the planetary gear carrier 156 through a central bore 182 of the threaded spindle 100 and thus coaxially with the latter and thereby extends from the inner space 162 through the threaded spindle 100 and hence centrally through the actuating body 52 to a side of the carrier plate 26 opposite the actuating body 52 and which, at its end 184 arranged on the side of the carrier plate opposite the actuating body 52, carries a drive wheel 186 which meshes with a driven wheel 188 of an overall drive unit 190 which comprises an electric motor 192 and a reduction gear 194.

The planetary gear mechanism 150 now allows changeover between driving the pivot element 14 by the ring gear 158, representing an output of the planetary gear mechanism 150, and driving the threaded spindle 100 by the sun gear 152, representing an output of the planetary gear mechanism 150, by way of the planet gears 154 which are driven for orbiting movement about the pivot axis 22 by virtue of the planetary gear carrier 156 being rotated through the overall drive unit 190.

The changeover between driving the threaded spindle 100 and driving the ring gear 158 is realized—as is customary in planetary gear mechanisms—in dependence on whether rotary movement of the ring gear 158, representing an output, or the rotary movement of the sun gear 152, representing the other output, is blocked.

In the locked position of the pivot element 14, illustrated in FIG. 18, the ring gear 158 is blocked in respect of rotary movement about the pivot axis 22 because the pivot element 14 which is connected to the ring gear 158 in rotationally fixed relation therewith is fixed to the guide body 40 in rotationally fixed relation therewith by the rotationally blocking bodies 54 which rest on the pressure surfaces 66a of the actuating body 52 located in its first rotationally blocking position.

For this reason, driving of the planetary gear carrier 156 through the overall drive unit 190 causes rotary movement of the sun gear 152 with a reduction ratio as is customary in planetary gear mechanisms so that the threaded spindle 100 is thereby driven such that it moves the actuating body 52 in the direction 73 until, as is illustrated in FIG. 20, in the freewheeling position of the actuating body 52, the rotationally blocking bodies 54 rest on the retreat receptacle 62. The rotationally blocking bodies 54 thus release the rotary movement of the pivot element 14 relative to the guide body 40, whereupon the pivot element 14 is capable of rotating about the pivot axis 22; in consequence of this, the ring gear 158 no longer stays rotationally fixed but is likewise able to rotate.

In order for the pivot element 14 to be able to perform a defined pivotal movement in this freewheeling position of the actuating body 52 and of the rotationally blocking bodies 54, a first restraining device, generally indicated at 200, is preferably provided.

The first restraining device 200 comprises, as is illustrated in FIGS. 18 to 25, a restraining body 202 which can be moved in a guide direction 206, preferably extending radially with respect to the pivot axis 22, in a guide receptacle 204 of the guide sleeve 44 and cooperates with an inner guide track 210 which is provided on the actuating body 52 and an outer guide track 212 which is arranged on the pivot element 14.

The inner guide track 210, provided in a radially outer region of the actuating body 52, is formed, in part, as a radial recess in the actuating body 52 and comprises an inner sliding surface 220 extending parallel to the axial direction 64 on the recess bottom, a restraining surface 222 extending increasingly radially outwardly and obliquely to the inner sliding surface and an outer sliding surface 224 adjoining the restraining surface 222, which outer sliding surface 224, in the simplest case, is formed by a curved surface region of the actuating body 52.

Figure 22:
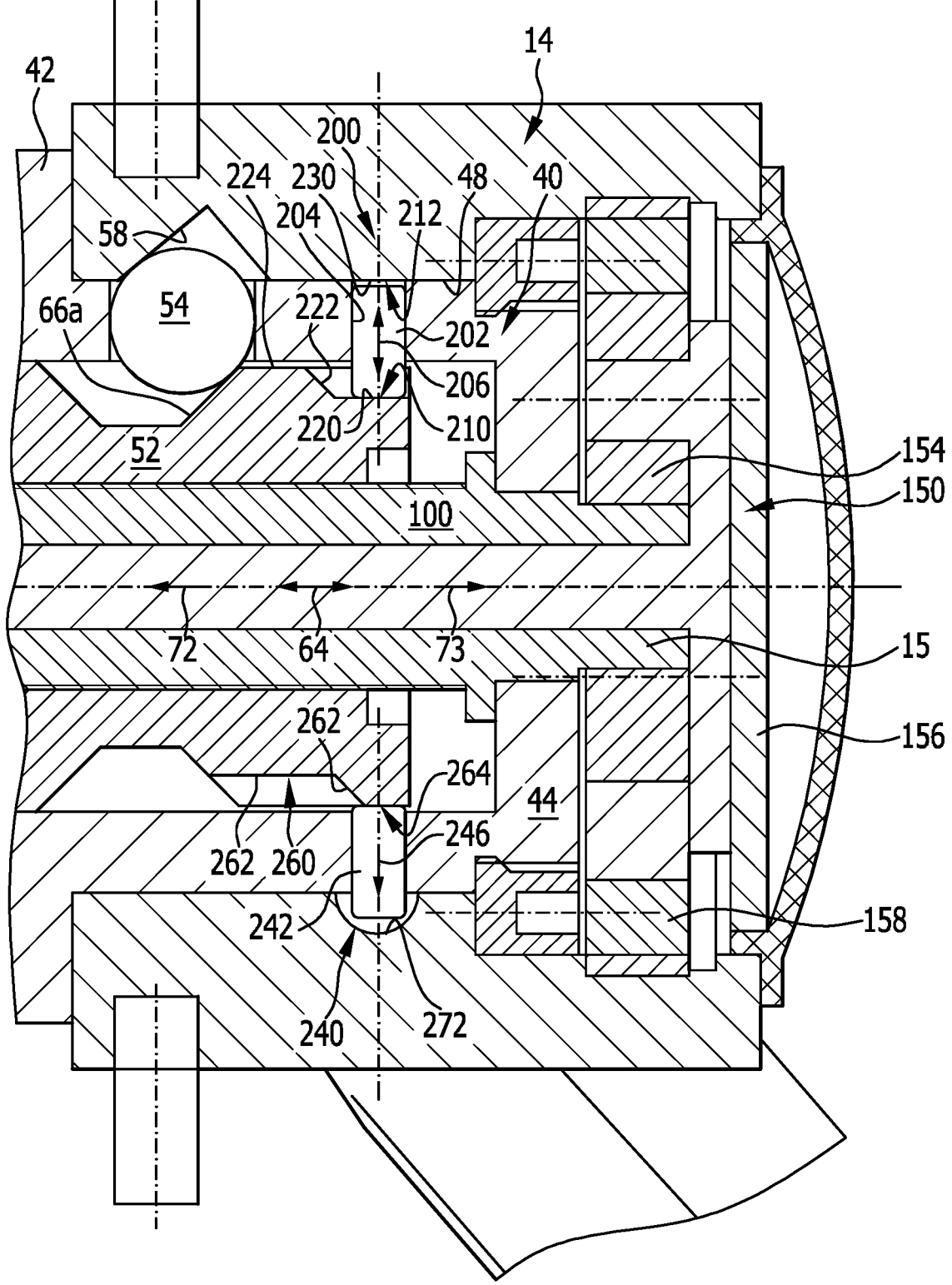
FIG. 22 shows an enlarged sectional view of the area of a pivotally blocking device and restraining devices, corresponding to the state indicated in FIG. 18.
Figure 23:
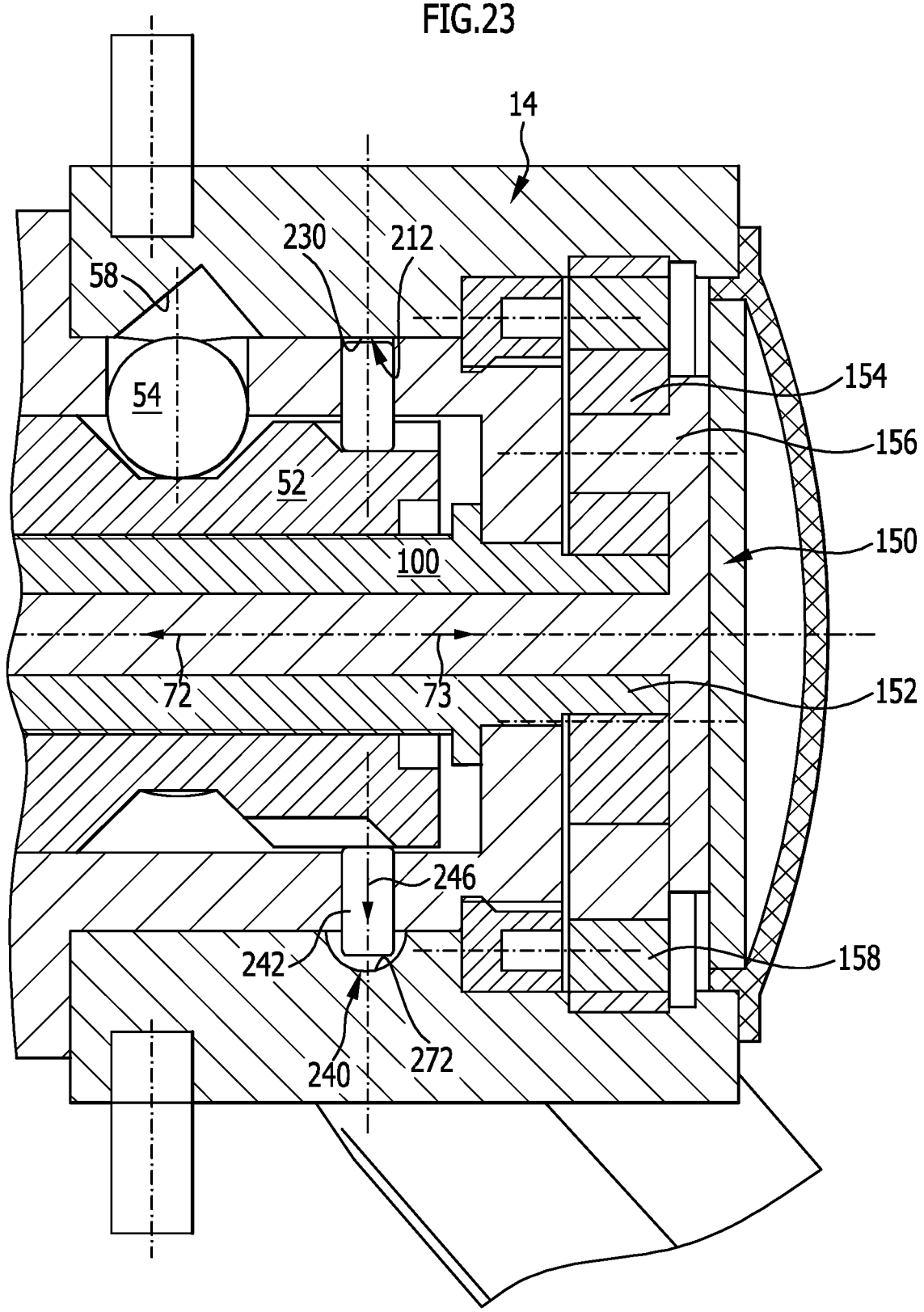
FIG. 23 shows a sectional view, similar to FIG. 22, corresponding to the state indicated in FIG. 19.

The outer guide track 212 comprises a sliding surface 230 which is formed by a portion of the inner surface 48 of the pivot element 14, illustrated in FIGS. 22 and 23, and a recess 232 adjoining the sliding surface 230 and extending radially outwardly with respect to the pivot axis 22, which recess 232 is located in opposite relation to the restraining body 202 only when the pivot element 14 is located in a defined pivoting position, for example in the rest position.

As is illustrated in FIGS. 21 to 25, which correspond to FIGS. 18 to 21, the first restraining device 200 works in such a way that the restraining body 202, when in the first rotationally blocking position, is arranged between the inner sliding surface 220 of the inner guide track 210 and the sliding surface 230 of the outer guide track 212 with a small amount of play.

Figure 24:
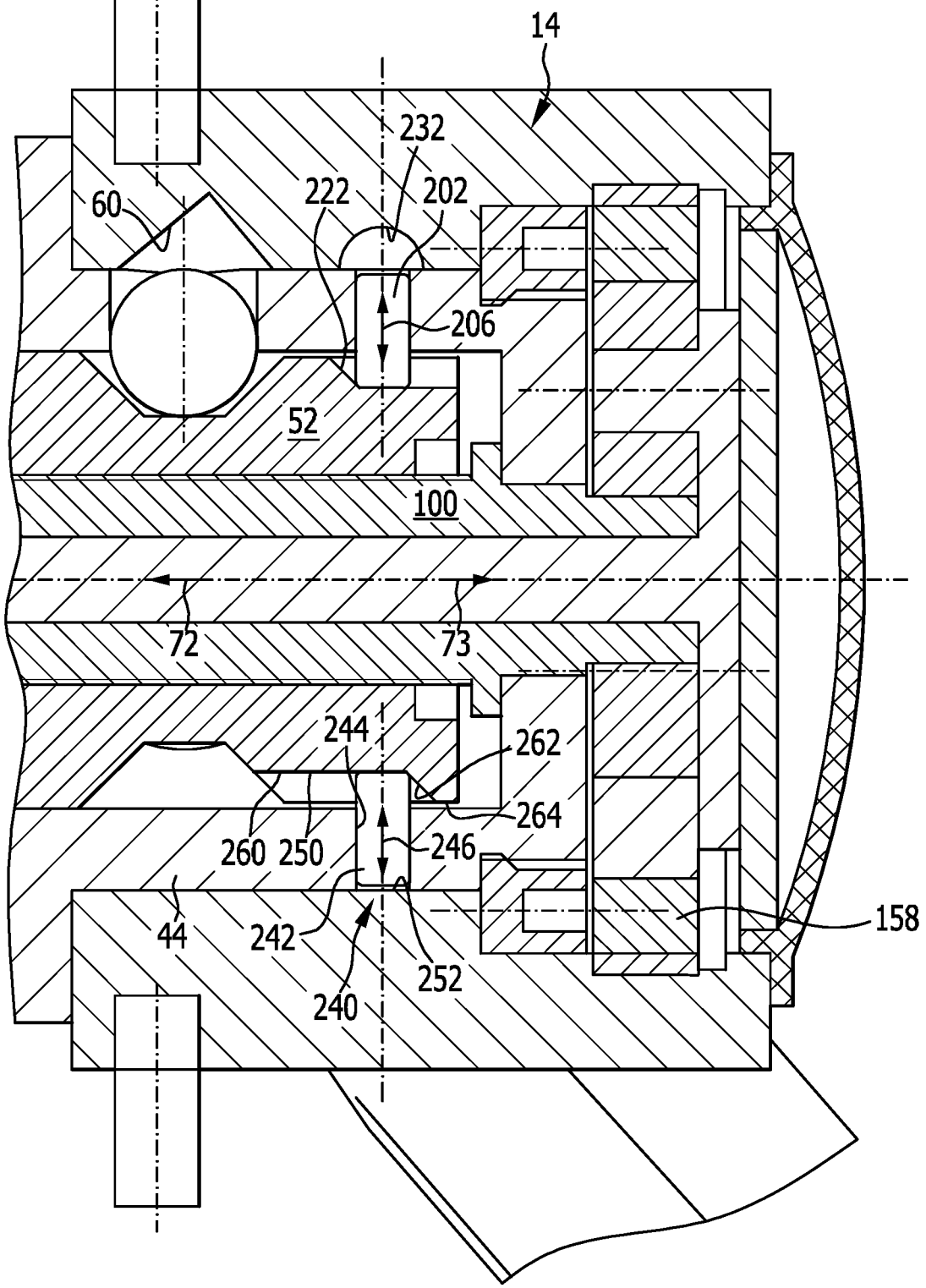
FIG. 24 shows a sectional view, similar to FIG. 22, corresponding to the state indicated in FIG. 20.

The inner sliding surface 220 is of such a length that the actuating body 52 can be moved from the first rotationally blocking position, illustrated in FIG. 22, to the freewheeling position, illustrated in FIGS. 23 and 24, without the restraining body 202 reaching the restraining surface 222 of the inner guide track 210.

The restraining body 202 touches the restraining surface 222 of the inner guide track 210, as shown in FIGS. 23 and 24, when the actuating body 52 is located in the freewheeling position, as is shown in FIGS. 23 and 24.

In the freewheeling position, the restraining surface 222 comes into contact against the restraining body 202, and to displace the actuating body 52 further in the direction 73, past the freewheeling position, towards the second rotationally blocking position, would require the restraining body 202, because of its interaction with the restraining surface 222, to be enabled to move radially outwardly in its guide direction 206 relative to the pivot axis 22. However, this movement of the restraining body 202 is blocked by the sliding surface 230 of the outer guide track 212 until the pivot element 14 has been pivoted about the pivot axis 22 far enough for the restraining body 202 to be located in opposite relation to the recess 232 of the outer guide track 212.

However, as long as this is not the case, the restraining body 202, by its interaction with the restraining surface 222 upon displacement of the actuating body 52 from the first rotationally blocking position to the freewheeling position, in this freewheeling position, as shown in FIG. 23, restrains the actuating body 52 from further displacement movement in the direction 73, whereby the rotary movement of the threaded spindle 100 and hence the rotary movement of the sun gear 152 is blocked.

As the the overall drive unit 190 continues driving the planetary gear mechanism 150, with the sun gear 152 being blocked, the ring gear 158 is imparted rotational drive by the orbiting planet gears 154, and this rotary movement of the ring gear 158 is possible by the actuating body 52 and hence the rotationally blocking bodies 54 being located in the freewheeling position and releasing the rotary movement of the pivot element 14.

Thus, continued operation of the overall drive unit 190 when reaching the freewheeling position results exclusively in a pivotal movement of the pivot element 14, for example from the operating position A to the rest position R, and in this rest position, the recess 232 is then located in opposite relation to the outer guide track 212, as illustrated in FIG. 24.

Figure 25:
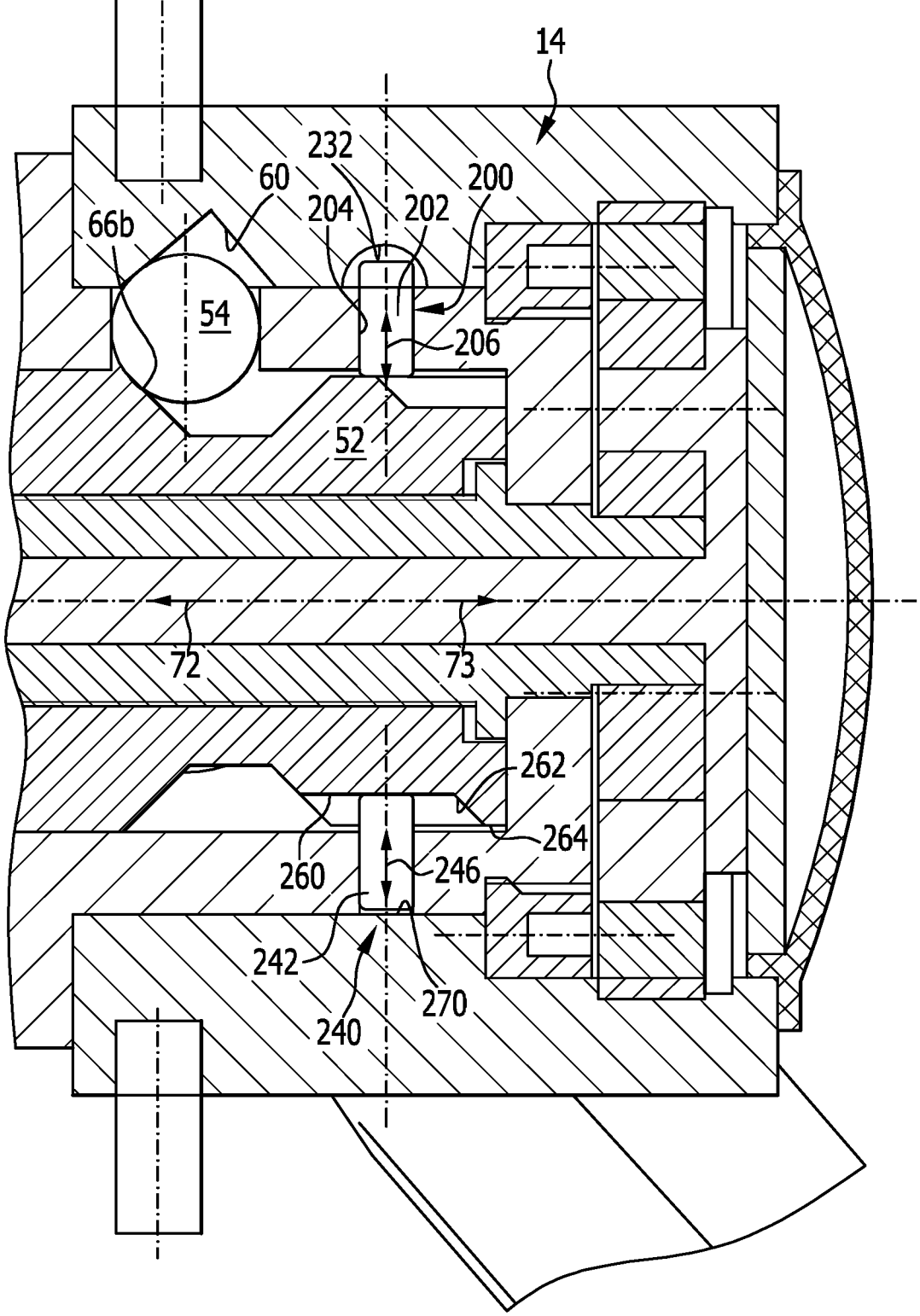
FIG. 25 shows a sectional view, similar to FIG. 21, corresponding to the state indicated in FIG. 20.

At this point, the restraining effect of the restraining body coacting with the restraining surface 222 of the inner guide track 210 ceases because the restraining body 202 is able to move radially outwardly in its guide direction 206 by sliding along the restraining surface 222 and can reach the outer sliding surface 224. As is illustrated in FIGS. 24 and 25, this allows for further displacement of the actuating body 52 in the direction 73 so that the actuating body 52 can transition from the freewheeling position to the second rotationally blocking position in which the pressure surfaces 66*b* move the rotationally blocking bodies 54 into the receptacles 60 and thereby lock the pivot element 14 in a rotationally fixed manner.

Thus, the first restraining device 200 functions to restrain, in the freewheeling position, the displacement movement of the actuating body 52 in the transition between the first rotationally blocking position and the freewheeling position until a pivotal movement of the pivot element 14 from the operating position A to the rest position R has occurred, and to allow the displacement movement of the actuating body 52 in the direction 73 to be continued only when the pivotal movement of the pivot element 14 from the operating position A to the rest position R has been completed.

If, in the rest position R, the locking of the pivot element 14 is to be released again and the pivot element is to be rotated back from the rest position R to the operating position A and locked in place in the operating position A, the sense of rotation of the overall drive unit 190 is reversed and the actuating body 52 is displaced in the direction 72. In this case, starting from the second rotationally blocking position, which locks the pivot element 14 in the rest position R, first the freewheeling position, illustrated in FIG. 24, in which the locking of the pivot element 14 is released, is reached.

In this position, to prevent the threaded spindle 100 from displacing the actuating body 52 further in the direction 72, towards the first rotationally blocking position, a second restraining device 240 is provided, this likewise having a restraining body 242 which is guided in a guide receptacle 244 in the guide sleeve 44 and can be moved radially with respect to the pivot axis in a guide direction 246.

The second restraining device also comprises an inner guide track 250 and an outer guide track 252, wherein the inner guide track 250, analogously to what has been described for the case of the first restraining device, has an inner sliding surface 260, a restraining surface 262 and an outer sliding surface 264 which is likewise provided in a radially outer region of the actuating body 52 which is arranged on the actuating body 52, for example at an angular distance from, preferably opposite to, the first restraining device 200.

Furthermore, the outer guide track 252 of the second restraining device 240 comprises a sliding surface 270 and a recess 272, wherein the recess 272 is located in opposite relation to the restraining body 242 only when the pivot element 14 is located in its operating position and wherein otherwise the sliding surface 270 is effective.

When the actuating body 52 is moved in the direction 72, the second restraining device 240 becomes effective analogously to what has been described for the first restraining device 200, meaning that, following the moving of the actuating body 52 from the second rotationally blocking position to the release position, the actuating body 52 is restrained from further movement in this direction and hence the threaded spindle 100 and the sun gear 152 are restrained from rotation so that, because of the pivot element 14, being no longer locked in the freewheeling position, as is illustrated in FIG. 24, the planet gears 154, which continue to be driven from the overall drive unit 190, drive the ring gear 158 and thus pivot the pivot element 14 from the rest position R to the operating position A.

When the operating position A of the pivot element 14 is reached, the recess 272 is located in opposite relation to the restraining body 242 so that the latter is now enabled, under the action of the restraining surface 262, to yield radially outwardly with respect to the pivot axis 22 in its guide direction 246, as is illustrated in FIG. 23.

In this way, the restraint upon the movement of the actuating body 52 in the direction 72 is ceased and the planetary gear mechanism 150 resumes driving the threaded spindle 100 via the sun gear 152 so that the threaded spindle 100 can displace the actuating body 52 further in the direction 72, towards the first rotationally blocking position thereof in which the rotationally blocking bodies 54 transition to the rotationally blocking position again and engage in the receptacles 58 in order to lock the pivot element 14 in the operating position A.

Furthermore, in the pivotal movement of the pivot element 14 from the rest position R to the operating position A, the first restraining body 202 of the first restraining device 200 exits the recess 232 and slides along the sliding surface 230 of the outer guide track 212.

The restraining bodies 202 and 242 of the restraining devices 200 and 204 may be formed in a wide variety of configurations. By way of example, as is illustrated in FIGS. 22 to 24, the restraining bodies 202 and 242 may be cylindrical pins. It is also conceivable, however, to configure the restraining bodies 202 and 242, in a manner similar to the rotationally blocking bodies 54, in the shape of balls and to adapt the shape and course of the inner guide tracks 210 and 250 and of the outer guide tracks 212 and 252 in a manner that conforms thereto.

The solution in accordance with the third exemplary embodiment thus makes it possible to use an overall drive unit 190 and, through the overall drive, by imparting drive to the planetary gear mechanism 150 in a single direction of rotation, first to release the locking of the pivot element 14 relative to the guide body 40, then pivot the pivot element 14 from one rotary position, for example the operating position A or the rest position R, to the respective other rotary position, for example the rest position R or the operating position A, and, in this respective other rotary position, lock the pivot element 14 again relative to the guide body 40.

By simply changing the direction of rotation of the overall drive, it is then possible again, in the other rotary position, for example in the rest position R or the operating position A, to release the locking of the pivot element 14 relative to the guide body 40, pivot the pivot element 14 back from the other rotary position to the one rotary position, for example the operating position A or the rest position R, and, in this respective one rotary position, lock the pivot element 14 again relative to the guide body 40.

Thus, the only circuitry action that is to be taken in such an exemplary embodiment of the solution in accordance with the invention is that of energizing the overall drive unit 190 in the direction of rotation as needed in each case, wherein the direction of rotation which is to be selected when the overall drive unit 190 is switched on is unambiguously correlated with the respective rotary position which the pivot element 14 occupies and to which it is locked.

In the third exemplary embodiment, the receptacles 58 and 60 are preferably formed as conically-shaped receptacles so that, as it is apparent from FIGS. 22 and 24, rotationally blocking bodies 54 entering these receptacles, by interacting with the conically-shaped receptacle 58 or 60, produce a force on the pivot element 14 which acts in the direction of the flange 42 and thus brings the pivot element 14 in contact against the flange 42 under the action of force.

In the third exemplary embodiment, a sensor system 330 is provided, as illustrated in FIGS. 26 to 29, said sensor system 330 comprising a first sensor 332 and a second sensor 334, wherein the first sensor 332 is arranged at the ball neck 10 and is thus movable about the pivot axis 22, while the second sensor 334 is stationary relative to the pivot bearing unit 20.

Preferably, the first sensor 332 and the second sensor 334 are micromechanical systems fabricated by MEMS technology which can be used, for example, both as an acceleration sensor and as an inclination sensor.

Figure 26:
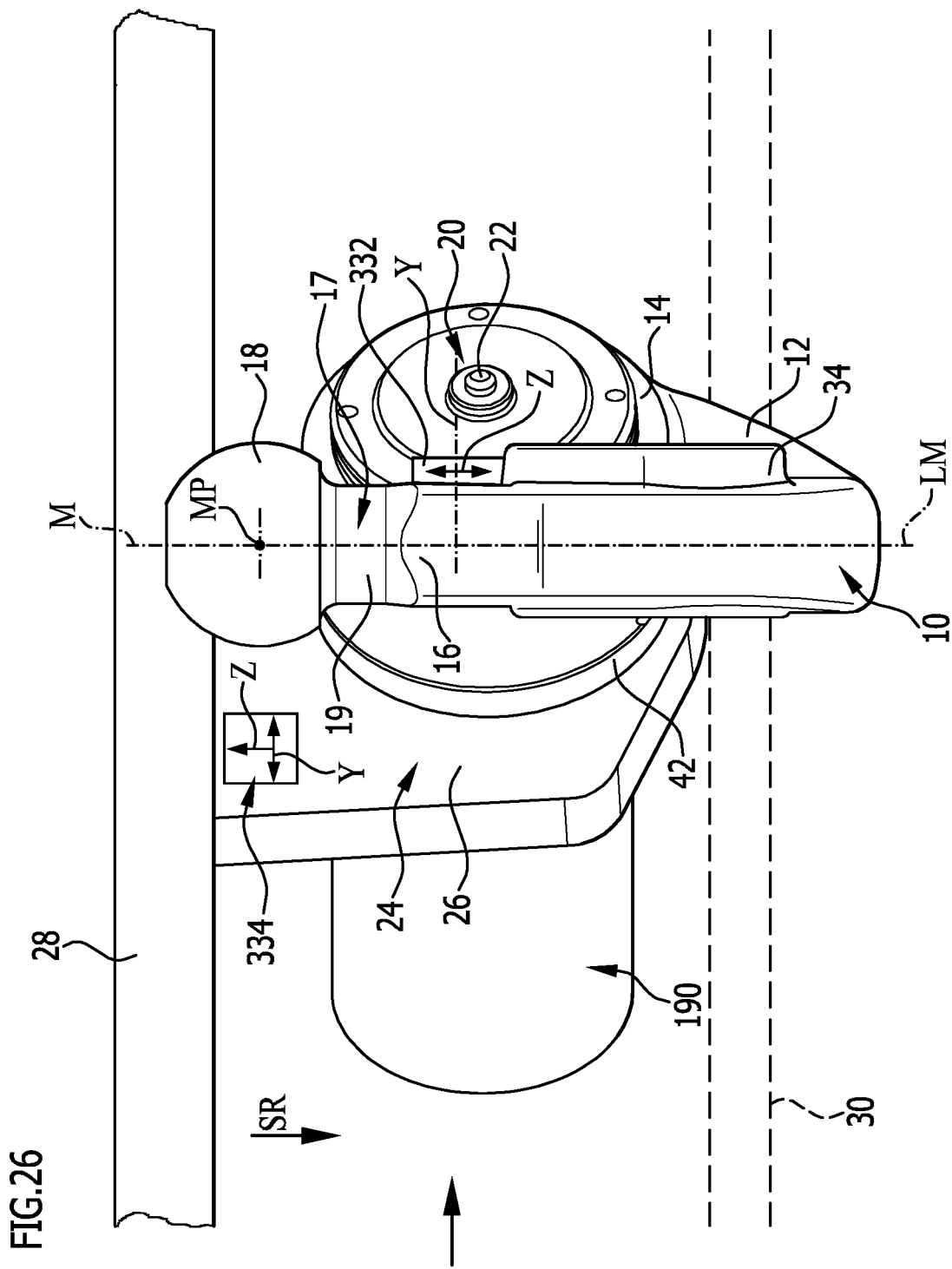
FIG. 26 shows a view, similar to FIG. 2, of the third exemplary embodiment of a trailer hitch in accordance with the invention with a sensor system.
Figure 27:
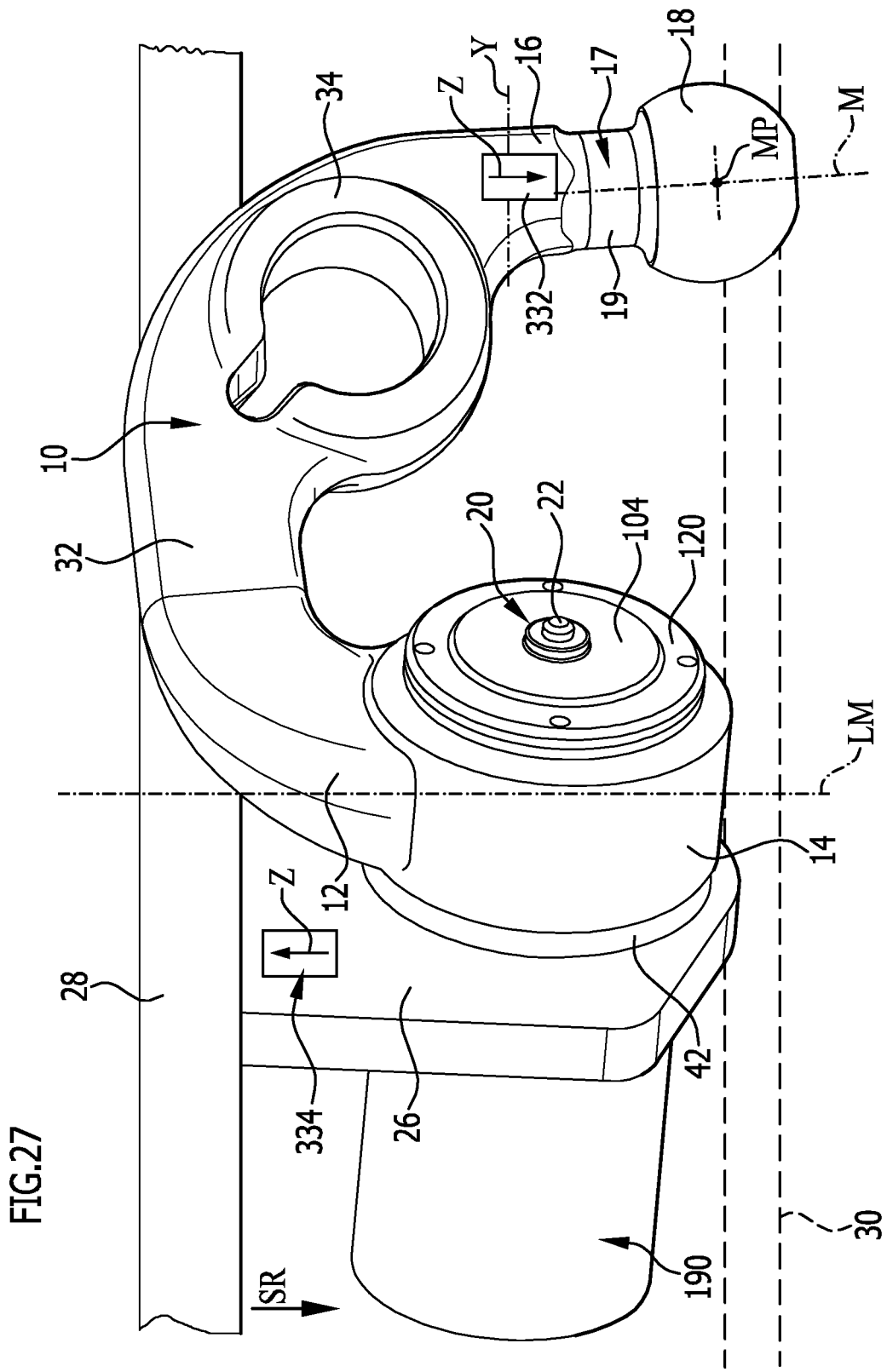
FIG. 27 shows a view, similar to FIG. 3, of the third exemplary embodiment of a trailer hitch in accordance with the invention with a sensor system.
Figure 28:
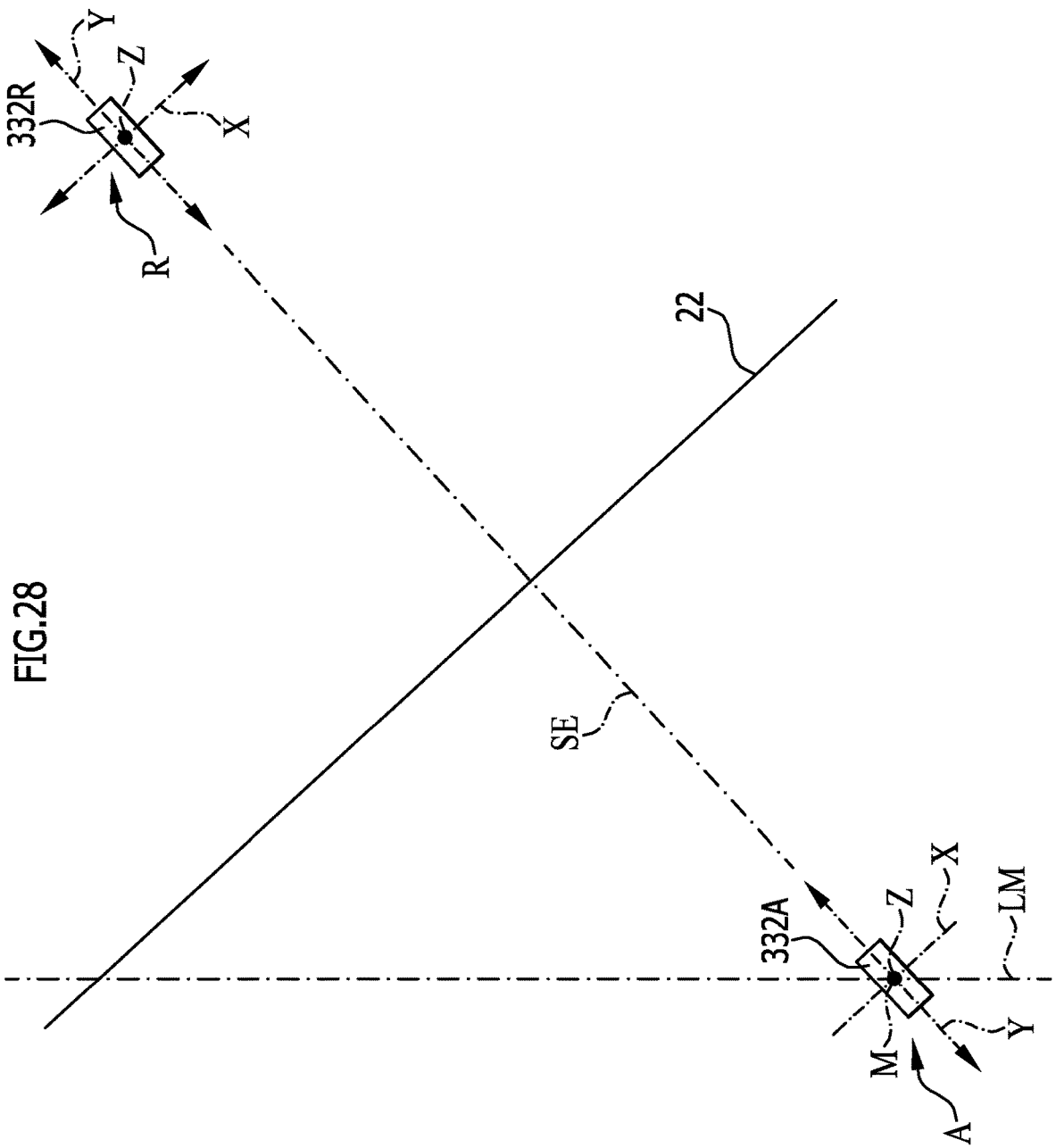
FIG. 28 shows a schematic representation of the orientation of the sensors of the sensor system in the third exemplary embodiment.

As illustrated in FIGS. 26 to 28, each of these sensors 332, 334 is configured as an approximately cuboid-shaped block and is capable of measuring accelerations in a direction in space X, Y or Z and/or in two directions in space and/or in three directions in space, for example in the X, Y, Z directions in space, and is further capable of detecting inclinations in the YZ plane about the X axis as an axis of rotation and of detecting inclinations in the X-Z plane about the Y axis as an axis of rotation, starting out from the assumption that the coordinate system is oriented such that the Z axis encloses the smallest angle having a direction of gravity SR, i.e., is approximately parallel to the direction of gravity SR.

In the third exemplary embodiment, as illustrated in FIGS. 26 to 28, the sensors 332 and 334 are preferably oriented such that for the first sensor 332, the Z axis in the operating position A of the ball neck 10 runs substantially parallel to the direction of gravity SR or at a small acute angle relative thereto and also runs substantially parallel to the direction of gravity SR or at an acute angle thereto in the rest position, albeit in an inverted direction.

Furthermore, the second sensor 334 in accordance with FIGS. 26 to 28 is oriented such that, with the usual mounting of the trailer hitch AK to a motor vehicle F and with the motor vehicle F placed on a horizontal surface, the Z direction of the second sensor 334 also extends substantially parallel or at a small acute angle to the direction of gravity SR.

The expression "substantially parallel" is understood to mean deviations from an exactly parallel orientation of up to 5° (angular degrees) and "at a small acute angle relative to the direction of gravity SR" is understood to refer to angles of up to 30°.

Furthermore, the sensor 332 is arranged such that in the operating position 332A thereof, its Y direction extends parallel to a pivoting plane SE running perpendicularly to the pivot axis 22 and its X direction extends perpendicularly to a pivoting plane SE running perpendicularly to the pivot axis 22, i.e., extends parallel to the pivot axis 22, and is arranged such that in the rest position 332R thereof, the Y direction also extends parallel to the pivoting plane SE running perpendicularly to the pivot axis 22 and the X direction extends approximately perpendicularly to the pivoting plane SE running perpendicularly to the pivot axis 22.

Furthermore, as shown in FIG. 28, the second sensor 334 is arranged such that its Y direction extends parallel to the pivoting plane SE running perpendicularly to the pivot axis 22 and that its X direction extends perpendicularly to a pivoting plane SE running perpendicularly to the pivot axis 22, i.e., extends parallel to the pivot axis 22.

However, it is likewise conceivable for the second sensor 334 to be arranged such that its X direction extends parallel to the vertical longitudinal center plane LM of the trailer hitch AK and that its Y direction extends transversely, preferably perpendicularly, to the vertical longitudinal center plane LM of the trailer hitch AK; this then requires conversion of the measuring values of the second sensor 334 in the coordinate system thereof to the orientation of the coordinate system of the first sensor 332, in order to determine an inclination difference.

The two sensors 332 and 334 are connected to an evaluation unit 338 which provides position information DSI on the basis of the following evaluation of the signals of the sensors 332 and 334.

It is apparent from FIGS. 26 to 28 that pivoting of the pivot element 14 together with the ball neck 10 from the operating position A shown in FIG. 26 to the rest position R shown in FIG. 27 results in that the first sensor 332 detects a change in inclination of its Z axis relative to the direction of gravity SR about the X axis as the inclination axis in the YZ plane parallel to the pivoting plane SE, and that, via a state in which the Z direction extends approximately perpendicularly to the direction of gravity SR, the first sensor 332 transitions, with increasing inclination in the YZ plane relative to the operating position A, to the rest position R with inverted orientation, for example wherein in the rest position R, the Z direction is rotated approximately 180° relative to the Z direction in the operating position A and is therefore inverted.

This inversion in the Z direction in the transition from the operating position A to the rest position R would already suffice for a rough detection of the operating position A and the rest position R, particularly when the varying inclinations of the Z direction in the YZ plane that lie between these inversions in the Z direction are taken into account by the evaluation unit 338.

Further improvement of the evaluation of the inclination in the Z direction in the YZ plane in the transition from the operating position A to the rest position R or vice versa can be achieved if the signals of the sensor 332 are brought in relation to the orientation of the second sensor 334 which represents a reference sensor for the orientation in space of the trailer hitch and thus enables a difference measurement to be made on the basis of the for example parallel orientation of the Z axes which is known, for example, for one of the final positions, in particular the operating position A or the rest position R, said difference measurement thus providing a reliable reference value for the location of the Z direction of the first sensor 332 in one of the final positions, in particular in the operating position A or in the rest position R, relative to the orientation in space of the Z direction of the second sensor 334, even when the motor vehicle F is inclined in any direction.

Preferably, the evaluation unit 338 is provided with a reference value storage device RWS in which are stored reference values for the relative orientations of the Z axis of the first sensor 332 relative to the orientation of the Z axis of the second sensor 334, which reference values are linked to angle information on the rotary angle about the pivot axis 22 so that the rotary angle relative to the pivot axis 22 and the angular distance from the respective final positions, i.e., from the operating position A and the rest position R, can be inferred from the inclination of the Z axis of the first sensor 332 in relation to the orientation of the Z axis of the second sensor 334.

In the third exemplary embodiment, the position information DSI that is generated by the sensor system 330 and which, in principle, corresponds to the same position information DSI that is generated by the sensor system 130, is delivered to a pivot controller 342 which controls the drive unit 190.

In the third exemplary embodiment, the pivot controller 342 additionally cooperates with a rotary movement sensor 344 of the electric motor 192 of the drive unit 190 which has the capability of generating a rotary movement signal DBS of the electric motor 192 so that the pivot controller 342 on the one hand, via the position information DSI, has available to it information concerning the location of the pivot element 14 together with the ball neck 10 relative to the pivot axis 22 and in addition to that can recognize, via the rotary movement signal DBS, how many revolutions haven taken place in the electric motor 192, and determines therefrom a movement relation.

If the pivot controller 342 operates in the pivoting mode of operation SBM, then, starting from one of the final positions, for example the operating position, the drive unit 190 is controlled on the part of the pivot controller 342 in such a manner that the drive unit 190 is caused to move with a sense of rotation which, first, causes the blocking position of the pivotally blocking device 50 to be released, wherein the pivot controller 342 can recognize on the one hand, via the position information DSI, that the pivot element 14 together with the ball neck 10 is not yet rotating about the pivot axis and can recognize on the other hand, via the rotary movement signal DBS of the rotary movement sensor 344, that the drive motor 192 is active and drives the pivotally blocking device 50 in the sense of releasing its transfer from the blocking position to the freewheeling position.

As soon as the freewheeling position is reached, the pivot element 14 together with the ball neck 10 is pivoted about the pivot axis, this being recognizable to the pivot controller 342 on the basis of the position information DSI generated by the sensor system 330, wherein it is recognizable from the for example constant movement relation that drive is only imparted to the pivotal movement and no drive is imparted to the pivotally blocking device 50.

Furthermore, it is recognizable from the rotary position information DSI that the pivot element 14 together with the ball neck 10 exits the one final position, i.e., for example, the operating position A, and moves in a direction of the second final position, for example the rest position R, and it is further recognizable via the position information DSI whether or not a pivotal movement has been performed through a pivot angle that corresponds to the pivot angle between the one final position and the other final position so that, via the position information DSI, it is recognizable on the part of the pivot controller 342 that the other final position has been reached.

When the final position is reached, the electric motor 192 is not switched off yet because the pivotally blocking device 50 must be transferred from the freewheeling position to the blocking position.

To this end, the drive unit 190 continues driving the planetary gear mechanism 150 until the pivotally blocking device 50 is located in the blocking position and hence the pivot element 14 is blocked in the respective final position.

This blocking operation is recognizable to the pivot controller 342 from the rotary movement signal of the electric motor 192 so that the electric motor 192 is switched off only after a sufficient number of revolutions of the electric motor 192 and blocking further revolutions thereof, all recognized via the rotary movement signal DBS.

In like manner, in the pivoting mode of operation SBM, the reverse pivoting operation, from the final position reached and blocked by the blocking position to the respective other final position, is carried out.

However, the pivot controller 342 can be operated not only in the pivoting mode of operation SBM but also in a holding mode of operation HBM.

In this holding mode of operation HBM, the pivot controller 342 continuously detects, via the position information DSI of the sensor system 330, whether or not the pivot element 14 together with the ball neck 10 is about to exit the respective final position.

If a slight movement is recognized via the position information DSI, the pivot controller 342 controls the electric motor 192 of the drive unit 190 such that the electric motor 192 again drives the pivotally blocking device 50 in a direction of its blocking position, thus preventing the pivot element 14 together with the ball neck 10 from potentially moving out of position owing to play of the pivotally blocking device 50 and thus counteracting such play.

The angular resolution of the position information DSI is large enough for even a slight movement of the pivot element 14 together with the ball neck 10 back into the respective final position to be recognized and, in addition, for the pivot controller 342 to recognize, via the rotary movement signal DBS, that the electric motor 192 has turned through several revolutions to drive the pivotally blocking device 50 in order to transfer same to a blocking position again substantially free from play so that the pivot element 14 together with the ball neck 10 again reaches the respective final position and is retained therein with no play.

In the simplest case, the monitoring of one of the final positions in respect of play occurred therein by way of the evaluation unit 338 or the pivot controller 342 can be realized through a fixed limit value for the deviation of the determined position information DSI in the respective final position.

Figure 29:
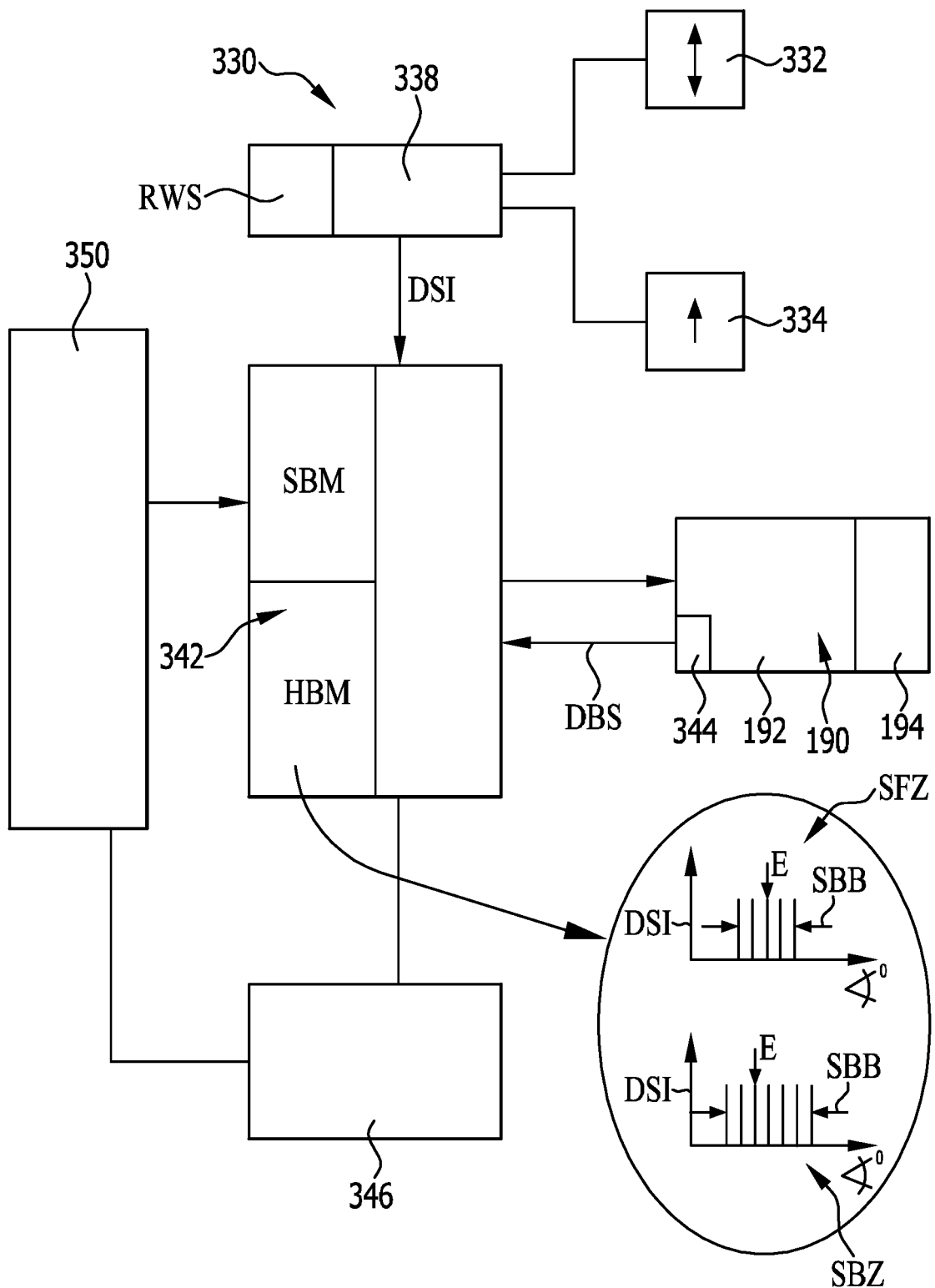
FIG. 29 shows a schematic representation of the sensor system, including a pivot controller and a sequence controller.

The accuracy of detecting the play in one of the final positions E can even be improved further if the variations of the determined position information DSI which occur over the time axis particularly when in travel mode are detected and evaluated via a variation pattern analysis (FIG. 29).

By way of example, to this end, a variation bandwidth SBB is determined on the basis of these variations relative to the exact value E of the respective final position and the location of the variation bandwidth SBB is analyzed relative to the exact value E and/or the extent of the variation bandwidth compared with a reference value because the location of the variation bandwidth in the final position is approximately symmetric to the value E in the play-free state SFZ and the extent of the variation bandwidth is smaller in the play-free state SFZ than it is in the play-laden state SBZ, in which latter state, in addition, the location of the variation bandwidth SBB is asymmetric to the value E.

In particular, a variation pattern analysis can also be performed by making a comparison with a variation pattern stored as a reference.

In the third exemplary embodiment, in particular if the first sensor 332 has as large a distance as possible from the pivot axis 22, in particular if it is arranged near the ball attachment 17, because of the elasticity of the ball neck 10, the variations of the position information are more significant so that the variation pattern analysis can already detect a small amount of play.

However, the first sensor 332 of the third exemplary embodiment can also be used as an acceleration sensor because this, in a pivotal movement about the pivot axis 22, detects accelerations in its XZ plane and the acceleration signals resulting therefrom can be utilized, on their own or in addition to the inclination signals of the first sensor 332, for determining the position information by way of the evaluation unit 338.

Furthermore, the second sensor 334 can be used for detecting longitudinal accelerations in the X direction of the vehicle and transverse accelerations in the Y direction of the vehicle and vertical accelerations in the Z direction of the vehicle in order, for example, to obtain vehicle dynamics information when in travel mode.

As exemplified in FIG. 29, in the present exemplary embodiment it is advantageously possible for the position information DSI to be evaluated to the effect that the location of the ball neck 10 relative to the pivot bearing unit 20 can be visualized with the aid of a visualization unit 346 so that an operator can track the movements of the ball neck from the operating position A to the rest position R or vice versa.

Furthermore, the visualization unit 346 can be advantageously used to indicate operating modes and/or operating states and/or disturbances associated with the sequence controller 350 and/or the pivot controller 342 and/or the overall drive unit 190 and the pivotally blocking device 50.

This is particularly advantageous when disturbances occur in the course of movements because it enables an operator to view what type of disturbance has occurred.

In a fourth exemplary embodiment, illustrated in FIGS. 30 to 34, like reference designations have been used to indicate like parts of the preceding exemplary embodiments and reference is made in full to what has been described with respect to such parts in the context of these exemplary embodiments.

As contrasted to the third exemplary embodiment, the fourth exemplary embodiment comprises a single restraining device 400 which replaces the functions of the first restraining device 200 and the second restraining device 240.

Here, the restraining device 400 comprises an actuating body 402 which can be moved in a guide direction 406, which preferably likewise extends radially with respect to the pivot axis 22, in a guide receptacle 404 of the guide sleeve 44, in the present case of the flange 42 of the guide sleeve 44, and which coacts with an outer guide track 412, arranged on the pivot element 14, under mediation of a blocking body 414 which is movable by way of an auxiliary guide 416 provided on the actuating body 402.

The outer guide track 412 is provided on an end surface 426 of the pivot element 14 facing towards the flange 42 and comprises a sliding surface 430 formed by the end surface 426 and recesses 432a and 432b which lie in the azimuthal direction on both sides of said sliding surface 430 and extend into the pivot element, away from the flange 42.

Figure 30:
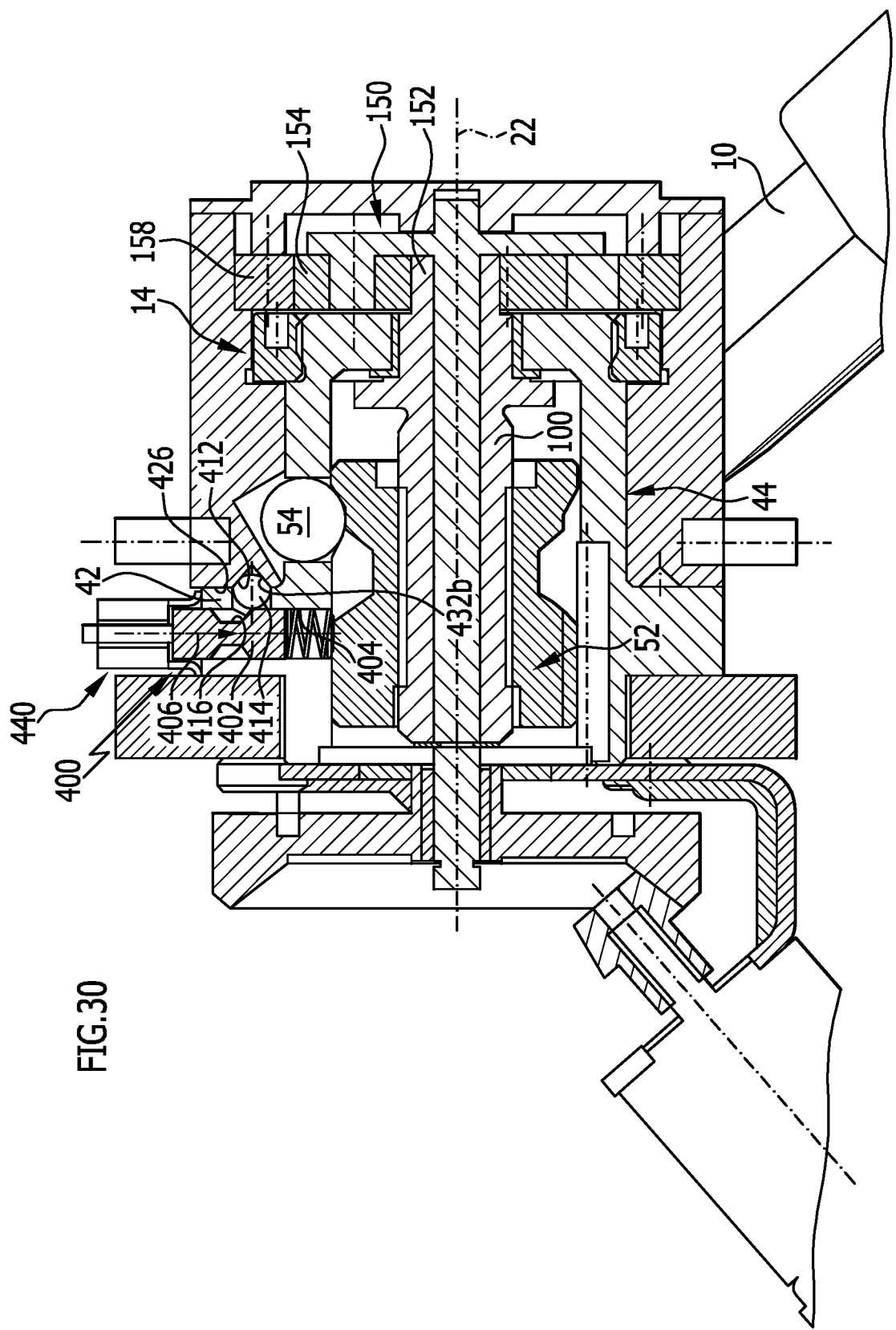
FIG. 30 shows a partial section, similar to FIG. 5, through a fourth exemplary embodiment of a trailer hitch in accordance with the invention, showing the actuating body and the rotationally blocking body as being located in a in a first rotationally blocking position, with a restraining device.

The actuating body 402 is movable, by a restraining drive unit 440 comprising for example an actuating magnet and a resilient element 444 which counteracts the force of the actuating magnet, into a blocking position, illustrated in FIG. 30, in which the blocking body 414, by way of the auxiliary guide on the actuating body 402, is in engagement with one of the recesses 432a, 432b and blocks pivotal movement of the pivot element 14 about the pivot axis 22, wherein the blocking position is retained by a resilient element 444 which acts upon the actuating body 402.

Activating the actuating magnet 422 moves the actuating body 402 and hence the blocking body 414 into the releasing position in which the restraining device 400 allows pivotal movement about the pivot axis.

Figure 34:
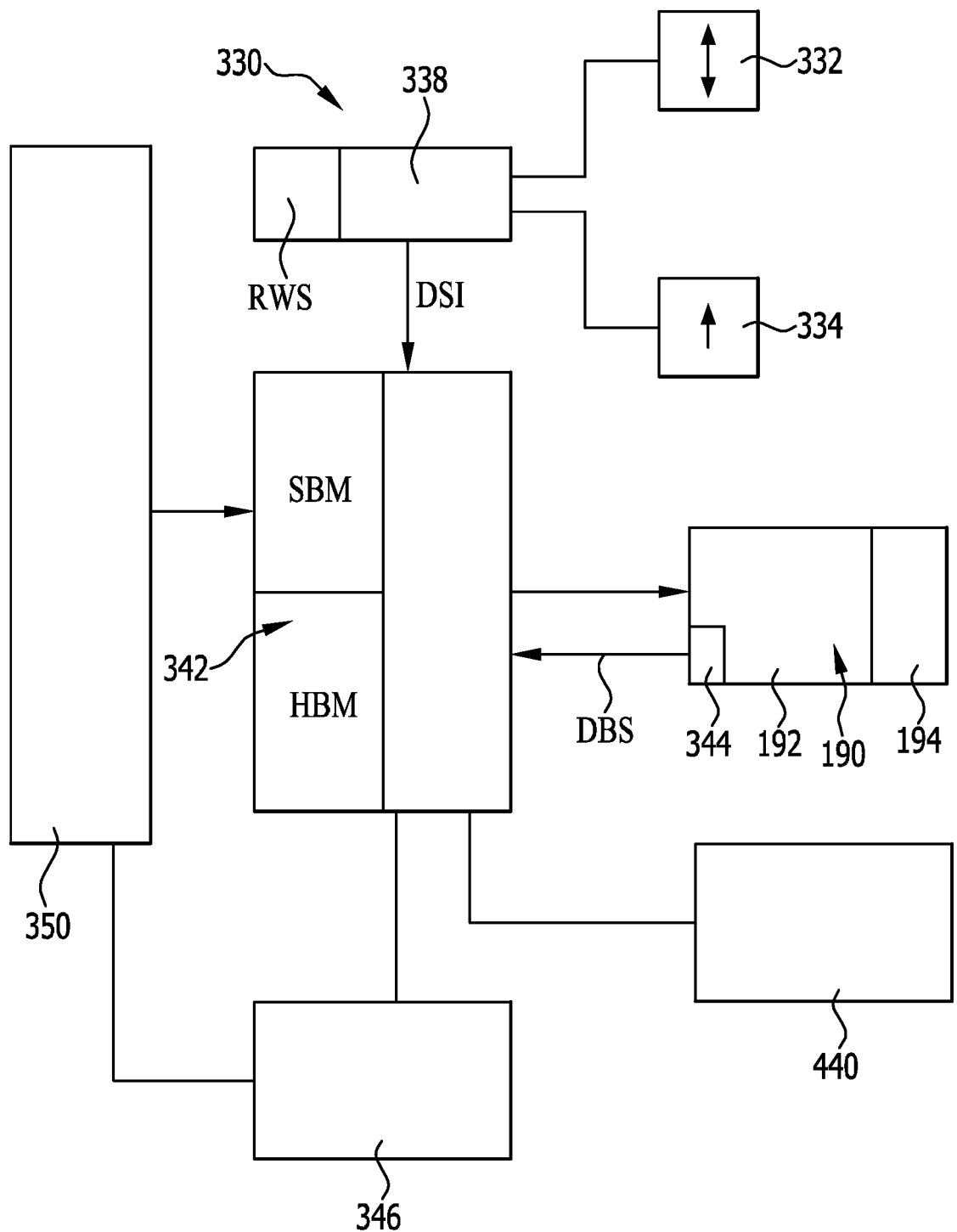
FIG. 34 shows a schematic representation of the sensor system, including a pivot controller and a sequence controller.

The fourth exemplary embodiment, as shown in FIG. 34, likewise comprises the sensor system 330 including the pivot controller 342 for controlling the overall drive unit 190 and the sequence controller 350 as described in the context of the third exemplary embodiment but with the pivot controller 342 being additionally capable of controlling the restraining drive unit 440.

As is illustrated in FIGS. 30 to 33, the restraining device 400 operates in such a way that, with the ball neck 10 located in the operating position, the actuating body 402, in the first pivotally blocking position of the actuating body 52, by virtue of the resilient element 444, is located in the blocking position, and in this position, the auxiliary guide 416 causes the blocking body 414 to enter the recess 432b of the outer guide track 412 and thus block a pivotal movement of the pivot element 14 (FIG. 30).

Figure 31:
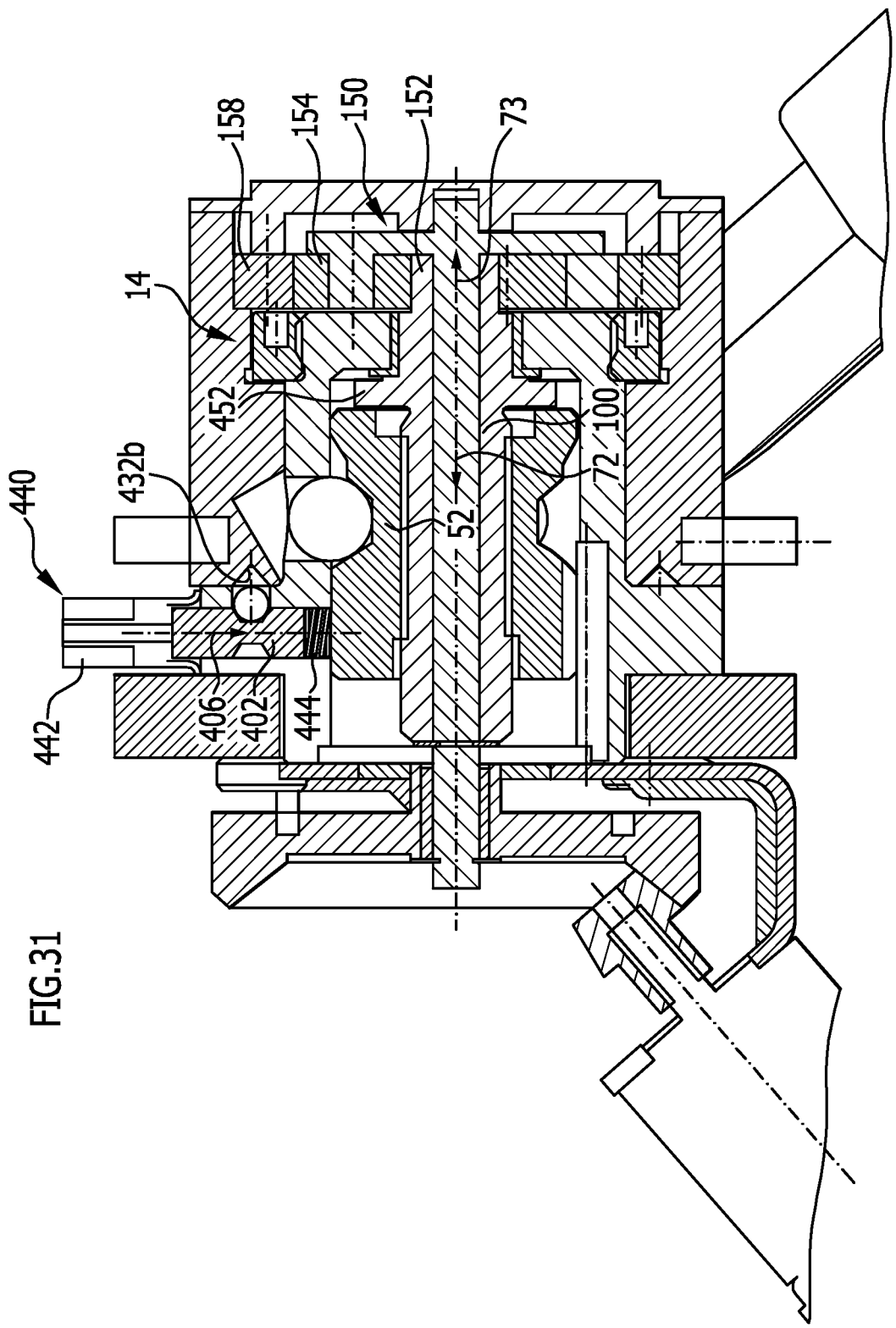
FIG. 31 shows a partial section, similar to FIG. 6, through the fourth exemplary embodiment of the trailer hitch in accordance with the invention, with the actuating body and the rotationally blocking body located in a freewheeling position prior to a pivotal movement of the pivot element, when the restraining device enters into effect.

If, controlled by the pivot controller 342 and driven by the overall drive unit 190, the actuating body 52 is now moved to the freewheeling position, as is illustrated in FIG. 31, the pivot controller 342 controls the restraining drive unit 440 in such a way that the actuating body 402 transitions to the releasing position, whereby, by way of the auxiliary guide 416 and the blocking body 414, the pivot element 14 is released.

In this position, the pivot element 14 is enabled to rotate about the pivot axis 22 because neither the rotationally blocking body 54 nor the blocking body 414 hinders the rotary movement.

A stop flange 452 is provided which, in the freewheeling position of the actuating body 52, restrains the latter from moving further in the direction 73, and this places a restraint on the rotary movement of the threaded spindle 100 and hence on the rotary movement of the sun gear 152 so that, on the basis of the restraint imposed on the sun gear 152, the planetary gear mechanism 150, which continues to be driven by the overall drive unit 190, thereby causes the ring gear 158 to be rotationally driven through the orbiting planet gears 154.

Pivoting of the pivot element 14 then results in that the recess 432b moves away from its position in opposite relation to the blocking body 414 and in that it is now the sliding surface 430 that is located opposite the blocking body 414 so that the blocking body 414 coacts with the auxiliary guide 416 and thereby blocks movement of the actuating body 402 in a direction away from the actuating body 52.

Figure 32:
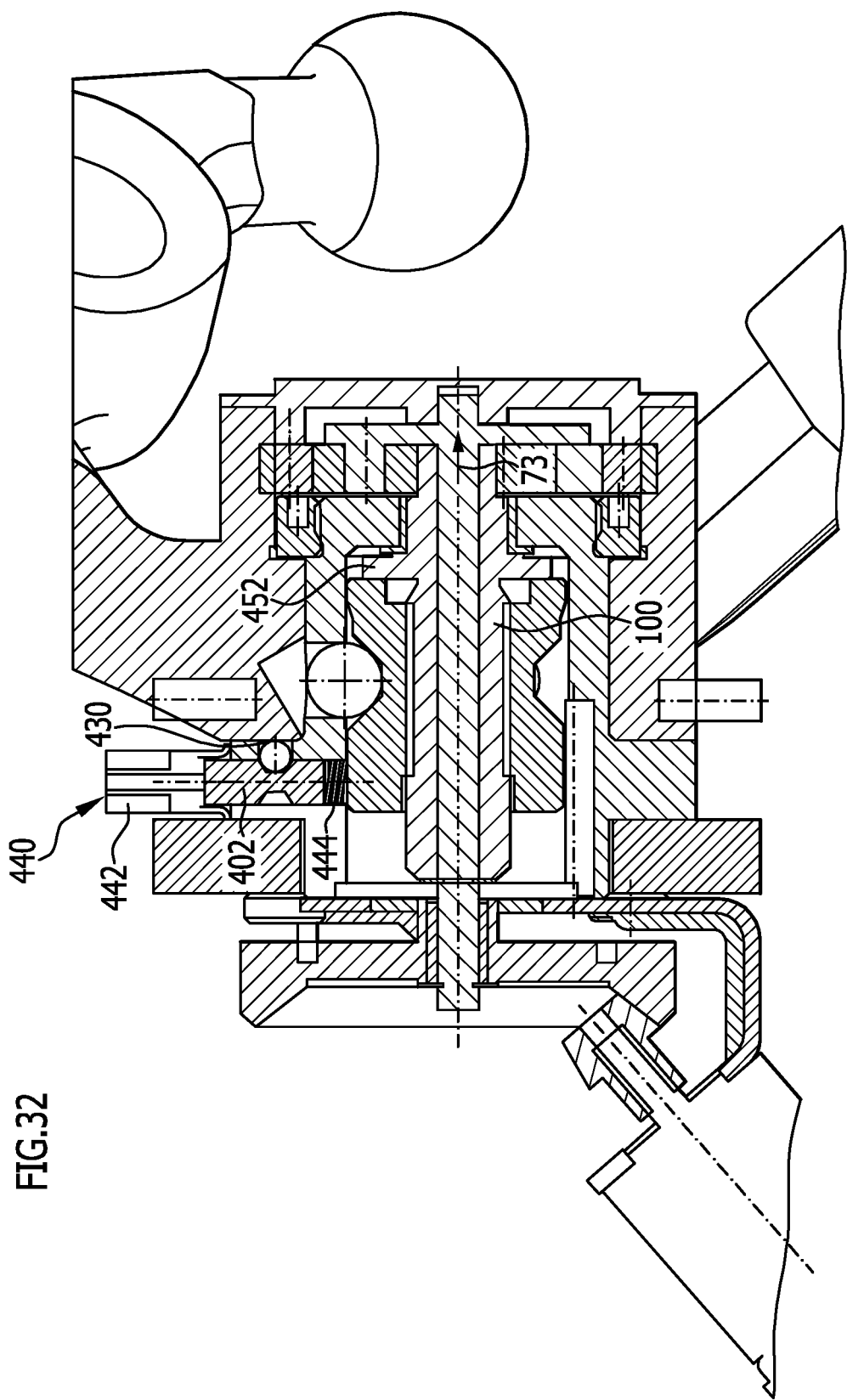
FIG. 32 shows a partial section through the fourth exemplary embodiment of the trailer hitch in accordance with the invention, in the course of the pivotal movement, showing the actuating body and the rotationally blocking body as located in a freewheeling position and the restraining device as fully effective.
Figure 33:
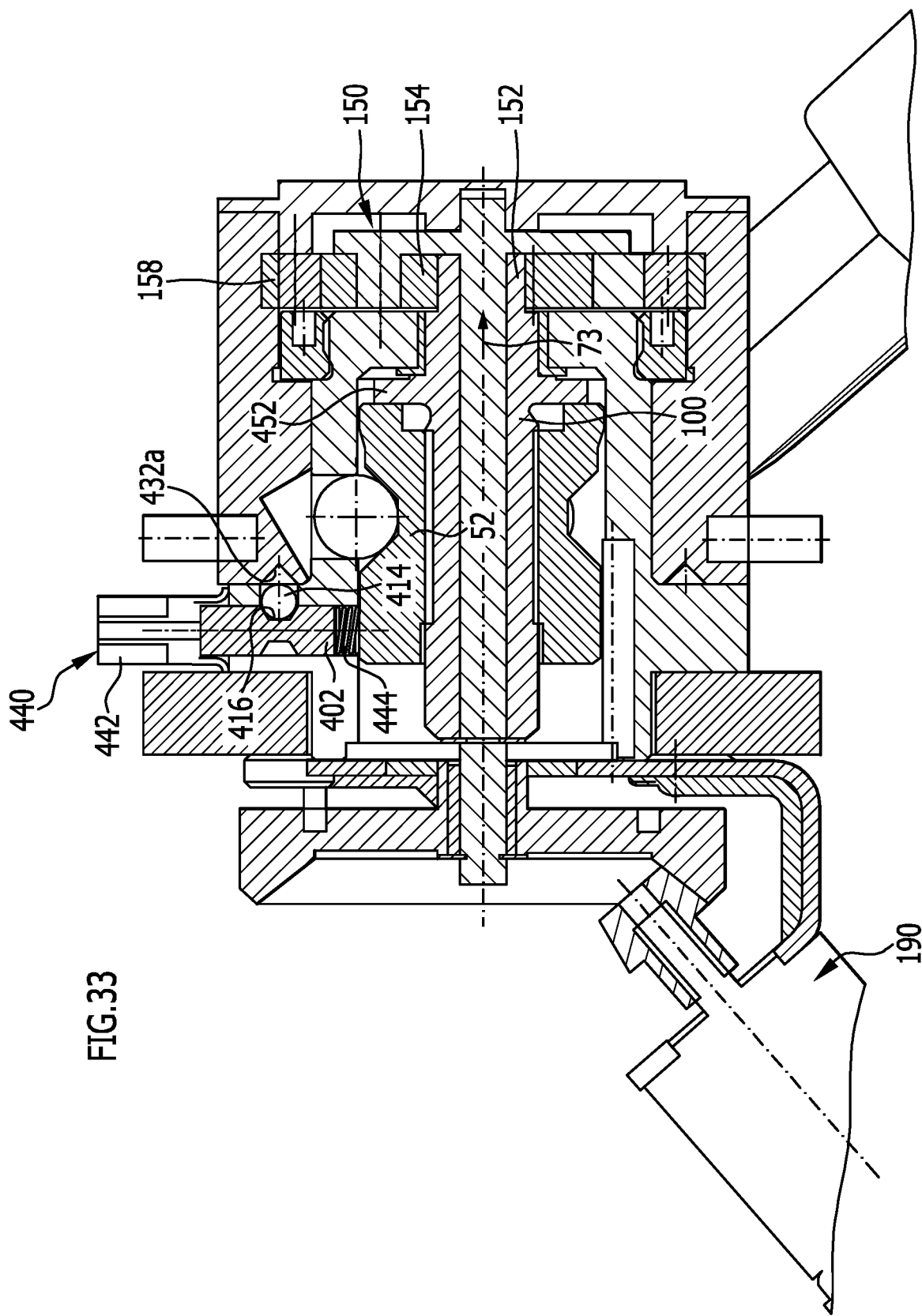
FIG. 33 shows a partial section similar FIG. 18 taken through the fourth exemplary embodiment of the trailer hitch, after a pivotal movement of the pivot element from an operating position to a rest position.

This condition of the actuating body 402, illustrated in FIG. 32, is maintained until the rest position R is reached in which the blocking body 414 has the recess 432a located opposite thereto (FIG. 33) and, under the action of the resilient element 444, engages in the recess 432a and blocks the pivotal movement.

Furthermore, the pivotal movement of the pivot element 14 in the rest position is terminated by a stop, not shown in the drawings.

In this fourth exemplary embodiment, it is possible for the pivot element 14 to be fixed in the rest position R by way of the blocking body 414 alone and, for a pivotal movement from the rest position R to the operating position A, to cease the blocking of the pivotal movement by activating the restraining drive unit 440 and to then pivot the pivot element 14 in a direction of the operating position A through the overall drive unit 190.

As an alternative to this, it is also possible to fix the pivot element in the rest position R by way of the rotationally blocking bodies 54 by moving the actuating body 52 to the first rotationally blocking position through reversal of the sense of rotation of the overall drive unit 190.

In the fourth exemplary embodiment, the respective location of the pivot element 14 and the ball neck 10 is likewise detected by the sensor system 330; in addition, it is possible, via the rotary movement signal of the electric motor 192 of the overall drive unit 190, to detect to what extent the pivotally blocking device 50 is driven when in the respective final position.

As exemplified in FIG. 34, it is advantageously possible in the fourth exemplary embodiment for the position information to be evaluated to the effect that the location of the ball neck 10 relative to the pivot bearing unit 20 can be visualized by way of a visualization unit 346 so that an operator is able to track the movement of the ball neck from the operating position A to the rest position R or vice versa.

Furthermore, the visualization unit 346 can be advantageously used to indicate operating modes and/or operating states and/or disturbances associated with the sequence controller 140 and/or the pivot controller 350 and/or the overall drive unit 190 and/or the restraining drive unit 440 and the pivotally blocking device 50.

This is particularly advantageous when disturbances occur in the course of movements because it enables an operator to view what type of disturbance has occurred.

The invention claimed is:

1. Trailer hitch, comprising
a pivot bearing unit mountable on a rear end portion of a vehicle body, in fixed relation to the vehicle, and a pivot element supported on the pivot bearing unit for pivotal movement about at least one pivot axis, said pivot element having fixedly connected thereto a ball neck carrying a hitch ball, said ball neck being pivotable, by pivoting the pivot element about the at least one pivot axis relative to the pivot bearing unit, between two final positions, one of which is an operating position in which the ball neck extends substantially in a vertical longitudinal center plane of the trailer hitch which, in the state of being mounted to the vehicle body, is coincident with the vertical longitudinal center plane of the vehicle body, and another one of which is a rest position in which the ball neck extends transversely with respect to the vertical longitudinal center plane,
a sensor system is provided for detecting rotary locations of the pivot element relative to the pivot bearing unit with respect to the at least one pivot axis, which sensor system detects the rotary locations of the pivot element relative to the pivot bearing unit mounted in fixed relation to the vehicle and generates position information representative of the respective location of the pivot element, in the course of the pivoting from the operating position to the rest position and vice versa.

2. Trailer hitch as defined in claim 1, wherein the sensor system detects at least one location range of the pivot element that encompasses the operating position and the rest position.

3. Trailer hitch as defined in claim 2, wherein the sensor system detects the rotary locations of intermediate positions of the pivot element lying between the operating position and the rest position.

4. Trailer hitch as defined in claim 1, wherein the sensor system detects the rotary locations with an angular resolution of better than 0.5° (angular degree).

5. Trailer hitch as defined in claim 1, wherein the sensor system comprises an evaluation unit which compares the rotary locations of the pivot element detected by the sensor unit with reference locations and determines therefrom the position information for the pivot element.

6. Trailer hitch as defined in claim 5, wherein the evaluation unit generates the position information that provides unambiguous indication of the operating position and the rest position of the pivot element.

7. Trailer hitch as defined in claim 5, wherein the evaluation unit generates the position information that provides unambiguous indication of the intermediate positions of the pivot element lying between the final positions.

8. Trailer hitch as defined in claim 5, wherein the trailer hitch comprises at least one motorized drive unit for performing the pivotal movement and a pivot controller which cooperates with the evaluation unit and makes use of the position information for controlling the at least one drive unit and wherein the pivot controller controls the drive unit taking into account the position information.

9. Trailer hitch as defined in claim 8, wherein the pivot controller comprises a pivot mode of operation in which the pivot element is pivoted from one of the final positions to the other final position.

10. Trailer hitch as defined in claim 9, wherein the pivot controller in the pivot mode of operation switches off a drive motor, driving the pivotal movement, of the at least one drive unit when the respective final position is reached as the conclusion of a process of entry into this final position.

11. Trailer hitch as defined in claim 1, wherein the pivot controller in the pivot mode of operation, in the course of pivoting the pivot element from one final position to the other final position, controls the drive unit in such a manner that same pivots the pivot element at a predetermined constant speed or at speeds predetermined in a manner corresponding to a movement profile.

12. Trailer hitch as defined in claim 1, wherein the pivot controller monitors the pivotal movement and/or blocking or unblocking of the pivotal movement by comparing the position information of the pivot element with a rotary movement signal of the drive motor of the at least one drive unit.

13. Trailer hitch as defined in claim 12, wherein the pivot controller, by comparing the position information of the pivot element with the rotary movement signal of the drive motor, determines a movement relationship and compares this with stored reference values for the movement relationship.

14. Trailer hitch as defined in claim 13, wherein the pivot controller generates a fault signal if the determined movement relationship deviates from the predetermined movement relationship.

15. Trailer hitch as defined in claim 8, wherein the pivot controller is operable in a holding mode of operation in which the respective final position, in particular the operating position or the rest position of the pivot element, is maintained by way of the pivot controller.

16. Trailer hitch as defined in claim 15, wherein, upon receipt of the position information indicating that the respective final position has been exited, the pivot controller drives the drive unit in the sense of pivoting into the respective final position that has just been exited.

17. Trailer hitch as defined in claim 1, wherein the trailer hitch comprises a pivotally blocking device, wherein the pivotally blocking device is movable from a blocking position to a freewheeling position and vice versa by way of a drive unit and wherein the pivot controller which cooperates with the evaluation unit and makes use of the position information is provided for controlling the drive unit taking into account the position information.

18. Trailer hitch as defined in claim 17, wherein the pivot controller in a pivot mode of operation controls the drive unit in such a manner that the pivotally blocking device transitions from the freewheeling position to the blocking position when the respective final position is reached as the conclusion of a process of entry into this final position.

19. Trailer hitch as defined in claim 1, wherein the pivot controller in a pivot mode of operation retains the pivotally blocking device in the freewheeling position until the pivot element has reached one of the final positions.

20. Trailer hitch as defined in claim 17, wherein the pivot controller in a holding mode of operation, upon receipt of the position information indicating the presence of play in the respective final position, controls the drive unit for the pivotally blocking device in such a manner that the pivotally blocking device is driven in a direction of its blocking position in the respective final position.

21. Trailer hitch as defined in claim 1, wherein the trailer hitch comprises a pivotally blocking device for fixing the ball neck in the final positions and wherein the pivotally blocking device is transferable, by a drive unit, from a blocking position to a release position and from the release position to a blocking standby position and wherein the pivot controller which cooperates with the evaluation unit and makes use of the position information is provided for controlling the drive unit taking into account the position information.

22. Trailer hitch as defined in claim 21, wherein the pivot controller in a movement mode of operation, during the movement of the ball neck between the final positions, moves the pivotally blocking device into the blocking standby position from which the pivotally blocking device transitions to the blocking position automatically.

23. Trailer hitch as defined in claim 1, wherein the pivot controller controls a restraining device of the pivotally blocking device.

24. Trailer hitch as defined in claim 1, wherein the sensor system comprises a sensor head held to the pivot bearing unit or co-pivotable with the pivot element or the ball neck, which sensor head senses a position structure that is co-pivotable with the pivot element or the ball neck or is fixedly arranged at the pivot bearing unit respectively.

25. Trailer hitch as defined in claim 24, wherein the position structure extends along a circular arc segment extending about the at least one pivot axis.

26. Trailer hitch as defined in claim 24, wherein the position structure is a localized structure.

27. Trailer hitch as defined in claim 24, wherein the position structure is a continuous structure.

28. Trailer hitch as defined in claim 27, wherein the continuous structure is detected by the sensor head when the pivot element moves from the one final position to the other final position.

29. Trailer hitch as defined in claim 24, wherein the position structure is configured as a magnetic field influencing structure and wherein the sensor head detects changes in a magnetic field.

30. Trailer hitch as defined in claim 1, wherein the sensor system comprises a first sensor arranged for co-pivotal movement with the pivot element or the ball neck and comprises an evaluation unit connected to the first sensor, which evaluation unit, for determining the rotary locations of the pivot element or the ball neck, compares sensor signals of the first sensor with reference values associated with the respective location and thereby generates the position information for the pivot element.

31. Trailer hitch as defined in claim 1, wherein the sensor system comprises a first sensor arranged for co-pivotal movement with the pivot element or the ball neck and a second sensor fixedly arranged at the pivot bearing unit and wherein the sensor system comprises an evaluation unit connected to the first sensor and the second sensor, which evaluation unit detects difference values of the sensors and, for determining the rotary locations of the pivot element, compares these with stored reference values for the difference values associated with the respective location and thereby generates the position information for the pivot element.

32. Trailer hitch as defined in claim 30, wherein the first sensor and the second sensor are inclination sensors.

33. Trailer hitch as defined in claim 30, wherein the first sensor and the second sensor are sensors operable as inclination sensors detecting movements in space, the sensors being acceleration sensors.

34. Trailer hitch as defined in claim 30, wherein the first sensor and/or the second sensor detect inclinations about at least one inclination axis.

35. Trailer hitch as defined in claim 34, wherein the sensors detect inclination values with respect to a direction of gravity for reference.

36. Trailer hitch as defined in claim 30, wherein the evaluation unit, for determining the position information of the pivot element, detects inclination difference values which are formed from inclination values as measuring values of the sensors.

37. Trailer hitch as defined in claim 30, wherein the evaluation unit detects an inclination difference between an inclination of the first sensor and an inclination of the second sensor in at least one of the final positions.

38. Trailer hitch as defined in claim 30, wherein, for determining the position information of the pivot element on the basis of the determined inclination difference, the course of the inclination values of the first sensor in a pivotal movement from one final position to the other final position is determined.

39. Trailer hitch as defined in claim 30, wherein the first sensor has its Z axis, which is relevant for inclination detection, and its further axis of its Cartesian coordinate system lying in a pivoting plane which runs perpendicularly to the pivoting axis.

40. Trailer hitch as defined in claim 39, wherein the second sensor has its Z axis, which is relevant for inclination detection, and its further axis, corresponding to that of the first sensor, of its Cartesian coordinate system oriented in parallel relation to the pivoting plane.

41. Trailer hitch as defined in claim 30, wherein the evaluation unit detects accelerations with the first sensor.

42. Trailer hitch as defined in claim 41, wherein the evaluation unit detects accelerations with both sensors.

43. Trailer hitch as defined in claim 41, wherein the evaluation unit detects accelerations in a pivoting plane perpendicular to the pivot axis with the first sensor.

44. Trailer hitch as defined in claim 8, wherein the pivot controller has associated with it a visualization unit for indicating operating modes and/or operating states and/or disturbances.

* * * * *